US008115625B2

(12) United States Patent
Yoshioka et al.

(10) Patent No.: US 8,115,625 B2
(45) Date of Patent: Feb. 14, 2012

(54) PARENTAL ALERT AND CHILD TRACKING DEVICE WHICH DETERMINES IF A CHILD HAS DEVIATED FROM A PREDICATED TRAVEL ROUTE

(75) Inventors: Mototaka Yoshioka, Osaka (JP); Jun Ozawa, Nara (JP); Takashi Tajima, Osaka (JP)

(73) Assignee: Panasonic Corporation, Osaka (JP)

( * ) Notice: Subject to any disclaimer, the term of this patent is extended or adjusted under 35 U.S.C. 154(b) by 887 days.

(21) Appl. No.: 12/095,592

(22) PCT Filed: Apr. 26, 2007

(86) PCT No.: PCT/JP2007/059107
§ 371 (c)(1),
(2), (4) Date: May 30, 2008

(87) PCT Pub. No.: WO2007/138816
PCT Pub. Date: Dec. 6, 2007

(65) Prior Publication Data
US 2010/0225469 A1 Sep. 9, 2010

(30) Foreign Application Priority Data
May 26, 2006 (JP) ................................. 2006-146600

(51) Int. Cl.
*G08B 1/08* (2006.01)
(52) U.S. Cl. ........... 340/539.15; 340/539.1; 340/539.11; 340/539.13; 340/539.14; 340/573.1; 379/37; 379/38; 455/404.1; 455/404.2
(58) Field of Classification Search .................... None
See application file for complete search history.

(56) References Cited

U.S. PATENT DOCUMENTS

| 6,363,323 | B1* | 3/2002 | Jones | 701/213 |
| 6,999,779 | B1* | 2/2006 | Hashimoto | 455/456.2 |

(Continued)

FOREIGN PATENT DOCUMENTS

| JP | 2000-293540 | 10/2000 |
| JP | 2003-109147 | 4/2003 |
| JP | 2003-174396 | 6/2003 |
| JP | 2004-040284 | 2/2004 |

(Continued)

OTHER PUBLICATIONS

International Search Report issued Jun. 26, 2007 in International (PCT) Application No. PCT/JP2007/059107.

*Primary Examiner* — Benjamin C Lee
*Assistant Examiner* — Curtis King
(74) *Attorney, Agent, or Firm* — Wenderoth, Lind & Ponack, L.L.P.

(57) ABSTRACT

A system is provided including a first detection unit detecting a position of a first terminal, a second detection unit detecting a position of a second terminal, and a notification area determination unit determining a notification area based on the detected position of the second terminal, wherein, within the notification area, position information regarding the position of the first terminal is not notified. The system also includes a first route prediction unit predicting a route from a position of the first terminal to the notification area, a time calculation unit calculating a time period required for arriving at the notification area when the first terminal travels along the predicted route, and a notification unit permitting the notification when the first terminal does not arrive at the notification area after the time period elapses from the current time, and suppressing the notification while the time period does not elapse.

16 Claims, 48 Drawing Sheets

U.S. PATENT DOCUMENTS

| | | | |
|---|---|---|---|
| 7,013,151 B2 | 3/2006 | Hirokawa | |
| 2002/0190861 A1* | 12/2002 | Wentworth | 340/568.1 |
| 2003/0119529 A1 | 6/2003 | Hirokawa | |
| 2003/0140060 A1* | 7/2003 | Gehlot et al. | 707/104.1 |
| 2004/0000994 A1* | 1/2004 | Kuo | 340/539.13 |
| 2004/0160359 A1* | 8/2004 | Kanerva | 342/357.08 |
| 2005/0037729 A1* | 2/2005 | Dupont et al. | 455/404.2 |
| 2005/0068172 A1* | 3/2005 | King | 340/539.23 |

FOREIGN PATENT DOCUMENTS

| | | |
|---|---|---|
| JP | 2004-045333 | 2/2004 |
| JP | 2004-234369 | 8/2004 |
| JP | 2004-234370 | 8/2004 |
| JP | 2005-038299 | 2/2005 |
| JP | 2005-293255 | 10/2005 |
| JP | 2005-322164 | 11/2005 |
| WO | 2005/109365 | 11/2005 |

* cited by examiner

FIG. 3A

| East longitude | North latitude |
|---|---|
| 135 degrees 20 minutes 35 seconds | 34 degrees 44 minutes 35 seconds |
| 135 degrees 20 minutes 34 seconds | 34 degrees 44 minutes 35 seconds |
| 135 degrees 20 minutes 33 seconds | 34 degrees 44 minutes 34 seconds |
| 135 degrees 20 minutes 32 seconds | 34 degrees 44 minutes 34 seconds |
| 135 degrees 20 minutes 31 seconds | 34 degrees 44 minutes 34 seconds |
| .. | .. |

FIG. 3B

| East longitude | North latitude |
|---|---|
| 135 degrees 15 minutes 35 seconds | 34 degrees 48 minutes 35 seconds |
| 135 degrees 15 minutes 35 seconds | 34 degrees 48 minutes 35 seconds |
| 135 degrees 15 minutes 35 seconds | 34 degrees 48 minutes 35 seconds |
| 135 degrees 15 minutes 35 seconds | 34 degrees 48 minutes 35 seconds |
| 135 degrees 15 minutes 35 seconds | 34 degrees 48 minutes 35 seconds |
| .. | .. |

FIG. 3C

| East longitude | North latitude |
|---|---|
| 135 degrees 20 minutes 35 seconds | 34 degrees 44 minutes 35 seconds |
| 135 degrees 20 minutes 34 seconds | 34 degrees 44 minutes 35 seconds |
| 135 degrees 20 minutes 33 seconds | 34 degrees 44 minutes 34 seconds |
| 135 degrees 20 minutes 32 seconds | 34 degrees 44 minutes 34 seconds |
| 135 degrees 20 minutes 32 seconds | 34 degrees 44 minutes 36 seconds |
| .. | .. |

FIG. 12

| Predicted destination | Departure point -current position route cost | Current position -candidate destination route cost | Departure point -candidate destination route cost | Detour degree calculation formula | Detour degree |
|---|---|---|---|---|---|
| Home | 300m | 500m | 400m | 300m+500m-400m | 400m |

FIG. 13

| Rank | Information provision party (phone number) | Provided information | Detour degree |
|---|---|---|---|
| 0 | None | None | Less than 1000 m |
| 1 | Guardian A (090-XXX-AAA) | Mobile object's current position information<br>Mobile object's traveling route information | Equal to or longer than 1000 m and less than 2000 m |
| 2 | Guardian A (090-XXX-AAA) | Alarm sound<br>Mobile object's current position information<br>Mobile object's traveling route information | Equal to or longer than 2000 m and less than 4000 m |
| 3 | Guardian A (090-XXX-AAA)<br>Guardian B (090-XXX-BBB) | Alarm sound<br>Mobile object's current position information<br>Mobile object's traveling route information | Equal to or longer than 4000 m and less than 6000 m |
| 4 | Guardian A (090-XXX-AAA)<br>Guardian B (090-XXX-BBB)<br>Teacher C (090-XXX-CCC) | Alarm sound<br>Mobile object's current position information<br>Mobile object's traveling route information | Equal to or longer than 6000 m and less than 8000 m |
| 5 | Guardian A (090-XXX-AAA)<br>Guardian B (090-XXX-BBB)<br>Teacher C (090-XXX-CCC)<br>Police (110) | Alarm sound<br>Mobile object's current position information<br>Mobile object's traveling route information | Equal to or longer than 8000 m |

FIG. 16A

| Node ID | Node position (longitude) | Node position (latitude) | Type | Connection node ID |
|---|---|---|---|---|
| 001 | 134.3.0.9 | 34.6.3.6 | Station (train) | 002,003, 004, 005 |
| 002 | 134.3.0.9 | 34.4.30.0 | Station (train) | 001,005, 006 |
| 003 | 134.3.0.9 | 34.7.36.0 | Bus stop | 001,007, 008 |
| 004 | 134.4.10.9 | 34.6.3.6 | Road | 001,006, 0009,010 |
| 005 | 134.2.20.9 | 34.6.3.6 | Road | 001,011, 012 |
| 006 | 134.4.10.9 | 34.5.30.0 | Road | 002,004, 013,014 |
| ... | | | | |

FIG. 16B

| Link ID | Start point node ID | End point node ID | Means of transportation | Link time period |
|---|---|---|---|---|
| 001 | 001 | 002 | Train | 5 minutes |
| 002 | 001 | 003 | Bus | 10 minutes |
| 003 | 001 | 004 | Walk | 25 minutes |
| 004 | 001 | 005 | Walk | 25 minutes |
| 005 | 002 | 006 | Walk | 50 minutes |
| ... | | | | |

FIG. 18

| Destination | Departure point-current position elapsed time | Current position-candidate destination required time | Departure point-candidate destination required time | Waiting time | Detour degree calculation formula | Detour degree |
|---|---|---|---|---|---|---|
| Station B | 30 minutes | 65 minutes | 75 minutes | 20 minutes | 30 minutes+65 minutes −75 minutes−20 minutes | 0 minutes |

FIG. 21

| ID | Detour degree |
|---|---|
| 001 | 1km |
| 002 | 0km |
| 003 | 1km |
| 004 | 3km |
| 005 | 2km |

FIG. 22

| Rank | Information provision party (phone number) | Provided information | Detour degree |
|---|---|---|---|
| 0 | None | None | Less than (average + 1 × standard deviation) |
| 1 | Guardian A(090-XXX-AAAA) | Mobile object's current position information | Equal to or greater than (average + 1 × standard deviation) and less than (average + 2 × standard deviation) |
| 2 | Guardian A(090-XXX-AAAA) | Alarm sound<br>Mobile object's current position information<br>Mobile object's traveling route information | Equal to or greater than (average + 2 × standard deviation) and less than (average + 3 × standard deviation) |
| 3 | Guardian A(090-XXX-AAAA)<br>Guardian B(090-XXX-BBBB) | Alarm sound<br>Mobile object's current position information<br>Mobile object's traveling route information | Equal to or greater than (average + 3 × standard deviation) and less than (average + 4 × standard deviation) |
| 4 | Guardian A(090-XXX-AAAA)<br>Guardian B(090-XXX-BBBB)<br>Teacher C(090-XXX-CCCC) | Alarm sound<br>Mobile object's current position information<br>Mobile object's traveling route information | Equal to or greater than (average + 4 × standard deviation) and less than (average + 5 × standard deviation) |
| 5 | Guardian A(090-XXX-AAAA)<br>Guardian B(090-XXX-BBBB)<br>Teacher C(090-XXX-CCCC)<br>Police (110) | Alarm sound<br>Mobile object's current position information<br>Mobile object's traveling route information | Equal to or greater than (average + 5 × standard deviation) and less than (average + 6 × standard deviation) |

FIG. 26

Schedule

| Time | Destination |
|---|---|
| 8:00~8:30 | "Home"⇒"Hana town 3 intersection"⇒"Hana town 1 intersection"⇒"Hana town primary school" |
| 8:30~16:30 | "Hana town primary school" |
| 16:30~17:00 | "Hana town primary school"⇒"Hana town 1 intersection"⇒"Hana town 2 intersection"⇒"Hana town cram school" |
| 17:00~19:00 | "Hana town cram school" |
| 19:00~19:30 | "Hana town cram school"⇒"Hana town 2 intersection"⇒"Hana town 3 intersection"⇒"Home" |
| 19:30~8:00 | "Home" |

FIG. 34
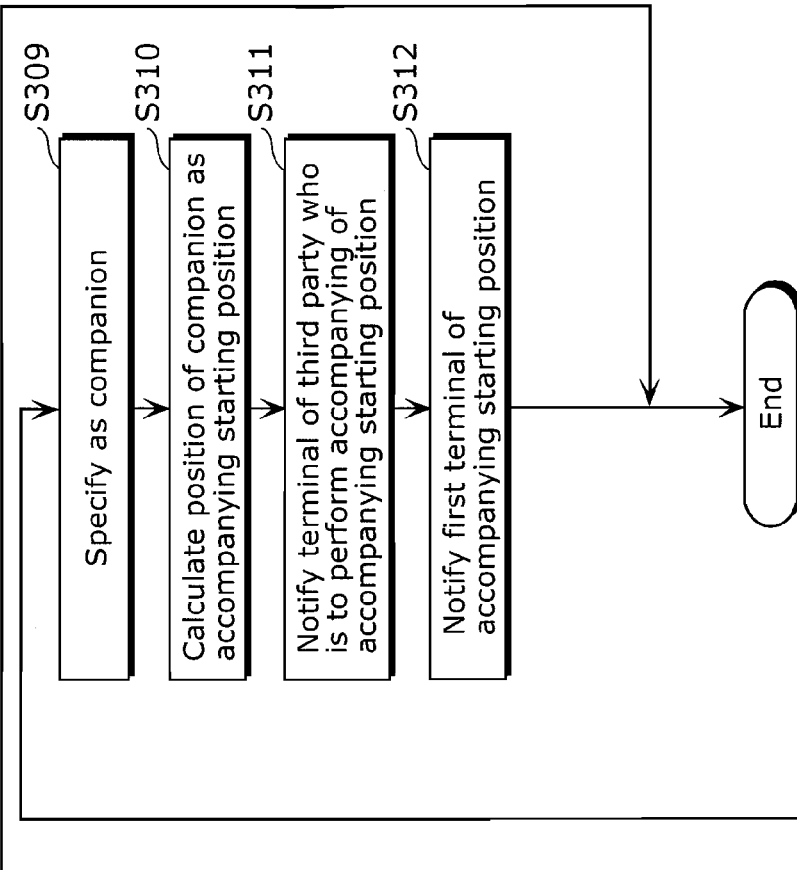
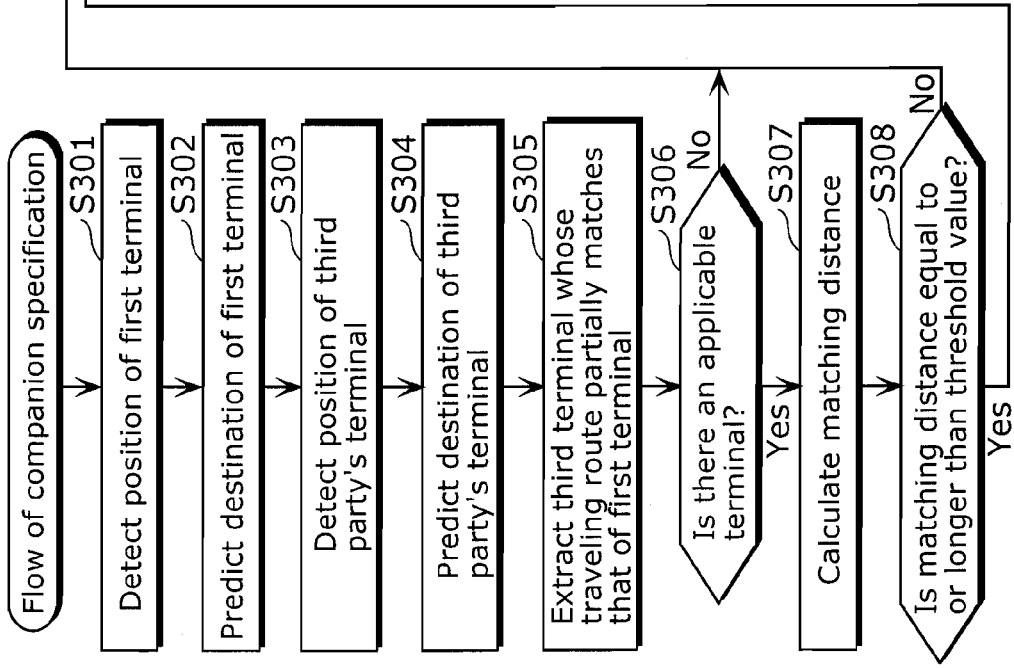

PARENTAL ALERT AND CHILD TRACKING DEVICE WHICH DETERMINES IF A CHILD HAS DEVIATED FROM A PREDICATED TRAVEL ROUTE

TECHNICAL FIELD

The present invention relates to a notification system, a notification device, and a notification method in which persons requiring the protection of a guardian and the like are made to carry a mobile terminal, and information and warnings regarding the position of the mobile terminal is notified to the guardian's terminal under certain conditions.

BACKGROUND ART

Conventionally, there are security systems for children which pre-set areas where they are permitted to travel, such as school zones, and transmit notifications of the children's current positions and the like when they move outside the permitted areas, since the situation is recognized as unusual (Refer to Patent Reference 1). With such systems, when a child moves outside the pre-set area such as a school zone, the possibility of being kidnapped, for example, is notified to those who care for the child such as parents, thus making it possible for crimes to be promptly notified.

Also, there are devices, made up of a base unit and a handset, for detecting a distance between these terminals, and notify, through a warning, the base unit or the handset that they have separated from each other when the distance becomes a predetermined distance or longer (Refer to Patent Reference 2). With these devices, in a situation where parents are letting their children to play in a park, for instance, it is possible to prevent the children from running out into a road, for example, by providing a notification to the terminals when they have separated from each other by the predetermined distance.

Patent Reference 1: Japanese Unexamined Patent Application Publication No. 2003-174396
Patent Reference 2: Japanese Unexamined Patent Application Publication No. 2003-109147

DISCLOSURE OF INVENTION

Problems that Invention is to Solve

The invention disclosed in Patent Reference 1, however, has a poor operability in some cases because the security function operates based on a judgment of whether or not the child is in the pre-set area, and thus the notification is sent every time the child moves outside the pre-set area. In some cases, it is preferable for the security function not to operate even when the child is outside the pre-set area, for example, in the case where he is traveling with a friend, teacher, and so on. Furthermore, with such an inconvenient device that sends a security warning and the like as soon as the child moves outside the pre-set area, the user eventually turns the security function off to avoid such operation, which could in turn result in a situation where the security function does not operate when it is really needed.

Moreover, the invention disclosed in Patent Reference 2 also has a poor operability because the warning is sent every time the detected distance between the base unit and the handset becomes the predetermined distance or longer, even when the exceeded distance is not so great. To make matters worse, the user eventually turns the security function off in some cases to avoid such operation, which could in turn result in a situation where the security function does not operate when it is really needed.

Means to Solve the Problems

In order to solve the above described problems, the notification system according to the present invention is a notification system for notifying a terminal of information regarding a position of a user having another terminal based on a traveling route of the user, the notification system comprising: a first position detection unit which detects a position of a first terminal used by a first user; a second position detection unit which detects a position of a second terminal used by a second user; and a notification control area determination unit which determines a notification control area based on the position detected by the second position detection unit, the notification control area being an area on a map and in which position information regarding the position of the first user is not notified.

Note that the present invention can be embodied not only as the above described notification system, but also as a notification device included in the notification system, a notification method having characteristic means of the notification system as steps, and a program which allows a computer to execute such steps. Furthermore, it is obvious that such a program can be distributed via recording media such as CD-ROMs, and via transmitting media such as the Internet.

Effects of the Invention

According to the notification system of the present invention, botheration for the user who receives the notification frequently is lessened, since the notification regarding the position of the first user who is a child, is suppressed during a predetermined time period. As a result, it is possible to prevent the situation where the user receiving the notification turns off the terminal, and to appropriately transmit a notification especially regarding protection for and security of the child and so on.

BRIEF DESCRIPTION OF DRAWINGS

FIG. 3A is a table showing, in numerical values, position information detected by a first position detection unit. (First Embodiment)

FIG. 3B is a table showing, in numerical values, position information detected by a second position detection unit. (First Embodiment)

FIG. 3C is a table showing, in numerical values, position information detected by a third position detection unit. (First Embodiment)

FIG. 12 is a table illustrating a method for calculating a detour degree in the case where the child A travels along the route shown in FIG. 11. (First Embodiment)

FIG. 13 is a table showing an example of information provision rules accumulated in an information provision rule accumulation unit. (First Embodiment)

FIG. 16A is a table showing information regarding each node accumulated in a map information accumulation unit. (First Embodiment)

FIG. 16B is a diagram showing information regarding each link connecting nodes. (First Embodiment)

FIG. 18 is a table showing details of the calculation involved in the method for calculating a detour degree shown in FIG. 17. (First Embodiment)

FIG. 21 is a table showing an example of a history of detour degrees, accumulated in the detour degree accumulation unit. (First Embodiment)

FIG. 22 is a table showing an example of information provision rules followed for controlling the notification based on averages and standard deviations calculated using a history of detour degrees. (First Embodiment)

FIG. 26 is a diagram showing an example of a schedule provided in a fourth destination prediction unit of a fourth terminal. (Second Embodiment)

FIG. 34 is a flow chart showing steps of processing performed in the case of specifying, as a companion, a third party who allows a longer accompanied traveling with the child A in terms of distance. (Second Embodiment)

| | Numerical References |
|---|---|
| 101 | First position detection unit |
| 102 | First position information transmission unit |
| 104 | First position information reception unit |
| 105 | Separation judgment unit |
| 106 | Notification control unit |
| 107 | Notification unit |
| 108 | Second position information reception unit |
| 109 | Third position information reception unit |
| 110 | Clock unit |
| 111 | Second position detection unit |
| 112 | Second position information transmission unit |
| 113 | Required-for-return time period calculation unit |
| 114 | Notification control area determination unit |
| 120 | First terminal |
| 121 | Second terminal |
| 122 | Server |
| 123 | Fourth terminal |
| 124 | Departure point detection unit |
| 125 | Route cost calculation unit |
| 126 | Detour degree calculation unit |
| 127 | Information provision rule accumulation unit |
| 128 | Arrival judgment unit 128 |
| 129 | Detour degree accumulation unit |
| 130 | Threshold calculation unit |
| 138 | First destination prediction unit |
| 141 | Third terminal |
| 142 | Third position detection unit |
| 143 | Third position information transmission unit |
| 144 | Map information accumulation unit |
| 145 | Fourth position detection unit |
| 146 | Fourth position information transmission unit |
| 147 | Fourth destination prediction unit |
| 148 | Fourth position information transmission unit |
| 149 | Companion specification unit |

-continued

| | Numerical References |
|---|---|
| 150 | Accompanying starting position calculation unit |
| 151 | Destination matching degree judgment unit |
| 152 | Traveling speed calculation unit |
| 153 | Maximum traveling speed calculation unit |

BEST MODE FOR CARRYING OUT THE INVENTION

First Embodiment

Figure 1:
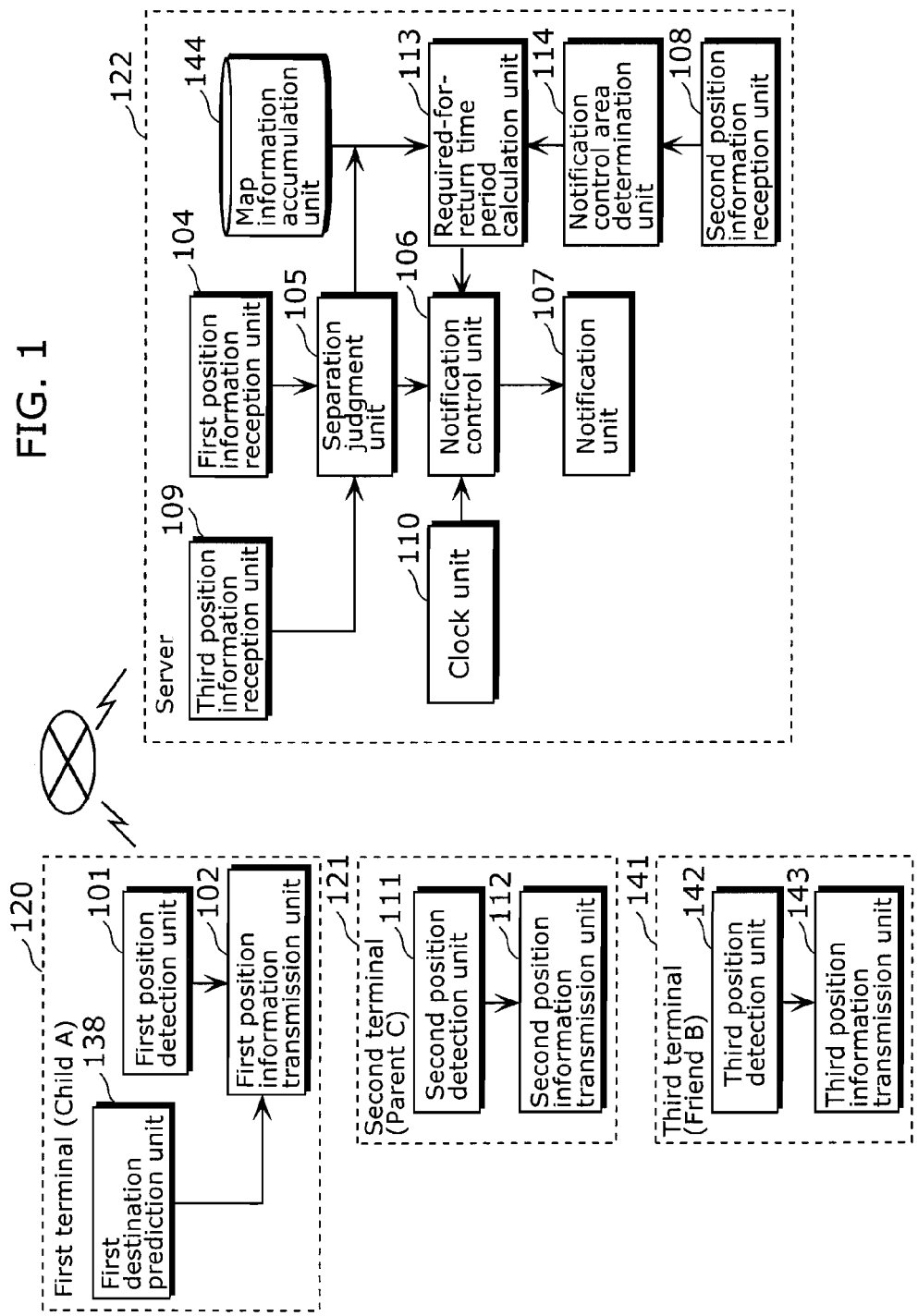
FIG. 1 is a system configuration diagram showing the entire configuration of the notification system of a first embodiment according to the present invention. (First Embodiment)

FIG. 1 is a system configuration diagram showing the entire configuration of the notification system of a first embodiment according to the present invention. A first terminal 120 is used by a child (hereinafter referred to as child A), for example. It is a device which detects the positions of the child as he travels, and includes a first position detection unit 101, a first position information transmission unit 102, and a first destination prediction unit 138.

A second terminal 121 is used by a parent (hereinafter referred to as parent C), for example, and includes a second position detection unit 111 and a second position information transmission unit 112.

A third terminal 141 is used by a friend of the child A (hereinafter referred to as friend B), for example, and includes a third position detection unit 142 and a third position information transmission unit 143.

A server 122 includes a first position information reception unit 104, a separation judgment unit 105, a notification control unit 106, a notification unit 107, a second position information reception unit 108, a third position information reception unit 109, a clock unit 110, a required-for-return time period calculation unit 113, a notification control area determination unit 114, and a map information accumulation unit 144.

The first position detection unit 101, the second position detection unit 111, and the third position detection unit 142 are means for detecting the current positions of the first terminal, the second terminal, and the third terminal, respectively. They include, for example, a Global Positioning System (GPS) antenna and the like, and detect latitude and longitude information indicating the current positions of the respective users.

Figure 2:
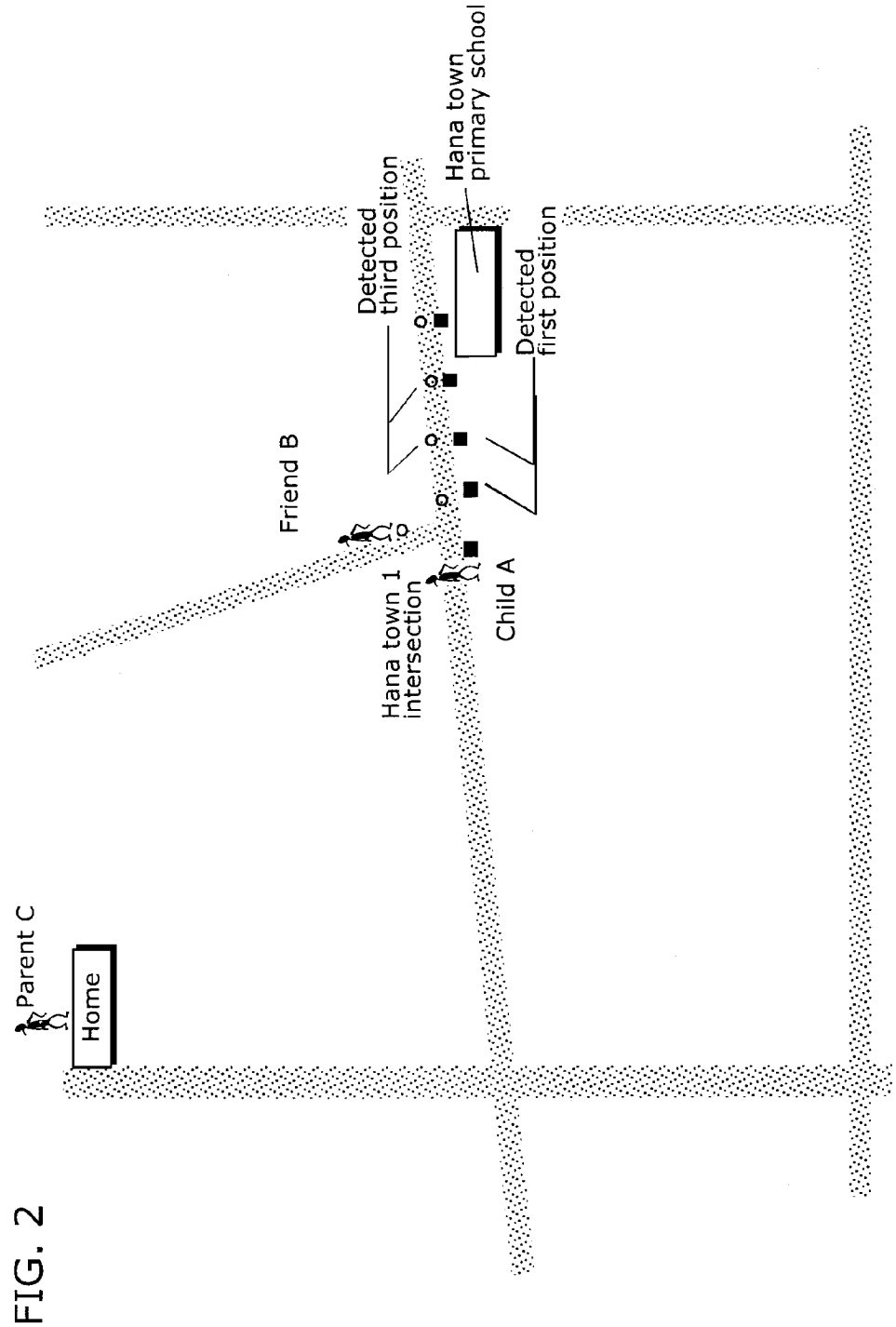
FIG. 2 is a diagram showing the positions of a child A, a parent C, and a friend B using a first terminal, a second terminal, and a third terminal, respectively. (First Embodiment)

FIG. 2 is a diagram showing the positions of the child A using the first terminal 120, the parent C using the second terminal 121, and the friend B using the third terminal 141. The figure shows on a map the child A's and the friend B's travel from Hana town primary school to their homes. The figure also shows that the parent C is at home. As the users of the terminals travel, the first position detection unit 101, the second position detection unit 111, and the third position detection unit 142 detect the positions of the first terminal, the second terminal, and the third terminal, respectively, at predetermined time intervals. In this figure, the position information detected by the first terminal 120 is represented by squares, whereas the position information detected by the third terminal 141 is represented by circles. Note that the symbol for the parent C's the position information is omitted since the parent C is assumed to be at home. Since the GPS and the like cannot detect indoor positions, the parent C can be detected to be at home by, for example, a predetermined sensor equipped indoors, or, the parent C can be judged to be at home by checking the outdoor position information of the parent C detected last by the GPS against map information.

Further, the first destination prediction unit 138 of the first terminal 120 is a means for predicting a destination of the first terminal 120. Mobile phones and the like often have a schedule book installed, and it is assumed here that a future destination of the first terminal 120 is predicted using, for instance, the schedule book. Alternatively, the traveling direction may be linearly predicted based on the position information detected so far. Furthermore, the position information detected so far may be accumulated as a history so that the future destination to be traveled to after a predetermined time period is predicted based on the history. Then the first destination prediction unit 138 transmits the predicted destination to the server 122 through the first position information transmission unit 102. Here, it is assumed that the route to the home is predicted as the destination of the child A using the first terminal 120.

FIG. 3A, FIG. 3B, and FIG. 3C are tables showing, in numerical values, position information detected by the first position detection unit 101, the second position detection unit 111, and the third position detection unit 142, respectively. The first position detection unit 101, the second position detection unit 111, and the third position detection unit 142 having the GPS, for example, detect the position information using latitudes and longitudes.

The first position information transmission unit 102, the second position information transmission unit 112, and the third position information transmission unit 143 are means for transmitting the position information detected by their respective terminals to the server 122 through communication lines. Then the position information is received by the first position information reception unit 104, the second position information reception unit 108, and the third position information reception unit 109 included in the server 122, and the server 122 performs a series of processing illustrated in the present embodiment.

The separation judgment unit 105 is a means for making a separation judgment which is a judgment on whether or not the first terminal 120 and the third terminal 141 have separated from each other, based on the position information of each terminal received by the above mentioned first position information reception unit 104 and the third position information reception unit 109. The separation judgment unit 105 judges whether or not the child A is within a predetermined area having 100 meter (m) or the like in radius and centering on the position of the third terminal 141, for example, (hereinafter referred to as notification control area), and judges that the child A has separated from the friend B when the child A is outside the notification control area.

Figure 4:
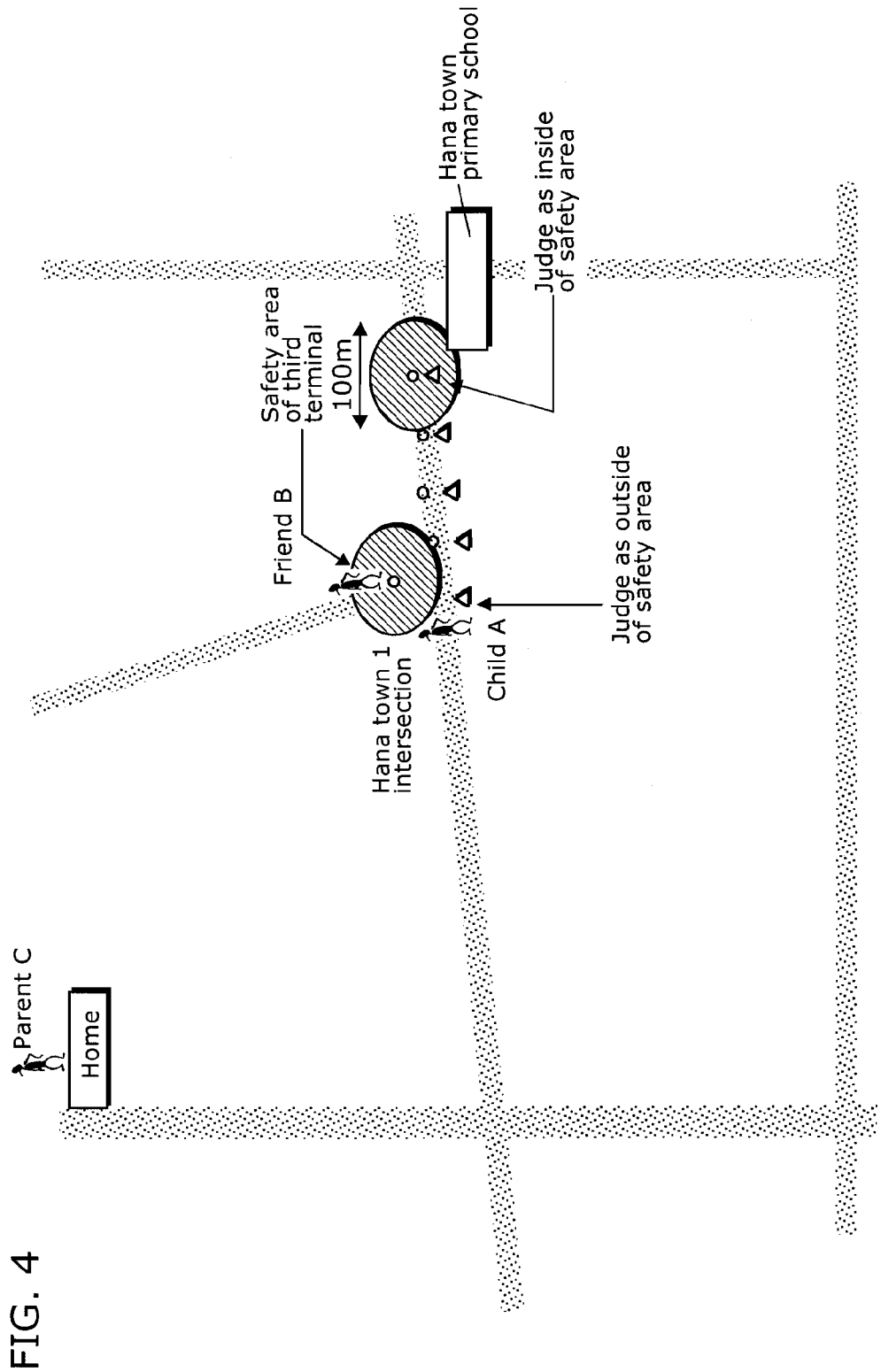
FIG. 4 is a diagram showing a relationship between a child's travel and a safety area, as in FIG. 2. (First Embodiment)

FIG. 4 is a diagram showing a relationship between the child's travel and safety areas, as in FIG. 2. In FIG. 4, the notification control areas are represented by circles with a hatching pattern. The child A who departed Hana town primary school is on the way home with the friend B, and therefore the child A is judged to be within the notification control area of the friend B for a while. However, at the Hana town 1 intersection, the child A travels straight forward while the friend B turns right, and thus they are going to walk separately along different streets. Here, the child A using the first terminal 120 separates from the notification control area of the friend B using the third terminal 141, and this is judged as separation.

The notification unit 107 is a means for notifying, under the control of the notification control unit 106, the parent C using the second terminal 121 and a third party registered in advance, such as a patrol for children, of the current position and so on of the child A when the child A using the first terminal 120 is recognized to be in a dangerous situation by becoming alone after separation from the friend B.

Figure 5:
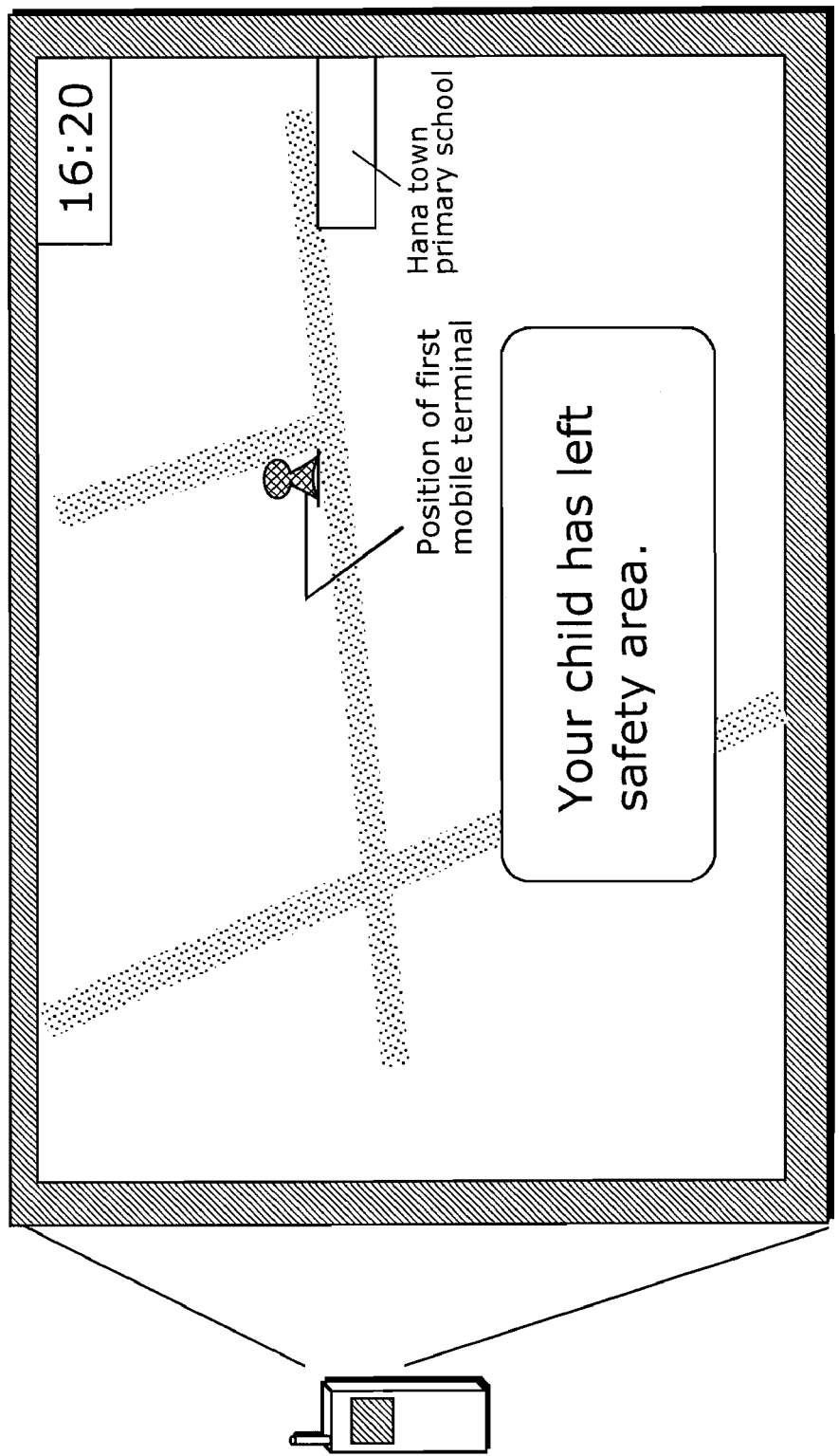
FIG. 5 is a diagram showing an example of a notification transmitted by a notification unit to the second terminal used by the parent, for example, notifying that the child A has left the notification control area of the friend B. (First Embodiment)

FIG. 5 is a diagram showing an example of a notification transmitted by the notification unit 107 to the second terminal 121 used by the parent C, for example, notifying that the child A has left the notification control area of the friend B. The screen of the mobile phone displays a message that the child A has left the notification control area and a map showing the child A's current position information.

Generally speaking, children are kidnapped or face dangerous situation when they are alone. This is because criminals often wait until a child becomes alone. In addition, they commit crimes even in school zones which are familiar to children, which indicates that whether or not the children are alone matters more than the geographic factor, with respect to posing risks to the children. In view of the foregoing, according to the present invention, the position information is notified based on a trigger, namely, a judgment made by the separation judgment unit 105 on whether or not a child has separated from a friend.

However, recognizing the child to be in a dangerous situation and transmitting the notification every time the child starts to go home alone after separating from a friend results in a poor operability. For example, when the child is with a friend, but accidentally moves out of the notification control area of the friend by a slight distance, a misoperation occurs that the notification is immediately transmitted. That is to say, the notification as shown in FIG. 5 is transmitted every time the child leaves the notification control area. In such a case, the parent C may eventually stop the security function by turning off the device, for example, in order to avoid the misoperation, which could in turn result in a situation where the function does not operate when it is really needed. Notifying the position information and the like for the purpose of ensuring the child's safety is necessary, however on the other hand, frequent unnecessary notification in riskless situations is troublesome, and the notification is, in some cases, desired to be kept at necessity minimum.

In view of the foregoing, the notification system of the present embodiment is that: the second terminal 121 used by a parent at home, for example, is detected; a time period required to arrive at the notification control area of the second terminal 121 (hereinafter referred to as required-for-return time period) is calculated; and the notification is transmitted when the child does not arrive at the notification control area even after the required-for-return time period elapses. In the present example, the parent C using the second terminal 121 is at home, therefore the required-for-return time period, that is, in this case, a time period required for coming home, is calculated, and the notification is transmitted when the child does not come home even after the required-for-return time period elapses.

The second position information reception unit 108 is a means for receiving the position information of the second terminal 121 detected.

The notification control area determination unit 114 is equivalent to a notification control area determination unit which determines a notification control area based on the position detected by the second position detection unit, the notification control area being an area on a map and in which position information regarding the position of the first user is not notified. The notification control area determination unit 114 determines the notification control area based on the position of the second terminal 121 received by the second position information reception unit 108. Furthermore, the required-for-return time period calculation unit 113 is a means for calculating a time period required to arrive at the detected position of the second terminal 121. Then the notification control unit 106 controls the notification based on time indicated by the clock unit 110 and the required-for-return time period calculated by the required-for-return time period calculation unit 113. It is assumed, for example, that the required-for-return time period is calculated based on map information accumulated in the map information accumulation unit 144. Hereinafter, description is provided using a specific example.

Figure 6:
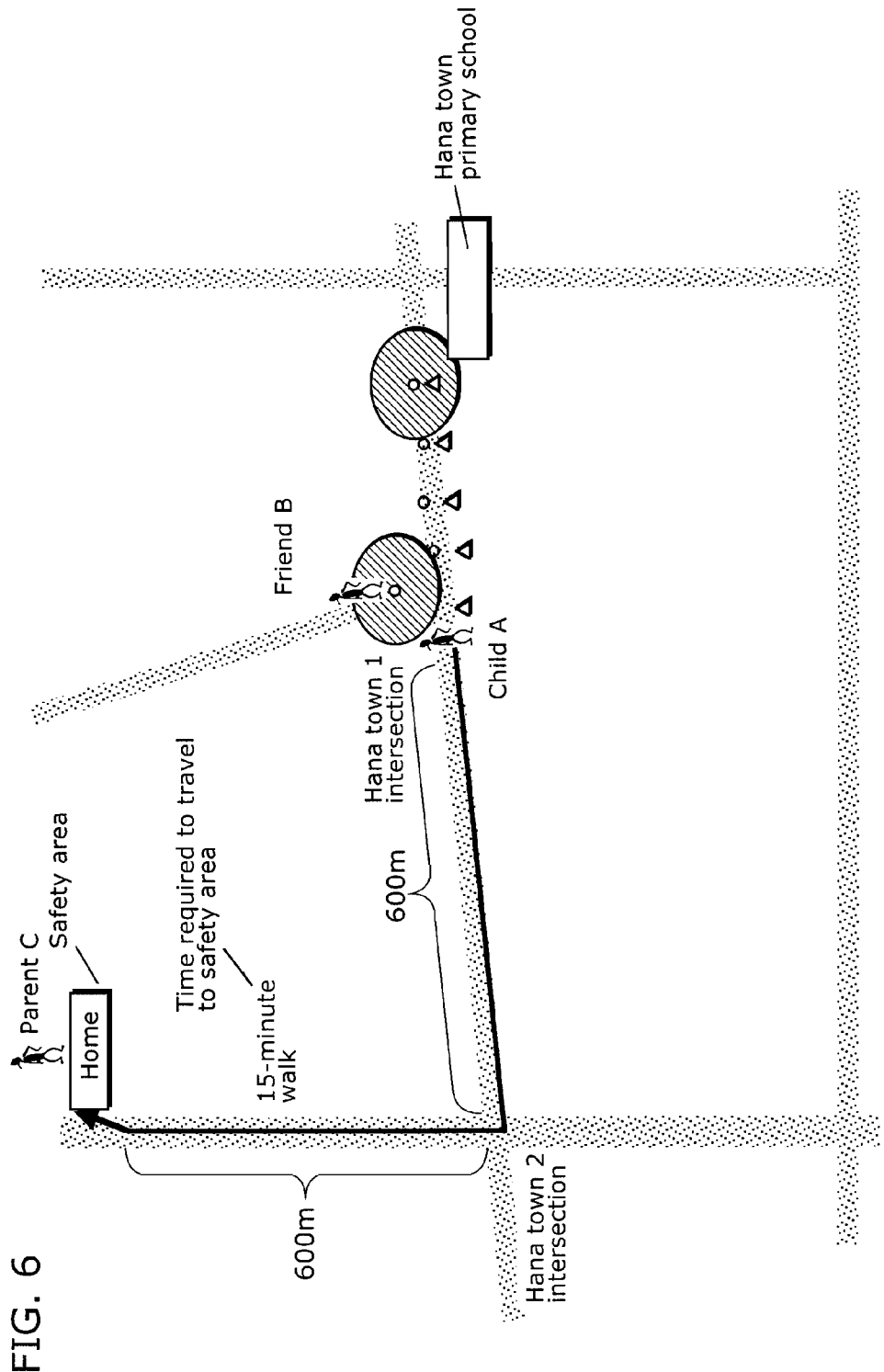
FIG. 6 is a diagram showing a relationship between the child A's traveling route to home and a required-for-return time period required to go home after leaving the notification control area of the friend B, and is a map showing, as in FIG. 4, that the child A has separated from the friend B at the Hana town 1 intersection. (First Embodiment)

FIG. 6 is a diagram showing a relationship between the child A's traveling route to home and a required-for-return time period required to go home after leaving the notification control area of the friend B, and is a map showing, as in FIG. 4, that the child A has separated from the friend B at the Hana town 1 intersection. As in FIG. 4, FIG. 6 shows that the child A has separated from the friend B using the third terminal 141, and thus left the notification control area of the friend B. At this point, the notification control area determination unit 114 determines the notification control area of the second terminal 121 based on the position of the second terminal 121 used by the parent C received by the second position information reception unit 108. In the present example, it is assumed that the parent C is at home and the home is determined as the notification control area. Furthermore, the required-for-return time period calculation unit 113 calculates a time period required to arrive home. For example, it is assumed that the total traveling time period required is calculated based on a time period (route cost) required to arrive home using a given route indicated in map information accumulated in the map information accumulation unit 144.

The accumulated map information generally includes nodes of intersections, facilities and so on and links between the nodes (referred to as road network). Further, the road network generally includes costs required to travel between the nodes, represented by distances and required traveling time periods. The map information illustrated in the present invention is assumed to also include the road network, for example. For example, FIG. 6 shows that the distance between the "Hana town 1 intersection" and the "Hana town 2 intersection" is 600 m. FIG. 6 also shows that the distance between the "Hana town 2 intersection" and "home" is 600 m. The general walking speed is 80 m per minute (min.), and thus it is calculated here that it takes 15 minutes to walk home (1200 m÷80 m/min.). Thus, the notification control unit 106 controls notification so that no notification is transmitted within the next 15 minutes even though the child A has left the notification control area of the friend B, since it is estimated that the child A will go home within the next 15 minutes. From the viewpoint of child's security, there are cases where it is desirable to transmit the notification and warnings to the parent every time the child becomes alone. However, with such a system, the parent may eventually turn off the security function because the notification ends up being frequently transmitted even when the child is alone for a little while, and this could in turn result in a situation where the security function does not operate when it is really needed. In consideration to this, the notification system of the present embodiment also has an advantageous effect of preventing the misoperation by purposely not transmitting the notification since the child A is on the way home although he has become alone by separating from the friend B.

However, the notification is transmitted in the case where the child A does not arrive home, that is, the notification control area, even after 15 minutes. In the case where the child who is expected to go home usually in 15 minutes does not arrive home even after 15 minutes, there is a high possibility that something unusual has happened. Therefore in the present embodiment, the notification is transmitted when the required-for-return time period has elapsed.

Figure 7:
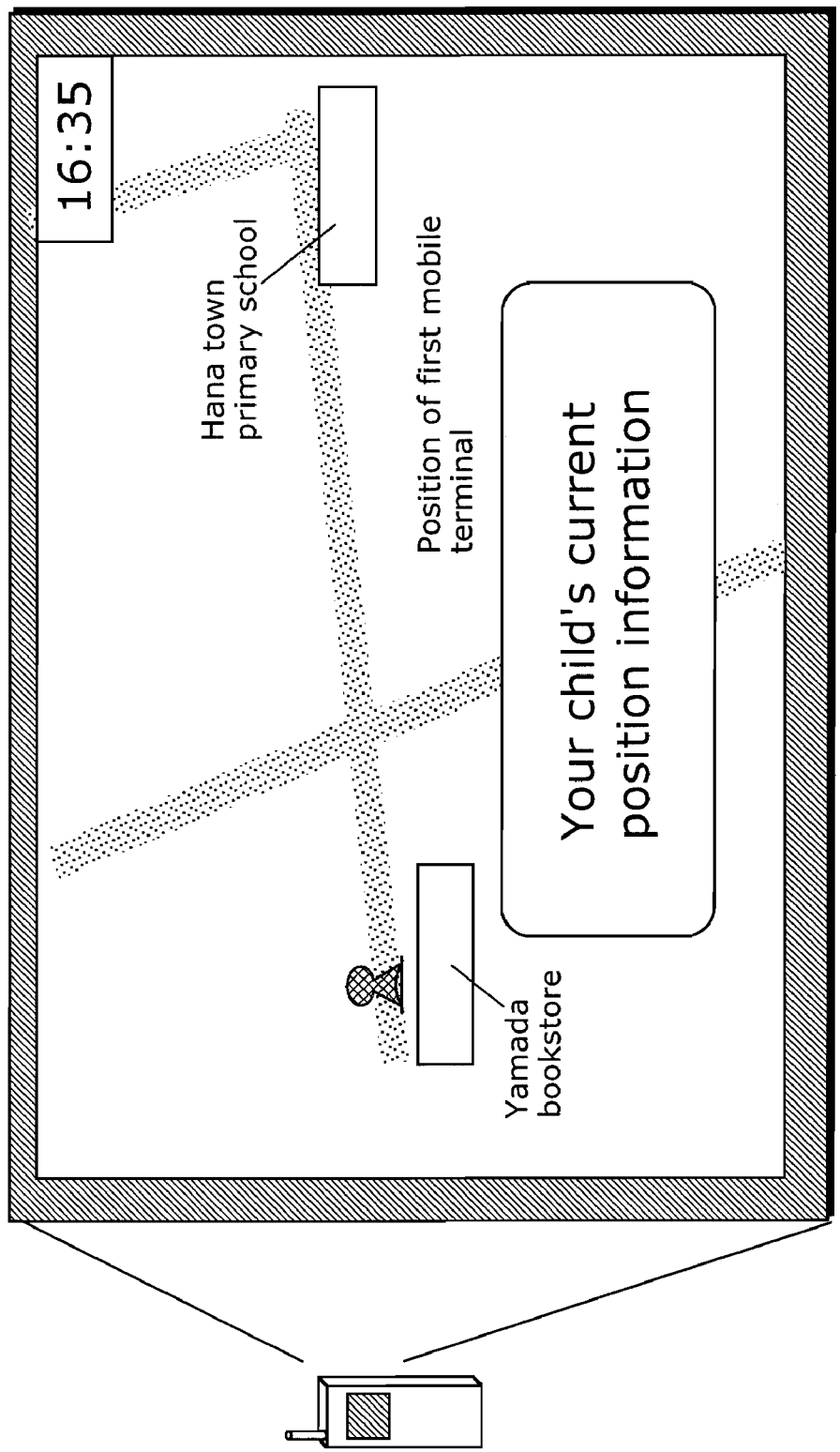
FIG. 7 is a diagram showing an example of notifying the parent's terminal (the second terminal) of the child A's position information and the situation that the child A has not arrived home even though the required-for-return time period, that is 15 minutes, has elapsed since the child A has separated from the friend B. (First Embodiment)

FIG. 7 is a diagram showing an example of notifying the parent's terminal (the second terminal 121) of the child A's position information and the situation that the child A has not arrived home even though the required-for-return time period, that is 15 minutes, has elapsed since the child A has separated from the friend B. FIG. 7 shows that the child A has traveled straight forward at the Hana town 2 intersection and is now at the Yamada bookstore.

Note that with respect to the security function from the viewpoint of fail-safe, it is more desirable, as described above, to transmit the notification every time the child becomes alone. Thus, the parent can be first notified of the child's position information and the like, as in FIG. 5, when the child A becomes alone after leaving the notification control area of the friend B, and then the parent can be notified again, as in FIG. 7, when the child A does not arrive home even after the required-for-return time period elapses.

Note that although the required-for-return time period is calculated based on traveling routes in the present embodiment, the present invention is not limited to this. For example, the parent or the like may set the required-for-return time period, as appropriate. Alternatively, the traveling speed of the child using the terminal may be taken into consideration. The traveling speed is not necessarily constant, and it depends on each child. Especially from the viewpoint of the security function, more accurate calculation of the required-for-return time period is required in some cases. Therefore, depending on the child using the terminal, the required-for-return time period may be calculated with the traveling speed taken into consideration. Furthermore, children do not necessarily go home at a constant speed; they often take a side trip or make a stop along the way. Therefore, the required-for-return time period may be calculated with a predetermined permissible time period taken into consideration.

Figure 8:
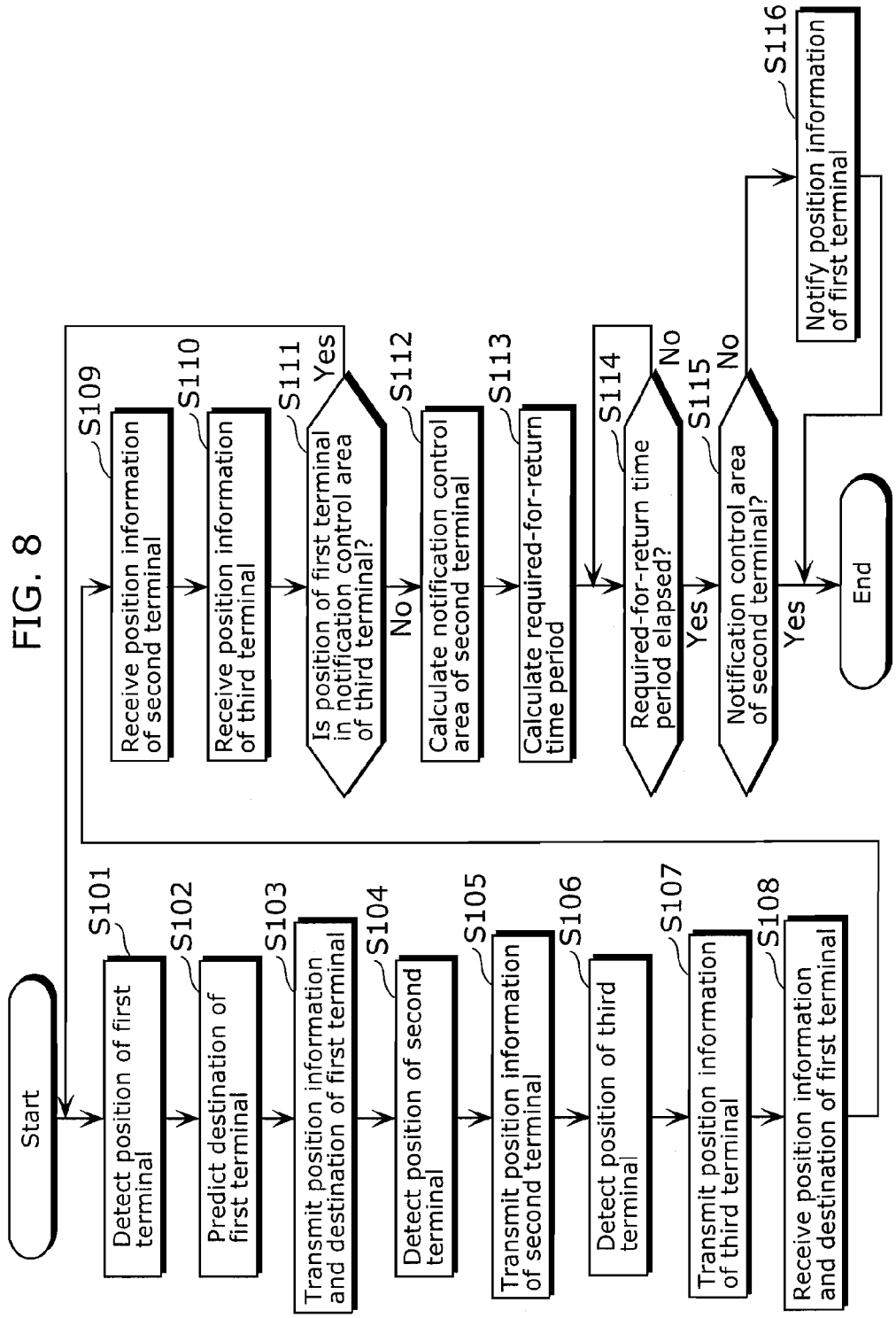
FIG. 8 is a flow chart showing steps of processing performed for controlling notification regarding the position of the child A based on a required-for-return time period through a trigger that the child A has left the notification control area of the friend B. (First Embodiment)

FIG. 8 is a flow chart showing steps of processing performed for controlling notification regarding the position of the child A based on a required-for-return time period through a trigger that the child A has left the notification control area of the friend B. The operation flow illustrated in the present embodiment shall be described with reference to the flow chart shown in FIG. 8.

At first, the first position detection unit 101 detects position information of the first terminal 120 (Step S101). Also, the first destination prediction unit 138 predicts a destination of the first terminal 120 (Step S102). Then the first position information transmission unit 102 transmits the position information and the predicted destination (final destination) to the server 122 (Step S103). Likewise, the second position detection unit 111 detects position information of the second terminal 121 (Step S104). The detected position information of the second terminal 121 is transmitted to the server 122 (Step S105). Likewise, position information of the third terminal 141 is detected (Step S106), and is transmitted to the server 122 (Step S107).

On the server 122 side, the position information and the predicted destination of the first terminal 120 are received (Step S108). Likewise, the position information of the second terminal 121 is received (Step S109). Further, the position information of the third terminal 124 is also received (Step S110).

Next, it is judged whether or not the position of the first terminal 120 is in the notification control area of the third terminal 141 (Step S111), and in the case of judging that it is in the notification control area of the third terminal 141 (Yes in Step S111), the process returns to Step S101 to detect the position of the first terminal 120. On the other hand, in the case of judging that the position of the first terminal 120 is outside the notification control area of the third terminal 141 (No in Step S111), the notification control area determination unit 114 calculates the notification control area of the second terminal 121 based on the position of the second terminal 121 received by the second position information reception unit 108 (Step S112). In the present embodiment, the destination of the child A is predicted to be the child A's home for example, and the parent C using the second terminal 121 is at the home. Therefore, the home is calculated as the notification control area. Next, the required-for-return time period calculation unit 113 calculates a time period required to arrive home (Step S113). Then the notification control unit 106 judges whether or not the required time period has elapsed (Step S114). In the case of judging that the required time period has not elapsed (No in Step S114), the loop is repeated. On the other hand, in the case of judging that the required time period has elapsed (Yes in Step S114), it is then judged whether or not the current position is in the notification control area (that is, home) (Step S115). Then the process ends in the case of judging that the first terminal 120 has arrived at a safe place, that is, the notification control area (home) (Yes in Step S115). On the other hand, in the case of judging that the first terminal 120 has not arrived at a safe place (No in Step S115), the notification unit 107 transmits a notification of position information (Step S116).

(Minimum Configuration)

Note that in the present embodiment the third terminal 141 is added to the system so that the judgment on whether or not the first terminal 120 has separated from the third terminal 141 is made based on the positional relationship between the first terminal 120 and the third terminal 141, and that the notification is controlled by calculating the required-for-return time period when the first terminal 120 is judged to have separated from the third terminal 141. That is, the separation judgment serves as a trigger for the notification control. In other words, when the child A has separated from the friend B using the third terminal 141, the notification is controlled by automatically calculating a time period required for the child A to go home where the parent C is. This is because being alone is the biggest factor that poses risks to children. However, the trigger for the notification control is not limited to this. For example, the notification may be controlled by the child A and parent C themselves, or at any given timing, and thus the third terminal 141 or the like is not essential in the configuration. For example, the child A using the first terminal 120 may operate the notification control on the way home, and the notification may be transmitted when the child A is not going to come home where the parent C is within the required-for-return time period.

In addition, in the present embodiment, the position information detected by each terminal is once transmitted to the server to perform the series of processing on the server side. This is because each processing sometimes results in an enormous amount of calculation, and in some cases it is unsuitable for the terminals having limited electric power to perform all the processing, and more preferable for the terminals to perform minimum processing of detecting their own positions and for the server to perform the series of processing. However, the present invention is not limited to this configuration. For example, the present invention may have a minimum system configuration that only includes the first terminal 120 and the second terminal 121. For example, the first terminal 120 used by the child A may detect the position information of the second terminal 121 used by the parent C, so that the required-for-return time period calculation unit 113 calculates a time period required to arrive where the parent C is and that the notification is controlled using the calculated time period. For example, while the system configuration that includes the server and terminals is likely to result in a huge-sized system entailing a high cost and a complex introduction and maintenance, the device that includes only the first terminal 120 used by a child and the second terminal 121 used by a parent involves a relatively simple system without a high cost, yet appropriately achieves the security function for children. In view of the above aspects, the present invention can be implemented with constituent elements shown in FIG. 9.

Figure 9:
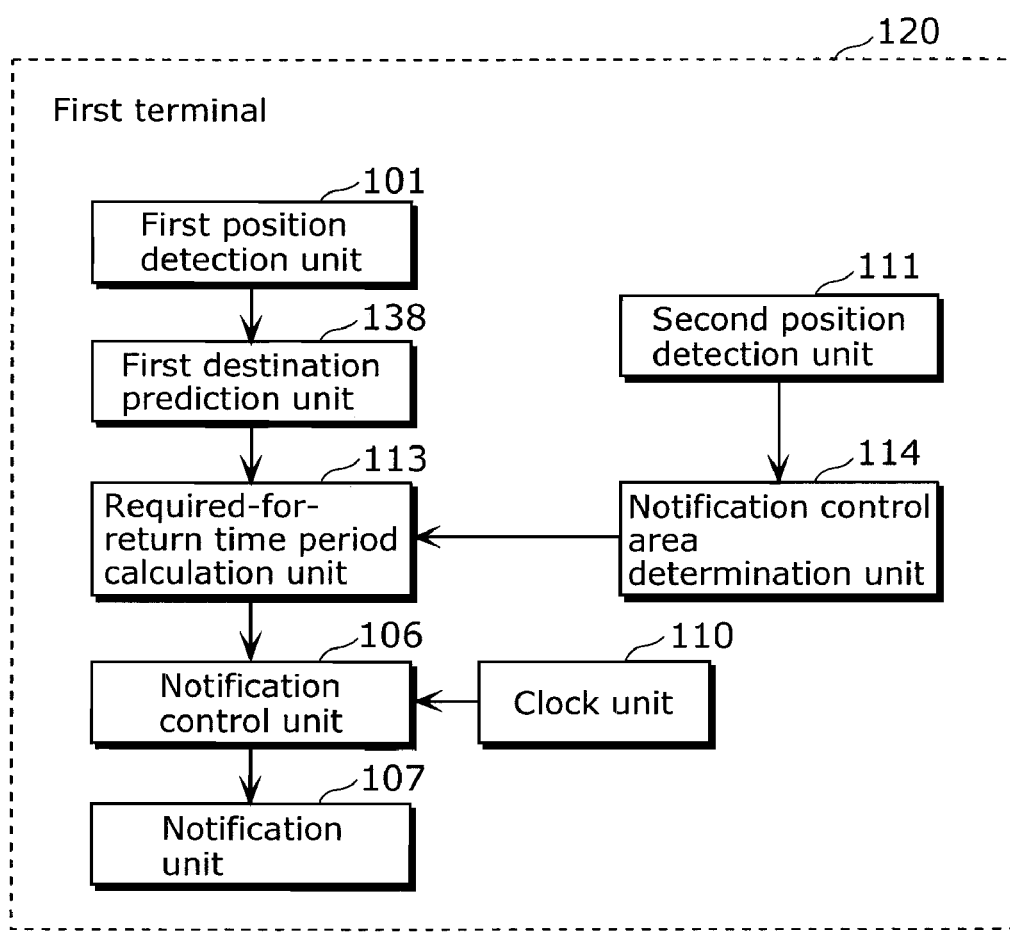
FIG. 9 is a block diagram showing a minimum configuration of the first terminal for controlling notification by a system including only the first terminal used by the child and the second terminal used by the parent. (First Embodiment)

FIG. 9 is a block diagram showing a minimum configuration of the first terminal 120 for controlling notification by a system including only the first terminal 120 used by the child and the second terminal 121 used by the parent. The notification system according to the present invention is a notification system for notifying a terminal of information regarding a position of a user having another terminal based on a traveling route of the user, the notification system comprising: a first position detection unit which detects a position of a first terminal used by a first user; a second position detection unit which detects a position of a second terminal used by a second user; a notification control area determination unit which determines a notification control area based on the position detected by the second position detection unit, the notification control area being an area on a map and in which position information regarding the position of the first user is not notified; a traveling route prediction unit which predicts a traveling route from a current position to the notification control area, that is, a traveling route to be traveled by the first user from a current time onward; a required-for-return time period calculation unit which calculates a required-for-return time period representing a time period required for arriving at the notification control area in the case where the first user travels along the traveling route predicted by the traveling route prediction unit; and a notification control unit which permits the notification of the position information regarding the position of the first user in the case where the required-for-return time period has elapsed from the current time and the first user has not arrived at the notification control area, and suppresses the notification of the position information regarding the position of the first user in the case where the required-for-return time period has not elapsed from the current time. The first position detection unit 101 is equivalent to the first position detection unit which detects a position of a first terminal used by a first user. The second position detection unit 111 is equivalent to the second position detection unit which detects a position of a second terminal used by a second user. The first destination prediction unit 138 is equivalent to the traveling route prediction unit which predicts a traveling route from a current position to the notification control area, that is, a traveling route to be traveled by the first user from a current time onward. Further, the required-for-return time period calculation unit 113 is equivalent to the required-for-return time period calculation unit which calculates a required-for-return time period representing a time period required for arriving at the notification control area in the case where the first user travels along the traveling route predicted by the traveling route prediction unit. The notification control unit 106 is equivalent to the notification control unit which permits the notification of the position information regarding the position of the first user in the case where the required-for-return time period has elapsed from the current time and the first user has not arrived at the notification control area, and suppresses the notification of the position information regarding the position of the first user in the case where the required-for-return time period has not elapsed from the current time.

In other words, the first terminal 120 detects the position information of the child A through the first position detection unit 101, and predicts a destination of the child A through the first destination prediction unit 138. Meanwhile, the first terminal 120 detects the position information of the second terminal 121 used by the parent C through the second position detection unit 111, and determines a notification control area through the notification control area determination unit 114. Furthermore, the first terminal 120 performs the following: calculates a required-for-return time period required to arrive at the notification control area through the required-for-return time period calculation unit 113; detects the current time through the clock unit 110; judges whether or not the required-for-return time period has elapsed since the notification control has started, through the notification control unit 106; transmits a notification of information regarding the position of the first terminal 120 through the notification unit 107 in the case of judging that the required-for-return time period has elapsed; and controls notification so that the notification is not transmitted in the case of judging that the required-for-return time period has not elapsed. This configuration achieves a system that involves the minimum cost and so on, and yet implements the security function.

Note that in the present embodiment the notification unit 107 notifies the parent and the third party who cares for the child, of the child's position information after a required-for-return time period elapses. In the case where the child does not come home even after the required-for-return time period elapses, the child may be in a dangerous situation, such as being kidnapped, and therefore, notifying the parent or those who care for the child, of the child's position information allows them to be immediately informed of the danger. Here, instead of notifying them of the position after the required-for-return time period elapses, the position information may start to be accumulated then. The child not coming home even after the lapse of the required-for-return time period may be because the child is taking a side trip, for example. In such a case, the position information may be accumulated in the server or the like, instead of being notified to the parent as a notification notifying an unusual situation. This makes it possible to check the child's traveling history later on.

Otherwise, at the time of the notification, changes in the level of attracting attention may be controlled. It is assumed for example that the position information of the child using the first terminal 120 is notified to the parent using the second terminal 121 basically at predetermined intervals. In such a case, notification constantly attracting the parent's attention can be troublesome sometimes. Therefore, it is assumed for example that the basic notification of the child's position information is transmitted through an email. Meanwhile, the mode and level of notification may be controlled so that in the case where the child does not come home even after the lapse of the required-for-return time period, a voice notification is transmitted to attract the parent's attention, for example.

(First Variation) (Detour Degree)

Note that in the above embodiment, the required-for-return time period required to arrive at the position of the parent using the second terminal 121 is calculated based on a route cost required for the predicted traveling route. Specifically, as shown in FIG. 6, the route between the Hana town 2 intersection where the child A turns right and the child A's home is predicted as the child A's traveling route, and the time period required for this route is calculated to be 15 minutes based on map information. This time period is referred to as the required-for-return time period. However, the user may take a route other than the predicted route or the shortest route. Especially in the case where the user is a child, for example, the child takes various traveling routes to satisfy his or her curiosity or to talk with friends, and thus the child has many traveling routes to choose from to arrive at the final destination. Anyone experiences, for example, a situation where he wants to take a path different from the usual path for a change, or decides to take a different path to allow more time for conversation with a friend traveling to a different place. Therefore, it is inappropriate in some cases to restrict the traveling route to a single route that has been predicted or to the single shortest route to a predicted destination, and to control the information notification using a required-for-return time period calculated based on the restricted traveling route. In view of the foregoing, the present variation shall describe an approach for controlling the information notification using a detour degree indicating how far the user is detouring. The detour degree is calculated based on a route cost required to arrive at the user's destination from a departure point and a route cost required to arrive at the user's destination from the departure point via the current position.

Figure 10:
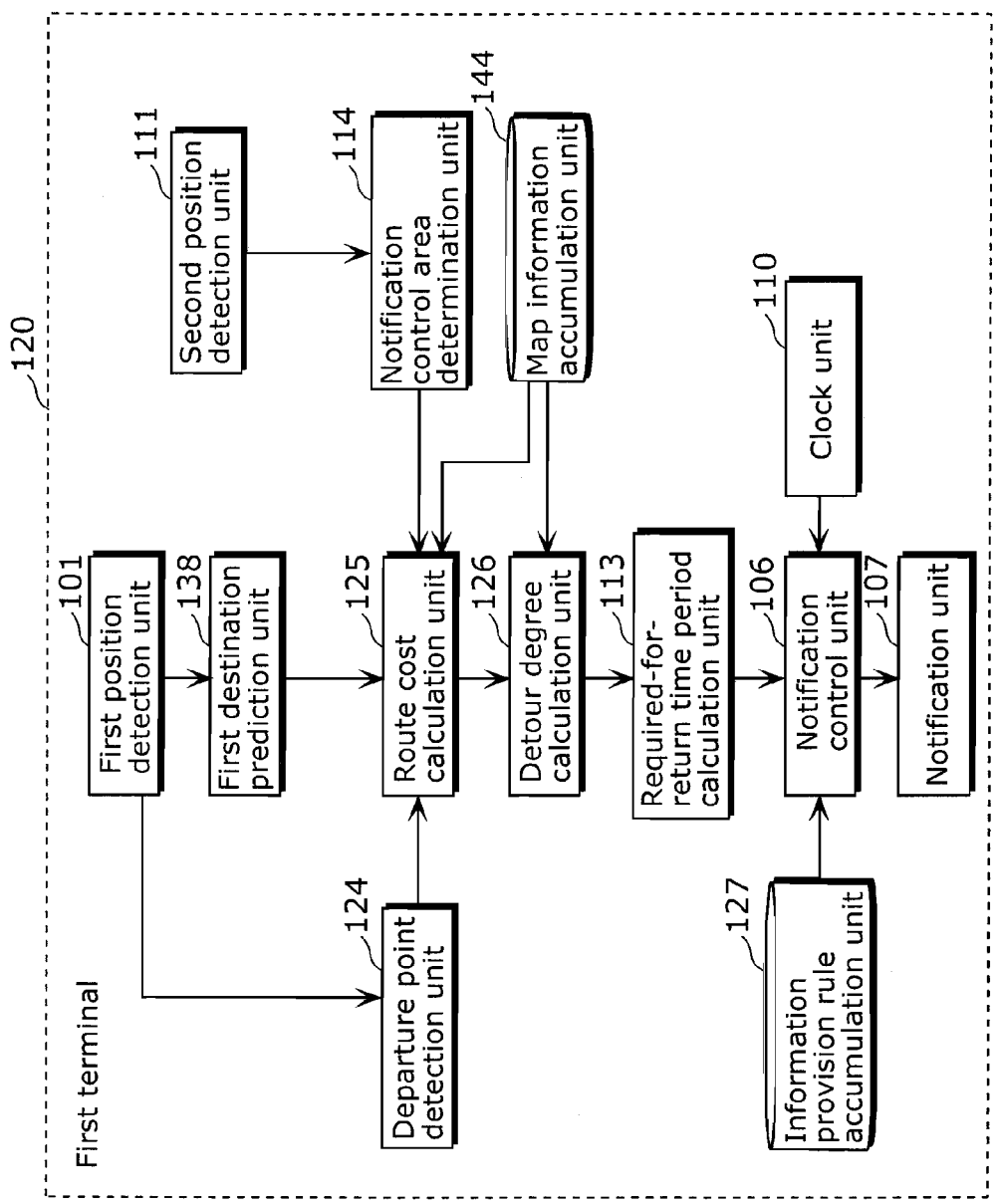
FIG. 10 is a diagram showing a system configuration for implementing a variation of the first embodiment. (First Embodiment)

FIG. 10 is a diagram showing a system configuration for implementing the present variation. Constituent elements in the figure that are illustrated in the above embodiment are given the same numerical references. This system includes the first position detection unit 101, the first destination prediction unit 138, a departure point detection unit 124, a route cost calculation unit 125, a detour degree calculation unit 126, the required-for-return time period calculation unit 113, the notification control unit 106, the notification unit 107, the clock unit 110, an information provision rule accumulation unit 127, the second position detection unit 111, the notification control area determination unit 114, and the map information accumulation unit 144.

In this case, the detour degree calculation unit 126 is equivalent to a detour degree calculation unit which calculates a detour degree indicating how far the first user is detouring towards a destination of the first user, based on the traveling route of the first user predicted by the traveling route prediction unit and the position information of the first user detected by the first position detection unit. Further, the information provision rule accumulation unit 127 is equivalent to an information notification rule accumulation unit in which an information notification rule is accumulated in accordance with the calculated detour degree, the information notification regarding either a detail of a notification transmitted to the second terminal or a party other than the second terminal to whom the notification is transmitted. The notification control unit 106, equivalent to the notification control unit, refers to the information notification rule and changes either the detail of the notification or the party to whom the notification is transmitted, in accordance with the detour degree calculated by the detour degree calculation unit.

Furthermore, the departure point detection unit 124 is equivalent to a departure point calculation unit which calculates a departure point based on the position information detected by the first position detection unit. In addition, the detour degree calculation unit 126, equivalent to the detour degree calculation unit, calculates, based on a route cost representing a cost required for traveling from a start point to an end point of a route, the detour degree by subtracting a route cost required for traveling from the calculated departure point to a destination predicted by the traveling route prediction unit from a sum of a route cost required for traveling from the departure point to a current position and a route cost required for traveling from the current position to the destination predicted by the traveling route prediction unit.

In the same manner as in the above embodiment, the position detection unit 101 first detects position information of the first terminal 120, and the first destination prediction unit 138 predicts a destination of the first terminal 120 based on the detected position information. Meanwhile, the second position detection unit 111 is a means for detecting position information of the second terminal 121, and the notification control area determination unit 114 determines a notification control area based on the detected position information of the second terminal 121. This is followed by the calculation of a required-for-return time period based on the notification control area located on the traveling route of the first terminal 120, however, here, the notification is controlled further based on a detour degree calculated using route costs.

First, the departure point detection unit 124 is a means for detecting a departure point. The departure point is assumed to be, for example, a point at which detection of position information has started. Then the route cost calculation unit 125 calculates a route cost required for traveling from the detected departure point to the notification control area. Moreover, the route cost calculation unit 125 calculates a route cost required for traveling from the departure point to a current position and a route cost required for traveling from the current position to the notification control area. This is followed by the detour degree calculation unit 126 calculating a detour degree based on the calculated actual route cost and a minimum route cost. Note that the route costs are calculated using road information, such as node positions, connection nodes, and link distances, accumulated in the map information accumulation unit 144 as illustrated in the above embodiment. The route costs are also calculated based on: a route distance between positions such as a departure point, the current position, and a candidate destination position; a time period required for traveling a given route; and accessibility of the route. Hereinafter, description is provided using a specific example.

Figure 11:
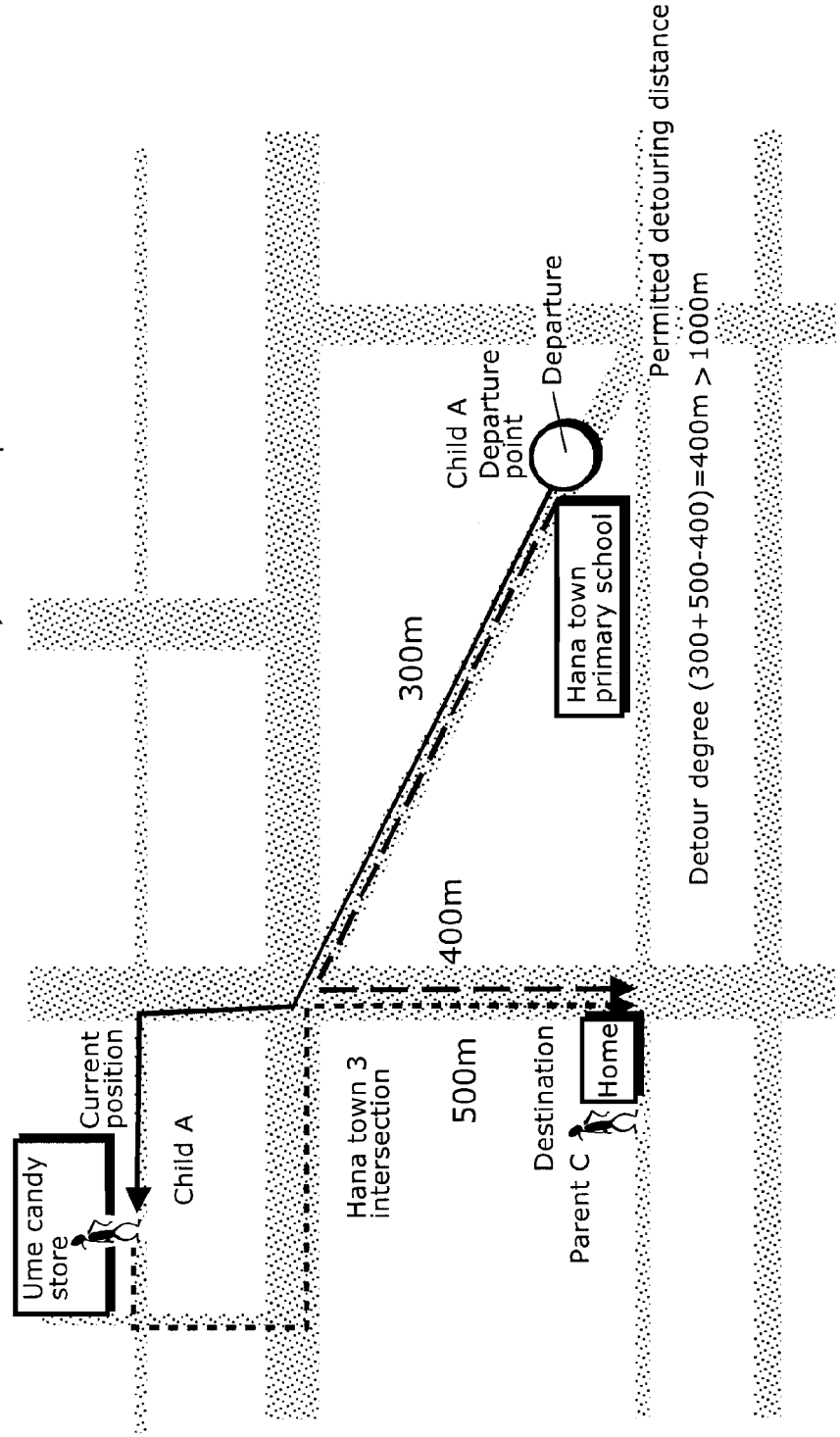
FIG. 11 is a diagram for illustrating a detour degree calculated by a detour degree calculation unit. (First Embodiment)

FIG. 11 is a diagram for illustrating a detour degree calculated by the detour degree calculation unit 126. FIG. 12 is a table illustrating a method for calculating a detour degree in the case where the child A travels along the route shown in FIG. 11. FIG. 11 shows that the child A using the first terminal 120 has departed Hana town primary school and is now near the "Ume candy store". Further, it is assumed, as in the above embodiment, that the child A is predicted to go home based on the child A's schedule or the like. Meanwhile, the parent C using the second terminal 121 is at home, and therefore the home is the notification control area, and notification is controlled based on a required-for-return time period required to arrive home. As FIG. 11 shows, the shortest route to arrive home includes a left turn at the Hana town 3 intersection and is 400 meters in total distance. Therefore, assuming, for example, the walking speed of 80 meters per minute as in the above embodiment, a required-for-return time period is calculated to be 5 minutes (=400÷80). Then the notification is controlled using the calculated required-for-return time period. However, the child may take a route other than the shortest route. For example in the present example, the child A is going home via the "Ume candy store", which results in a lapse of the calculated required-for-return time period. Considering even this situation as dangerous and thus transmitting the notification results in the system's operability to be very poor. Consequently, the detour degree calculation unit 126 calculates a detour degree to control the notification.

At first, the departure point detection unit 124 detects a departure point. It is assumed, for example, that the departure point is where the detection of the position information has started. In the case of FIG. 11, it is assumed that the position information starts to be detected by automatic operation or by the child A's operation when the child A leaves school. Therefore, Hana town primary school is detected as the departure point. At first, the route cost calculation unit 125 calculates a route cost required for the shortest route between the departure point and the destination. In FIG. 11, the route cost required for the shortest route between the departure point and the destination is calculated as 400 meters. Also, a route cost required for traveling from the departure point to the current position is calculated. As FIG. 11 shows, the child A is currently near the "Ume candy store", and the route cost required for traveling from the departure point to the current position is calculated to be 300 meters. Furthermore, a route cost required for traveling from the current position to the destination is calculated. The route cost required for traveling from the current position to the destination is calculated to be 500 meters.

The detour degree calculation unit 126 calculates a detour degree based on these route costs. For example, the detour degree is calculated as follows: (the route cost required for traveling from the departure point to the current position)+(the route cost required for traveling from the current position to the destination)−(the route cost required for traveling from the departure point to the destination). In the case of FIG. 11, the detour degree is 400 meters (=300+500−400). Then notification is controlled according to the calculated detour degree.

The information provision rule accumulation unit 127 is a means for accumulating rules on information to be provided based on the detour degree, such as the child's position information.

FIG. 13 is a table showing an example of information provision rules accumulated in the information provision rule accumulation unit 127. Accumulated as the information provision rule is information provision parties, that is, parties to which information is provided based on the aforementioned calculated detour degree, and details of the information provided. For example, the detour degree less than 1000 meters is classified into Rank 0 indicating that the information provision party is "None" and the provided information is "None". In the case of FIG. 11, the detour degree is 400 meters and is thus classified into Rank 0, which means that no notification is transmitted. In the case of a child, he may take a route other than the calculated shortest route or the predicted route; children often take a detour or a side trip to allow more time with friends. Therefore, as the present variation shows, misinformation can be prevented by calculating a detour degree and transmitting no notification about an unusual situation in the case where the calculated detour degree is less than a predetermined threshold value (1000 meters, for example).

FIG. 13 further shows rules for controlling information provision parties and provided information based on the detour degree. For example, FIG. 13 shows that in Rank 1, into which detour degrees "equal to or longer than 1000 m and less than 2000 m" are classified, the notification of the current position information and the traveling route of the child is transmitted to a guardian A (090-XXX-AAA). It further shows that in Rank 2, into which detour degrees "equal to or longer than 2000 m and less than 4000 m" are classified, the notification of the current position information and the traveling route of the child is transmitted with an alarm sound to the guardian A (090-XXX-AAA). According to the rank, the accumulated rules control the information provision parties and the details of notification; the notification is transmitted not only to the guardian, but also to a teacher, the police, and so on, depending on the rank. In this manner, changes of the level of attracting attention when transmitting a notification to a third party can be controlled based on the detour degree. Notification which constantly attracts the parent's attention may cause botheration, which could result in the security function being turned off. Thus, information needs to be appropriately notified. In view of the foregoing, information can be appropriately notified depending on the child's situation by, for example, sending an email as a notification to the parent's mobile phone, in the case of Rank 1, and transmitting the notification with an alarm sound to the parent's mobile phone to attract the parent's attention, in the case of Rank 2. In addition, it is possible to appropriately keep an eye on the child by changing the party to which the notification is transmitted, depending on the detour degree. A child who often takes a side trip takes a detour of approximately 1000 meters frequently, and thus notifying the parent and the like of every detour this child takes may cause botheration. However, in the case of taking a detour of 8000 meters or longer, the child may be in a dangerous situation. Therefore, in such a case, an automatic notification to the parent, teacher, and the police, for example, enables immediate detection of the danger surrounding the child, and this way the child's safety can be ensured.

Figure 14:
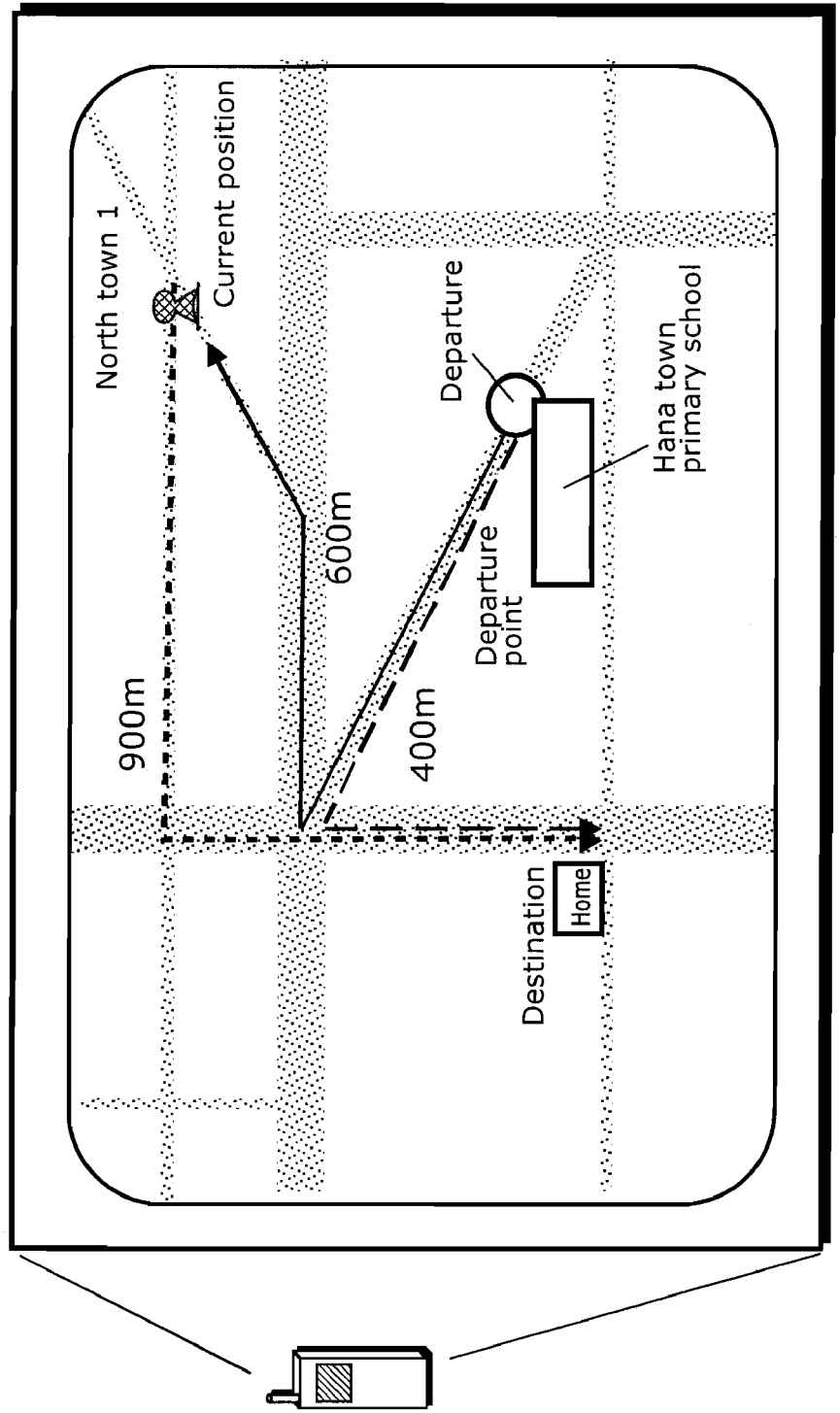
FIG. 14 is a diagram for illustrating an example of controlling notification based on a detour degree. (First Embodiment)

FIG. 14 is a diagram for illustrating an example of controlling notification based on a detour degree. FIG. 7 shows a display screen of the second terminal 121 used by the parent. As FIG. 14 shows, the child is currently near the North town 1 intersection. The route cost required for traveling from Hana town primary school, which is a departure point, to the current position is 600 meters, as FIG. 14 shows. Further, the route cost required for traveling from the current position to home is 900 meters. In contrast, the route cost required for traveling from Hana town primary school to home is 400 meters, and thus the detour degree is calculated as 1100 meters (=600+900−400). Here, referring to the notification control rules, this detour degree is classified into Rank 1 as it is "equal to or longer than 1000 meters and less than 2000 meters". As a result, the notification of the child's current position information and traveling route is transmitted to the guardian A (090-XXX-AAA). FIG. 14 illustrates an example of such a notification.

When a child who often takes a side trip takes a detour of less than 1000 meters, there is no need to transmit the notification to the parent. However, when the child takes a detour of 2000 meters or 4000 meters, or even a longer detour, the child's safety from danger can be ensured by controlling the information provision parties to whom the notification is transmitted and the details of the notification.

Figure 15:
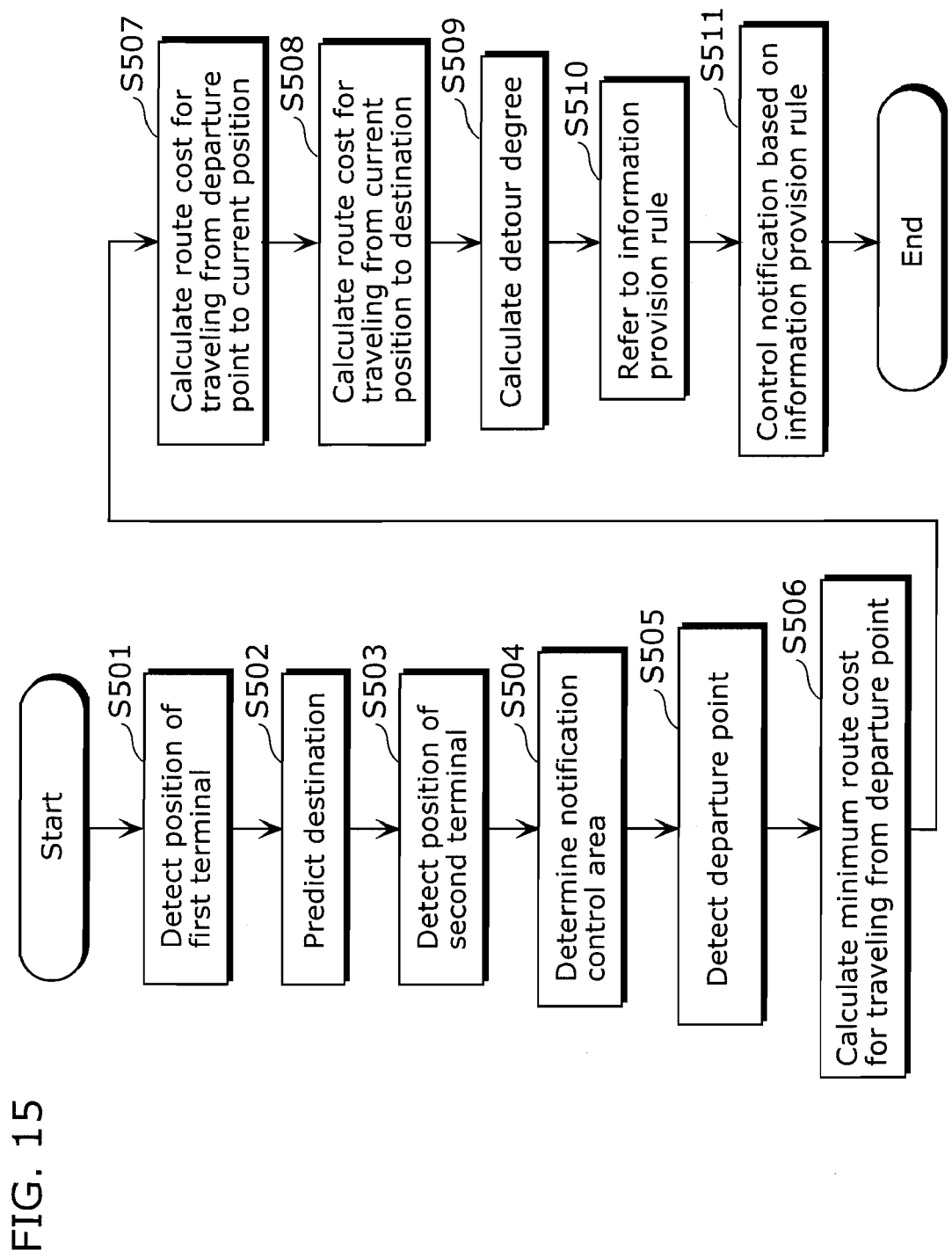
FIG. 15 is a flow chart showing steps of processing for controlling notification based on the detour degree described in FIG. 13. (First Embodiment)

Hereinafter, operations of the present variation shall be described with reference to a flow chart shown in FIG. 15. FIG. 15 is a flow chart showing steps of processing for controlling notification based on the detour degree described in FIG. 13. At first, the first position detection unit 101 detects position information of the first terminal 120 (Step S501). Then the first destination prediction unit 138 predicts a destination of the first terminal 120 (Step S502). Meanwhile, the second position detection unit 111 detects position information of the second terminal 121 (Step S503), and determines a notification control area (Step S504). In the case of FIG. 11, for example, the home where the parent C is present is determined as the notification control area, and a required-for-return time period is calculated based on this notification control area, however in the present variation, a detour degree is calculated and the notification is controlled based on the calculated detour degree.

At first, the departure point detection unit 124 detects a departure point (Step S505). Then the route cost calculation unit 125 calculates: a shortest route cost required for traveling from the departure point to the predicted destination (Step S506); a route cost required for traveling from the departure point to the current position (Step S507); and a route cost required for traveling from the current position to the predicted destination (Step S508). Then the detour degree calculation unit 126 calculates a detour degree based on these route costs (Step S509). To be more specific, for example, the detour degree is calculated as follows: (the route cost required for traveling from the departure point to the current position)+(the route cost required for traveling from the current position to the destination)−(the route cost required for traveling from the departure point to the destination). In the case of FIG. 11, the detour degree is 400 meters (=300+500−400). Then, the information provision rules accumulated in the information provision rule accumulation unit 127 are referred to (Step S510) to control the notification based on the detour degree (Step S511).

Note that even in the present example, the notification may be controlled based on the detour degree after calculating, as in the case of FIG. 11, a required-for-return time period based on the notification control area, which is in this case the home where the parent C is. It is assumed, for example, that the notification starts to be controlled when the child A leaves school alone for home. In this case, even when the required-for-return time period required to arrive home from school has not elapsed, in the case where the child A's detour degree has exceeded a predetermined threshold value, there is a possibility that the child A is being kidnapped to a direction opposite to home. Therefore, the notification can be controlled in such a manner that a notification is transmitted when the detour degree has exceeded the predetermined threshold value even though the required-for-return time period has not elapsed.

Note that in the present example, the detour degree is calculated using the route costs calculated based on the distances of the given routes, and the method for calculating these routes is uniform. However, when the mobile object is a person, there are cases where he stops at a place. In such a case, there is a possibility that he is suffering from a sudden illness, and it may be an unusual behavior which should be reported. Such an unusual behavior cannot be detected in the case where route costs are calculated based only on traveling distances. Moreover, in the case where this terminal is used by a person such as a child, means of transportation may differ, examples of which include walk, buses, and trains. A one-kilometer (km) detour on foot has a different connotation from that of a one-km detour by train. With train, missing even one station could result in a detour of about five kms, whereas in the case of walking, a five-km detour is considered to be an unusual behavior, indicating a possibility that the child, for example, is in a dangerous situation, such as being kidnapped. Therefore, when the mobile object is a person, it is sometimes more preferable to calculate a route cost using a time period required for traveling the route, instead of using the distance of the route. Here, in the case where the route cost required for traveling from a departure point to a current position is calculated as a time period elapsed up to the current time since the mobile object has left the departure point, the detour degree increases even when the mobile object stops at one place. However, a change of a means of transportation from walk to a bus, for example, entails a time to wait for the bus, train, or the like. The waiting time cannot be easily predicted since it varies depending on the situation. For this reason, the detour degree should not be increased while the mobile object is waiting for a bus, train, or the like, in other words, while the mobile object is at a station, a bus stop, and so on. When the mobile object is a person and the route cost is a time period required for traveling a given route, it is necessary to change the method for calculating the detour degree, depending on the position of the mobile object. Hereinafter, description is provided using a specific example.

The route cost calculation unit 125 and the detour degree calculation unit 126 shown in the system configuration diagram of FIG. 10 calculate route costs using information regarding distances of routes based on map information accumulated in the map information accumulation unit 144. Here, route costs are calculated using information from the map information regarding a required traveling time period.

FIG. 16A is a table showing information regarding each node accumulated in the map information accumulation unit 144. FIG. 16B is a diagram showing information regarding each link connecting nodes. The map information accumulation unit 144 accumulates route information including a link time period which is a time period required for traveling between positions or between nodes. For example, accumulated are node positions, connection nodes, and link time periods which are time periods required for traveling along links connecting the nodes. As the link time periods, not only a required traveling time period when walked is accumulated, but a required traveling time period when a train, bus, or the like, is used is also accumulated. In addition, the positions of train stations and bus stops are also accumulated. For example, as accumulated in the tables of FIG. 16A and FIG. 16B, a node ID "001" indicates that: the node position is "134.3.0.9" in longitude and "34.6.3.6" in latitude; its type is "station (train)"; and it is connected to node IDs "002", "003", "004", and "005". A link ID "001" indicates that it takes "5 minutes" to travel between a start point node ID "001" and an end point node ID "002" by "train" as a means of transportation.

The route cost calculation unit 125 calculates route costs using the road information accumulated in the map information accumulation unit 144, such as the node positions, the connection nodes, and the link time periods. Route costs are time periods required for traveling given routes. More specifically, to calculate the route costs, the following are calculated: a time period elapsed for the mobile object to travel between a departure point detected by the departure point detection unit 124 and a current position detected by the first position detection unit 101, that is, a time period from a departure time at which the mobile object leaves the departure point until a time at which the mobile object arrives at the current position; a time period required for traveling from the current position detected by the first position detection unit 101 and a destination predicted by the first destination prediction unit 138; and a time period required for traveling from the departure point detected by the departure point detection unit 124 and the destination. The time period required for traveling from the departure point and the destination is, for example, the minimum time period required for traveling from the departure point to the destination. In this case, the map information accumulation unit 144 is equivalent to a waiting time information accumulation unit in which information regarding a predetermined point and a waiting time to wait at the predetermined point, is accumulated. Furthermore, the detour degree calculation unit 126, equivalent to the detour degree calculation unit, calculates, based on the route cost represented as a time period required to travel from a start point to an end point of a route, the detour degree by subtracting the waiting time to wait at the predetermined point on the route predicted by the traveling route prediction unit from the route cost using the information regarding the waiting time The detour degree calculation unit 126 further calculates a terminal's waiting time incurred at a station, based on the current position detected by the first position detection unit 101 and the position of the station accumulated in the map information accumulation unit 144. To be more specific, the waiting time increases when the current position is a station. In other words, the waiting time is a sum of time periods during which the mobile object is at a station.

The detour degree calculation unit 126 calculates a detour degree with respect to a destination based on the route costs calculated by the route cost calculation unit 125 and the calculated waiting time. The detour degree is calculated by subtracting the waiting time and the minimum route cost required for traveling between the departure point to the destination from the route cost required to arrive at the destination via the route that the mobile object is currently taking. More specifically, the detour degree with respect to the destination is calculated by subtracting the waiting time and the time period required for traveling between the departure point and the destination from a sum of the time period elapsed for traveling between the departure point and the current position and the time period required for traveling between the current position and the destination. The waiting time at a station or a bus stop is considered to be a necessary time period for an efficient travel to a destination, and thus even when the waiting time increases, it does not indicate an unusual behavior. However, the waiting time significantly affects the time period required for traveling to the destination. Consequently, by excluding the waiting time from the time period required for the travel when calculating the detour degree, it is possible to eliminate the impact of the waiting time on the detour degree.

Figure 17:
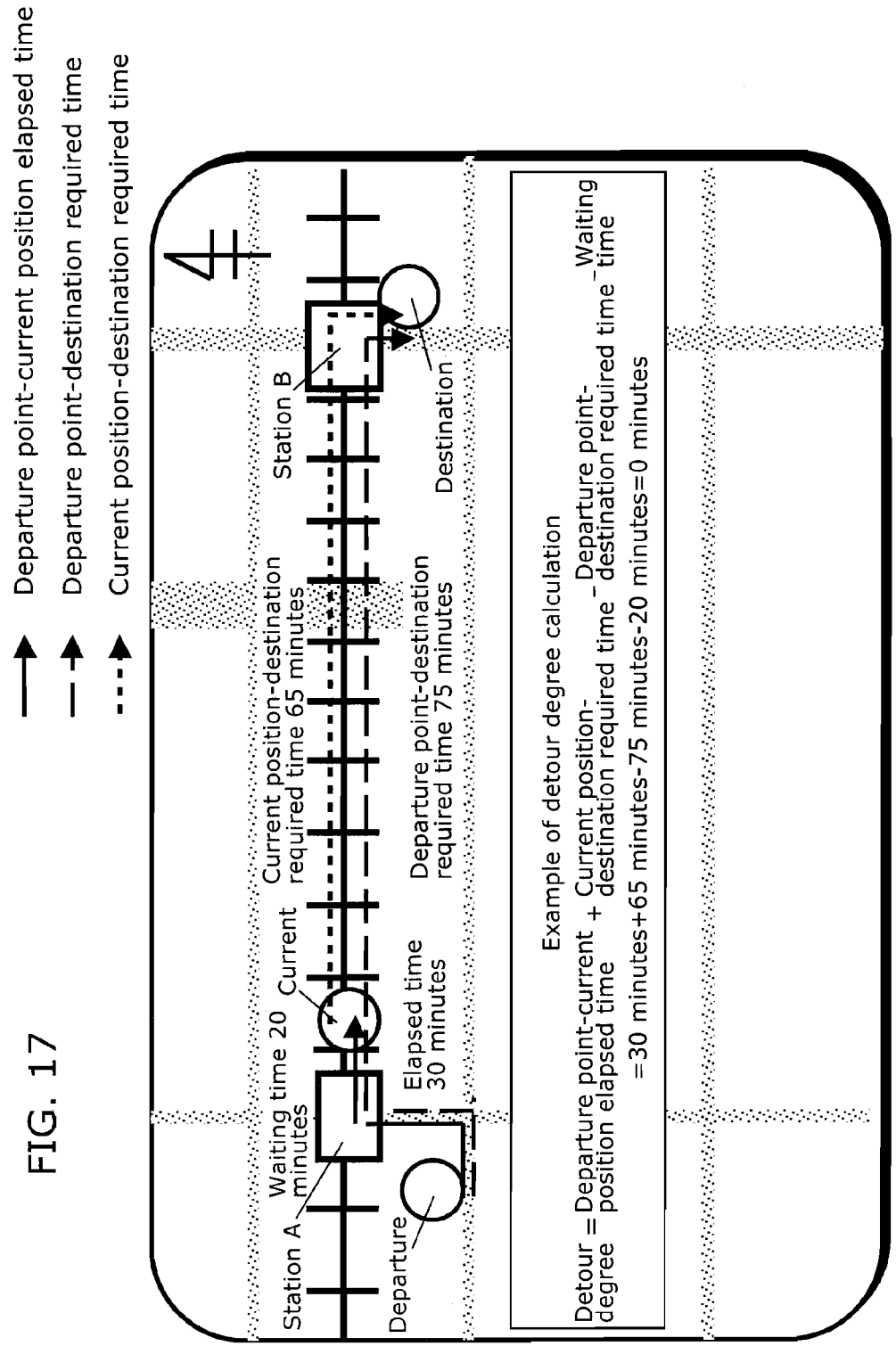
FIG. 17 is a diagram showing an example of a method for calculating a detour degree, taking into account a waiting time incurred when traveling to a destination by train, bus, or the like. (First Embodiment)

FIG. 17 is a diagram showing an example of a method for calculating a detour degree, taking into account a waiting time incurred when traveling to a destination by train, bus, or the like. FIG. 18 is a table showing details of the calculation involved in the method for calculating a detour degree shown in FIG. 17. For example, as shown in FIG. 18, the detour degree is calculated to be zero minutes in the case where, as shown in FIG. 17: the time period elapsed for traveling between the departure point to the current position is 30 minutes; the time period required for traveling between the current position to the destination is 65 minutes; the time period required for traveling between the departure point to the destination is 75 minutes; and the waiting time is 20 minutes (0 min.=30 min.+65 min.−75 min.−20 min.).

As described, there are cases where the user of the terminal travels not only on foot, but also by public transport such as trains and buses. Therefore, using the detour degree with the waiting time taken into account by referring to the map information, makes it possible to more appropriately ensure the child's safety and to automatically prevent misoperations which occur when a time period to wait for a train, for example, causes a lapse of a required traveling time period. Thus, the operability of the system is enhanced.

Figure 19:
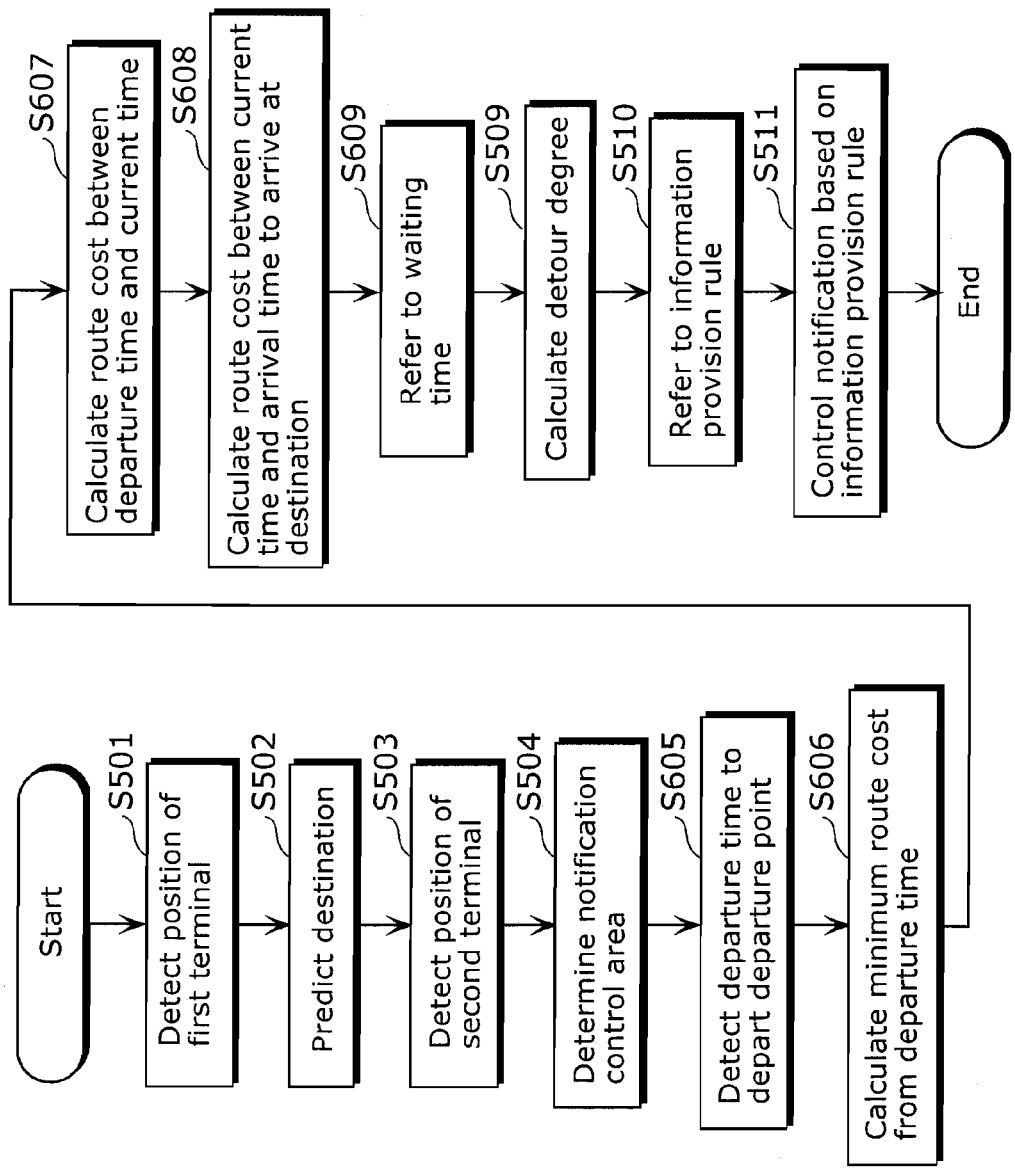
FIG. 19 is a flow chart showing steps of processing for calculating a detour degree, taking into account a waiting time. (First Embodiment)

Hereinafter, operations of the present example shall be described with reference to a flow chart shown in FIG. 19. FIG. 19 is a flow chart showing steps of processing for calculating a detour degree with a waiting time taken into account. At first, the first position detection unit 101 detects position information of the first terminal 120 (Step S501). Then, the first destination prediction unit 138 predicts a destination of the first terminal 120 (Step S502). Meanwhile, the second position detection unit 111 detects position information of the second terminal 121 (Step S503), and determines a notification control area (Step S504). Next, a detour degree is calculated, but here, route costs are calculated based on time periods instead of distances, and further, a waiting time is taken into account.

At first, the departure point detection unit 124 detects a departure time to depart a departure point (Step S605). Then the route cost calculation unit 125 calculates: a shortest route cost (time) between the departure time to depart the departure point and an arrival time to arrive at the predicted destination (Step S606); a route cost between the departure time and the current time (Step S607); and a route cost between the current time and the arrival time to arrive at the predicted destination (Step S608). Meanwhile, a waiting time indicated in the map information accumulated in the map information accumulation unit 144 is referred to (Step S609). Then the detour degree calculation unit 126 calculates a detour degree based on the route costs (Step S509). To be more specific, the detour degree is calculated as follows, for example: (the route cost between the departure time and the current time)+(the route cost between the current time and the arrival time)−(the route cost between the departure time and the arrival time)−(waiting time). In the case of FIG. 17, the detour degree is zero minutes (=30+65−75−20). Then the information provision rules accumulated in the information provision rule accumulation unit 127 are referred to (Step S510) to control the notification based on the detour degree (Step S511).

Note that in the above example, the threshold value of detour degrees is fixed. However, the threshold value is different depending on the mobile object. To be more specific, when a child who rarely takes a side trip takes a one-km detour, this should be reported as an unusual behavior, however on the other hand, when a child who frequently takes a long side trip takes a one-km detour, it is unlikely that this is an unusual behavior, and a report about this detour may be troublesome for the information provision parties. In view of the foregoing, the mobile object's detour degrees in its daily travel may be accumulated as a history, and the threshold value of detour degrees may be automatically changed based on the tendency of the accumulated detour degrees.

Hereinafter, an approach of the present embodiment shall be described.

Figure 20:
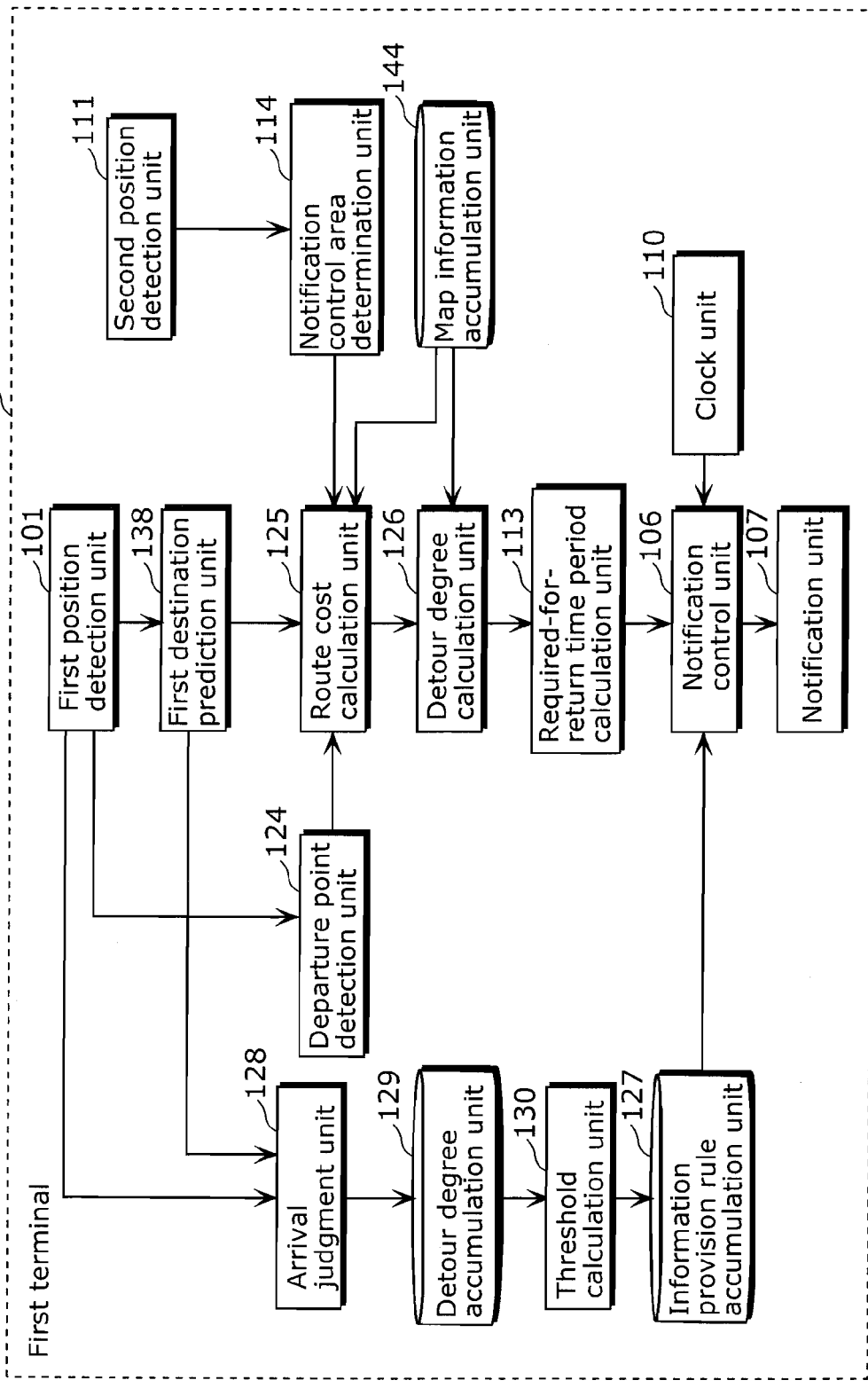
FIG. 20 is a diagram showing the configuration of the notification device of the present embodiment which accumulates detour degrees as a history, and changes a threshold value of detour degrees based on the tendency of the accumulated detour degrees. (First Embodiment)

FIG. 20 is a diagram showing the configuration of the notification device of the present embodiment which accumulates detour degrees as a history, and changes the threshold value of detour degrees based on the tendency of the accumulated detour degrees. Constituent elements in the figure that are illustrated in the above embodiment are given the same numerical references, and descriptions thereof are omitted. Hereinafter, each constituent element shall be described first with reference to the figure, and operations of this notification device shall be described next.

In this case, an arrival judgment unit 128 is equivalent to a destination arrival detection unit which detects that the first user has arrived at the destination of the first user, based on the position of the first terminal detected by the first position detection unit. Further, a detour degree accumulation unit 129 is equivalent to a detour degree accumulation unit in which the detour degree calculated by the detour degree calculation unit is accumulated in association with the destination arrived at. Moreover, a threshold calculation unit 130 is equivalent to a threshold calculation unit which calculates a threshold value of the detour degree based on the detour degree accumulated in the detour degree accumulation unit, the threshold value being associated with the destination. In the information provision rule accumulation unit 127, which is equivalent to the information notification rule accumulation unit, the threshold value of the detour degree calculated per destination is accumulated as the information notification rule.

The arrival judgment unit 128 judges whether or not the user of the first terminal 120 has arrived at the destination, based on the current position detected by the first position detection unit 101 and the destination predicted by the first destination prediction unit 138. More specifically, the arrival judgment unit 128 judges that the user of the first terminal 120 has arrived at the destination, when the current position matches the destination.

FIG. 21 is a table showing an example of a history of detour degrees, accumulated in the detour degree accumulation unit 129. The detour degree accumulation unit 129 accumulates a detour degree calculated by the detour degree calculation unit 126, when the arrival judgment unit 128 judges that the user of the first terminal 120 has arrived at the destination. More specifically, detour degrees are accumulated as shown in FIG. 21. It shows that the detour degree of "ID 001" is 1 km.

Based on the history of the detour degrees accumulated in the detour degree accumulation unit 129, the threshold calculation unit 130 changes the threshold value of detour degrees indicated in the information provision rule accumulated in the information provision rule accumulation unit 127. To be more specific, an average and a standard deviation of the detour degrees are calculated, presuming the distribution of the detour degrees as a normal distribution. Then, the average+n×standard deviation gives a threshold value (n is a rank of the detour degree). For example, in the case where detour degrees are accumulated as shown in FIG. 21, their average is 1.4 km{(1 km+0 km+1 km+3 km+2 km)/5}, and their standard deviation is 1.0 km{√(((1 km−1.4 km)×(1 km−1.4 km)+(0 km−1.4 km)×(0 km−1.4 km)+(1 km−1.4 km)×(1 km−1.4 km)+(3 km−1.4 km)×(3 km−1.4 km)+(2 km−1.4 km)×(2 km−1.4 km))/5)}. Thus the threshold value is a result of 1.4 km+n×1.0 km (n is a rank of the detour degree).

The information provision rule accumulation unit 127 accumulates information provision rules each of which is a set of an information provision party and provided information associated with a detour degree. Fundamentally, the number of information provision parties increases with the detour degree. Furthermore, when the detour degree is low, only the one who is closely related to the mobile object becomes the information provision party, an example of which includes the mobile object's guardian. As the detour degree becomes greater, those who are less closely related to the mobile object also become the information provision parties, examples of which include the mobile object's teacher and the police. The information provision parties, to which the information provision rules are transmitted, are registered by a guardian or a care giver of the mobile object entering, in advance, phone numbers, email addresses, and the like, of corresponding information provision parties. The threshold value calculated by the threshold calculation unit 130 is used as the threshold value of detour degrees. FIG. 22 is a table showing an example of information provision rules followed for controlling the notification based on averages and standard deviations calculated using the history of detour degrees. For example, when the threshold calculation unit 130 calculates a threshold value through 1.4 km+n×1.0 km (n is a rank of the detour degree), and the detour degree is "equal to or longer than 2.4 km and less than 3.4 km" (equal to or longer than 1.4 km+1×1.0 km and less than 1.4 km+2×1.0 km), the information provision rule in "Rank 1" in FIG. 22 indicates the following: the information provision party is "guardian A (phone number 090-AAA-XXXX)" and provided information is "mobile object's current position information".

Figure 23:
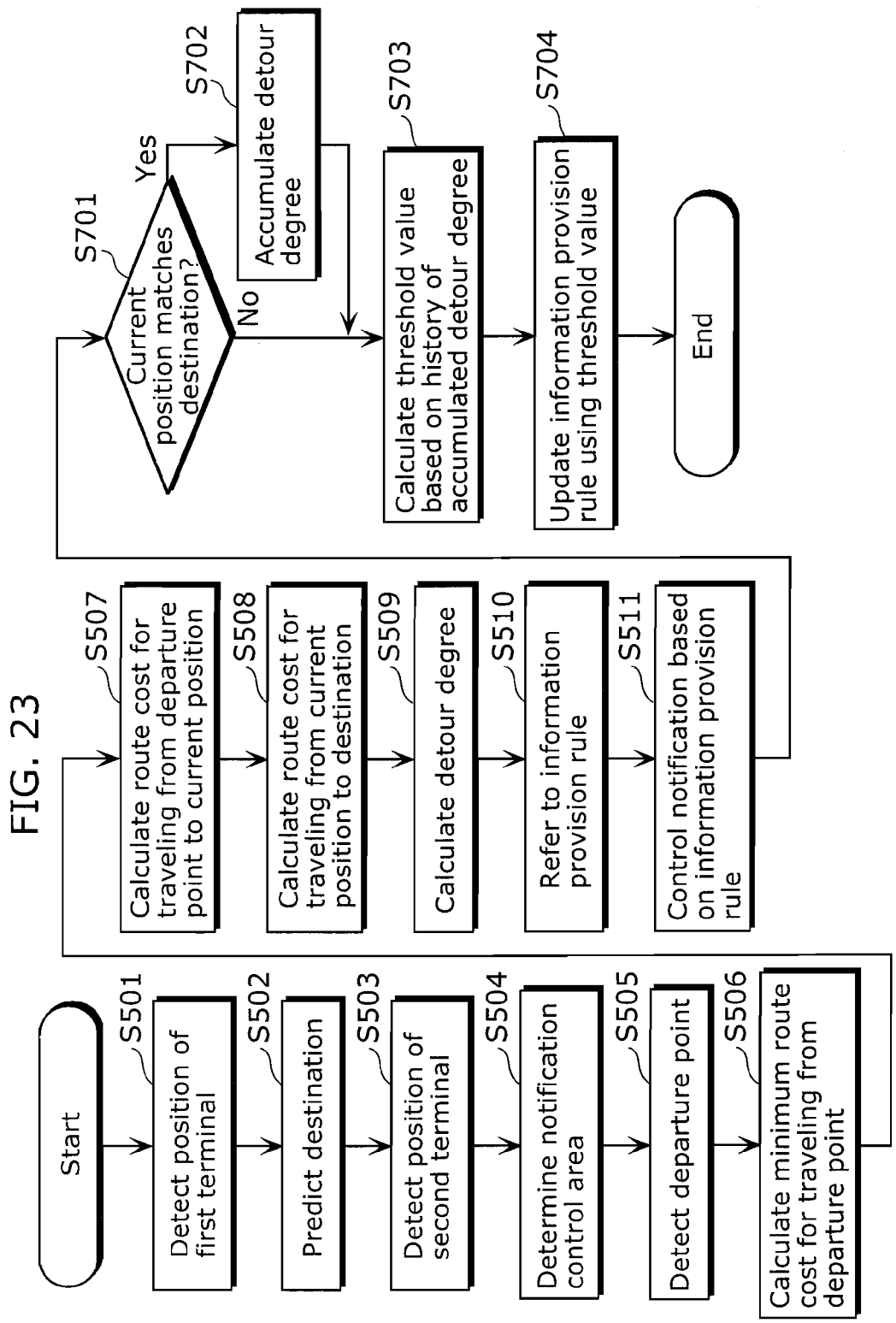
FIG. 23 is a flow chart showing steps of processing for controlling the notification using a history of detour degrees. (First Embodiment)

Hereinafter, a flow chart of the present embodiment shall be described with reference to FIG. 23. FIG. 23 is a flow chart showing steps of processing for controlling the notification using a history of detour degrees. Provided here is description of a flow of providing information based on a detour degree calculated through the above described method (Step S501 through Step S511) and then accumulating the detour degree after arrival at a destination.

At first, the arrival judgment unit 128 judges whether or not the current position detected by the first position detection unit 101 matches the destination predicted by the first destination prediction unit 138 (Step S701), and the processing proceeds to Step S702 when the current position matches the destination (YES in Step S701). When the current position does not match the destination (NO in Step S701), the processing proceeds to Step S703. When the current position matches the destination, the detour degree accumulation unit 129 accumulates the detour degree calculated by the detour degree calculation unit 126 (Step S702).

Using the history of the detour degrees accumulated in the detour degree accumulation unit 129, the threshold calculation unit 130 calculates a threshold value (Step S703) to change the information provision rules accumulated in the information provision rule accumulation unit 127 (Step S704). After that or when the user travels again, the notification control unit 106 provides information according to the detour degree calculated by the detour degree calculation unit 126 and the information provision rules which are accumulated in the information provision rule accumulation unit 127 and which have been changed with the threshold value calculated by the threshold calculation unit 130.

Note that in the present embodiment, the second terminal 121 used by the parent, for example, is at a place such as home, and the notification is controlled by calculating a required-for-return time period required to arrive at a fixed point and a detour degree. However, the positions of terminals such as mobile phones used by persons change as the persons travel. That is to say, the second terminal 121 used by the parent and so on also travels in some cases. In such cases, it is necessary to take into account the travel of the second terminal 121 in calculating a required-for-return time period and the like for transmitting the information notification. For example, a destination of the second terminal 121 may be predicted with the travel of the second terminal 121 taken into account, so that the information notification is controlled using a required-for-return time period required to arrive at the predicted destination and a detour degree with respect to the predicted destination. The notification control with the travel of each terminal taken into account shall be described in detail in the following second embodiment.

Second Embodiment

The approach described in the first embodiment is to suppress the notification about an unusual situation by: judging whether the user of the first terminal 120 and the user of the third terminal 141 are traveling together or have separated from each other, based on the position information of the first terminal 120 and the third terminal 141; and calculating a time period required to go home where the parent is present, in the case of judging that they have separated from each other.

In recent years, crimes against children, such as kidnaps, are becoming a serious social issue, and thus there is a need for systems and appliances to protect them. Most crimes against children take place when they are alone, and thus whether or not a child is alone, regardless of where he is, is a big factor that leads to such crimes. In view of the foregoing, the present invention judges whether or not a child is alone, and in the case of judging that the child is alone, the notification about the unusual situation is controlled based on a time period required to arrive where the parent is, in order to protect the child from any danger. More specifically, the separation judgment is made to judge whether or not the child is alone, and in the case of judging that the child is alone, a notification control area is calculated based on position information of the second terminal 121 used by the parent and so on, so as to transmit the notification based on a time period required to arrive at the notification control area. With this, the child is protected against danger, and meanwhile, the misoperation of constantly transmitting the notification about an unusual situation is prevented. In other words, the present invention is based on the idea of detecting a dangerous situation where a child is traveling alone, and controlling the notification based on a positional relationship and so on between the child's terminal and a second terminal used by a parent, for example. The first embodiment has illustrated the notification control of the present invention using a situation where the child travels to where the parent is present, however, the second terminal 121 may be used by a third party instead of the parent, such as a friend and a teacher who are trustworthy. Furthermore, there may be more than one terminal that functions as the second terminal 121. The notification may be controlled based on a relationship between a position of the first terminal 120 used by the child and positions of plural terminals used by respective third parties. For example, when the third parties, such as a parent, friend, and teacher, are present at a predetermined destination or on the traveling route of the first terminal 120, the third parties using the terminals may be encouraged to accompany the child in order to prevent the child from traveling alone as it could be dangerous. Hereinafter, description is provided using a specific example.

Figure 24:
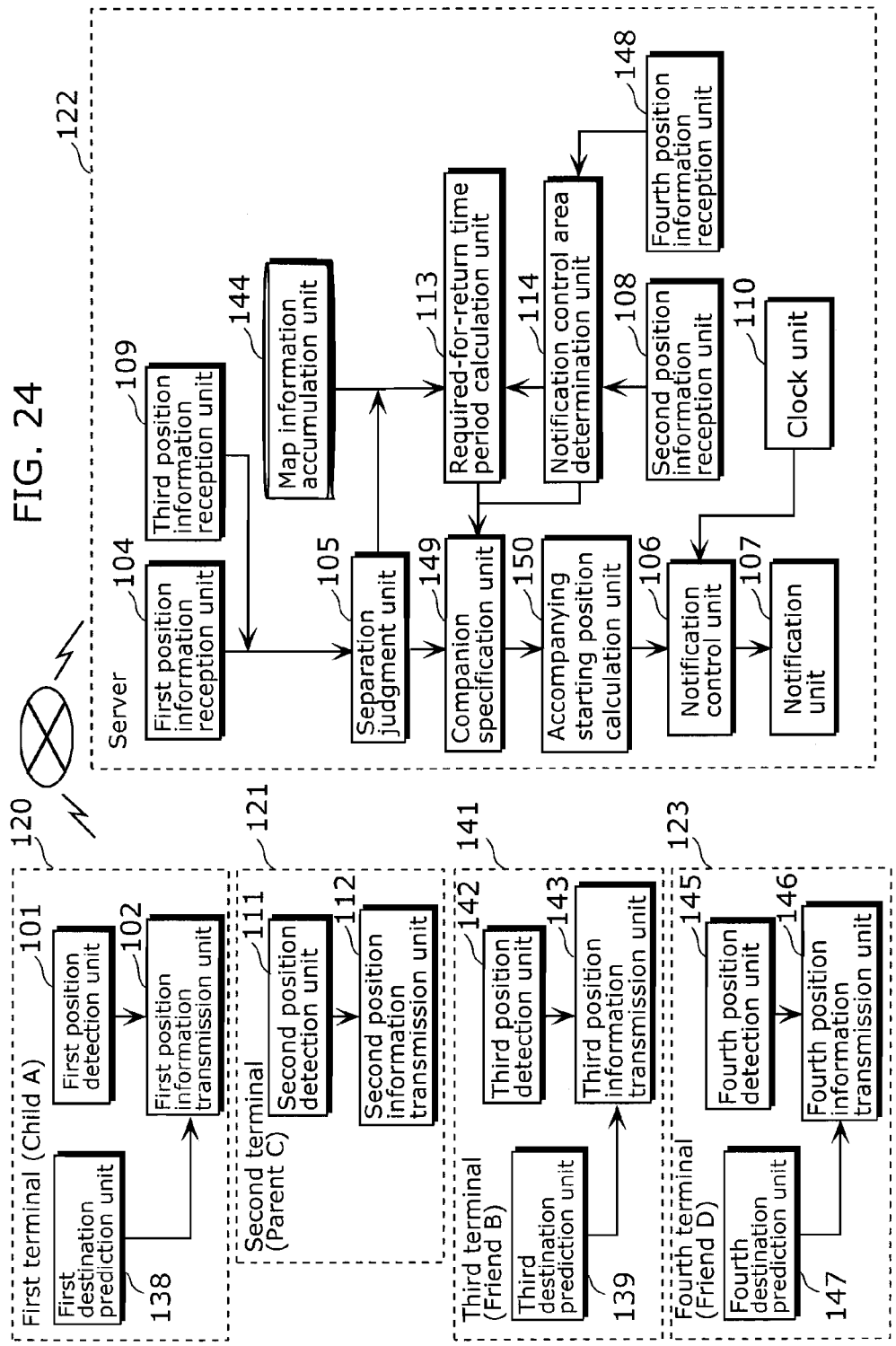
FIG. 24 is a diagram showing the configuration of the notification system according to a second embodiment. (Second Embodiment)

FIG. 24 is a diagram showing the configuration of the notification system according to a second embodiment. The notification system includes a fourth terminal 123 in addition to the server 122, the first terminal 120, the second terminal 121, and the third terminal 141 illustrated in the first embodiment, and further includes additional constituent elements on the server side, such as a fourth position information reception unit 148 which receives position information of the fourth terminal 123. The notification system according to the second embodiment is the notification system wherein the second terminal and the second user using the second terminal both exist in a plurality, the traveling route prediction unit further predicts traveling routes to be traveled by the respective second users from the current time onward, and the notification system further comprises: a companion specification unit which specifies, as a companion, a second user who is able to accompany the first user from among the second users, based on the traveling routes of the respective second users predicted by the traveling route prediction unit and required-for-return time periods required to arrive at the respective second users; an accompanying starting position calculation unit which calculates an accompanying starting position at which the second user specified by the companion specification unit starts accompanying the first user; and a notification unit which notifies the second terminals including the specified second terminal, of information regarding the second user specified by the companion specification unit as a companion and the accompanying starting position. With regard to this, in the second embodiment, the second terminal 121, the third terminal 141, and the fourth terminal 123 are equivalent to the plural second terminals, and the parent C, the friend B, and a friend D are equivalent to the second users using the second terminals. Also, the first destination prediction unit 138 is further equivalent to the traveling route prediction unit which further predicts traveling routes to be traveled by the respective second users from the current time onward. A companion specification unit 149 is equivalent to the companion specification unit which specifies, as a companion, a second user who is able to accompany the first user from among the second users, based on the traveling routes of the respective second users predicted by the traveling route prediction unit and required-for-return time periods required to arrive at the respective second users. Further, an accompanying starting position calculation unit 150 is equivalent to the accompanying starting position calculation unit which calculates an accompanying starting position at which the second user specified by the companion specification unit starts accompanying the first user. Furthermore, the notification unit 107 is equivalent to the notification unit which notifies the second terminals including the specified second terminal, of information regarding the second user specified by the companion specification unit as a companion and the accompanying starting position.

Figure 25:
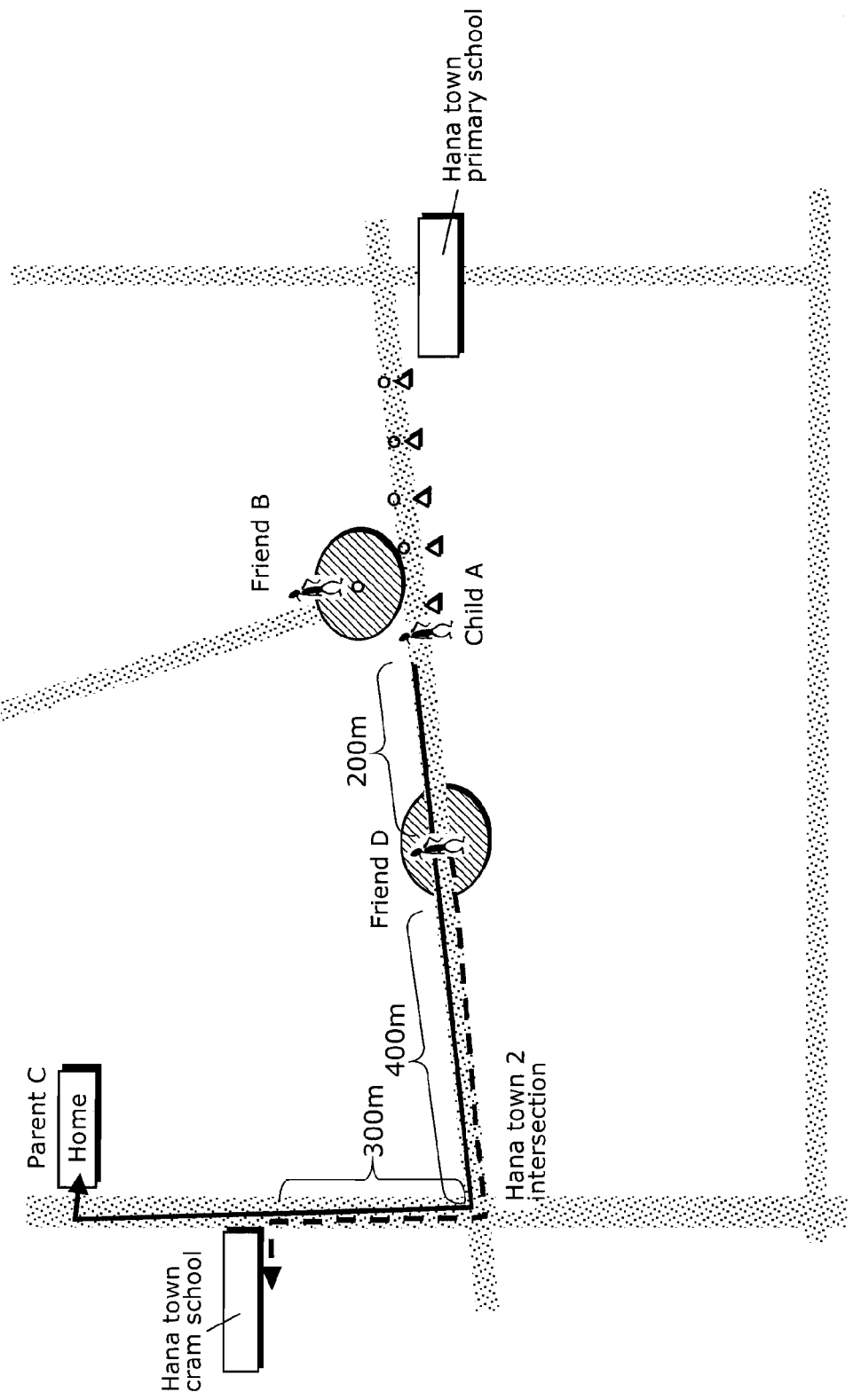
FIG. 25 is a diagram showing a situation, as in FIG. 4 and so on, where the child A using the first terminal is on the way home and has left a notification control area of the friend B using a third terminal. (Second Embodiment)

At first, a separation judgment is made to judge whether or not the child A using the first terminal 120 has separated from the friend B using the third terminal 141, based on position information of the child A and the friend B. FIG. 25 is a diagram showing a situation, as in FIG. 4 and so on, where the child A using the first terminal 120 is on the way home and has left the notification control area of the friend B using the third terminal 141. In the first embodiment, the notification of position information is controlled by calculating at this point in time a required-for-return time period required to go home where the parent B using the second terminal 121 is.

However, in the second embodiment, the following are performed first: a traveling route of the first terminal 120 is predicted; third parties who are on the predicted traveling route are detected; and required-for-return time periods required to reach the respective third parties using terminals are calculated. Then, from among the detected third parties, a third party who can perform accompanying is specified based on the required-for-return time periods required to reach the respective third parties using the terminals, and a notification is transmitted to encourage the specified third party and the user of the first terminal 120 to travel together. In other words, here, the parent does not need to be at home, and the notification is controlled based on positional relationships and so on between the first terminal 120 and the terminals which are, or will be, present on the predetermined traveling route of the first terminal 120.

The fourth terminal 123 includes a fourth position detection unit 145, a fourth destination prediction unit 147, and a fourth position information transmission unit 146. The fourth position detection unit 145 is a means for detecting position information of the fourth terminal 123, as with the first position detection unit 101 and so on. Further, the fourth position information transmission unit 146 is a means for transmitting the detected position information to the server, as with the first position information transmission unit 102 and so on. In the present embodiment, the server has not only the position information of the first terminal 120, the second terminal 121, and third terminal 141, but also the position information of the fourth terminal 123.

The fourth destination prediction unit 147 of the fourth terminal 123 is a means for predicting a destination of the fourth terminal 123, as with the first destination prediction unit 138 of the first terminal 120 illustrated in the above embodiment. Mobile phones and the like often have a schedule book installed, and it is assumed here that a future destination of the fourth terminal 123 is predicted using, for instance, the schedule book. Then the fourth position information transmission unit 146 transmits the predicted destination to the server 122.

FIG. 26 is a diagram showing an example of a schedule provided in the fourth destination prediction unit 147 of the fourth terminal 123. A schedule is displayed on a screen of the terminal. The schedule shows time slots, and a place to stay and a traveling route for each time slot. More specifically, for the time slot of 8:00 to 8:30, what is shown is a school route from home to Hana town primary school via the Hana town 3 intersection and the Hana town 1 intersection. For the time slot of 8:30 to 16:30, a schedule to stay at Hana town primary school is accumulated. In addition, for the time slot of 16:30 to 17:00, a route to Hana town cram school is shown. As described, it is assumed that the schedule showing the child's traveling route and place to stay for each time slot is accumulated in the child's terminal, and that a predicted destination is detected using the schedule.

Likewise, the first destination prediction unit 138 predicts a destination of the child A using the first terminal 120. It is assumed, for example, as in the above embodiment, that the child A is predicted to go home.

Note that the schedule may be voluntarily entered by a parent, for example. It is assumed, for example, that a parent enters the schedule of the day to the child's terminal every morning, and the first destination prediction unit 138 and the like predicts a route and a place to stay shown in the schedule, as a destination for the corresponding time slot. Otherwise, a usual traveling history may be accumulated in advance, and data on frequent traveling may be automatically entered from the accumulated traveling history. Alternatively, the schedule may be entered in the following way: traveling to school and cram school, which is relatively regularly made, is automatically entered, since entering it everyday is troublesome; and in the case of traveling differently from the usual traveling, the unusual traveling is entered voluntarily by the parent and so on.

The fourth position information reception unit 148 on the server side is a means for receiving position information and a future destination of the fourth terminal 123, transmitted by the fourth position information transmission unit 146. Then, based on the received position information and future destination, the notification control area determination unit 114 determines a notification control area.

The notification control area determination unit 114 is a means for calculating a notification control area based on the position of a terminal, as in the first embodiment. In the present embodiment, an area which is based on the position of the fourth terminal 123 received by the fourth position information reception unit 148 is determined as the notification control area. For example, as in the above embodiment, the area having 100 meters or the like in radius and centering on the position of the fourth terminal 123 is determined as the notification control area.

In the case where the separation judgment unit 105 illustrated in the above embodiment judges that the child A using the first terminal 120 has become alone after separating from a user of another terminal, a different terminal whose user can accompany the child A next is searched for, since it is dangerous for the child A to travel alone.

The companion specification unit 149 is a means for specifying a fourth terminal 123 whose user can perform accompanying, based on the position of the fourth terminal 123 and the notification control area determined by the notification control area determination unit 114. The companion specification unit 149 is a means for judging whether or not the notification control area of the fourth terminal 123 matches, even partially, the destination route of the first terminal 120, for example, and judging whether or not the user of the fourth terminal 123 can perform accompanying, based on the degree of matching and the like. For example, in the case where more than one terminal is detected as being able to perform accompanying, it is necessary to specify one among them. The degree of matching the destinations is used as the basis of the specification. For example, a required-for-return time period required to reach each of the terminals (which is, in the present embodiment, a time period required to meet each of the terminals) is calculated, and the user who can meet the user of the first terminal 120 within a shortest period of time is specified as a companion. During this operation, notification is suppressed even when the user is traveling alone. Furthermore, even when the fourth terminals are present nearby, they may not be suitable terminals to travel with, because the users of the fourth terminals will soon separate again from the user of the first terminal 120 in the case where their destinations differ or matching degrees are low. Therefore, in the present embodiment, not only the required-for-return time period, but also the matching degree of destinations is used as a basis of the companion specification. For example, what the prediction units of the present embodiment predict as a destination includes a route, and they judge a matching degree of the predicted route.

The accompanying starting position calculation unit 150 is a is a means for calculating a point at which the user of the first terminal 120 meets the user of the fourth terminal 123 who has been specified by the companion specification unit 149 as being able to perform accompanying. Then under the control of the notification control unit 106, the notification unit 107 notifies the first terminal 120 of the position of the fourth terminal 123, a time period required to arrive at the position of the fourth terminal 123, and the like. Hereinafter, a specific example shall be described with reference to drawings.

FIG. 25 shows the child A using the first terminal 120, the friend B using the third terminal 141, and the friend D using the fourth terminal 123, as in the above embodiment. Now, the child A and the friend B have separated from each other, which indicates that the child A is going to travel alone from this time onward. It is assumed that, here, the first destination prediction unit 138 of the first terminal 120 predicts the child A's home and a route to the child A's home as the destination of the first terminal 120.

It is also assumed that the fourth destination prediction unit 147 of the fourth terminal 123 meanwhile predicts "Hana town cram school" as the destination of the child D from here onward. Here, the position information and the predicted destination "Hana town cram school" of the fourth terminal 123 are transmitted to the server 122 via the fourth position information transmission unit 146. Then the notification control area determination unit 114 calculates a notification control area based on the position of the fourth terminal 123.

Meanwhile, the companion specification unit 149 judges whether or not the notification control area based on the position of the fourth terminal 123 overlaps the predicted traveling route of the first terminal 120, so as to judge whether or not accompanying is possible. To be more specific, a matching degree of the route from "home" to "Hana town cram school" is judged. For example, assuming that matching degrees are calculated based on distances it is calculated here that 700 m to "Hana town cram school" matches the predicted traveling route of the first terminal 120. For example, a threshold value (200 m, for example) is set for matching degrees, and when there is a user whose matching degree is equal to or greater than the threshold value, it is judged that the user can perform accompanying. Note that the threshold value may be 0 m, in other words, accompanying may be encouraged when there is even a slight match, in consideration to a higher level of safety for children.

Figure 27:
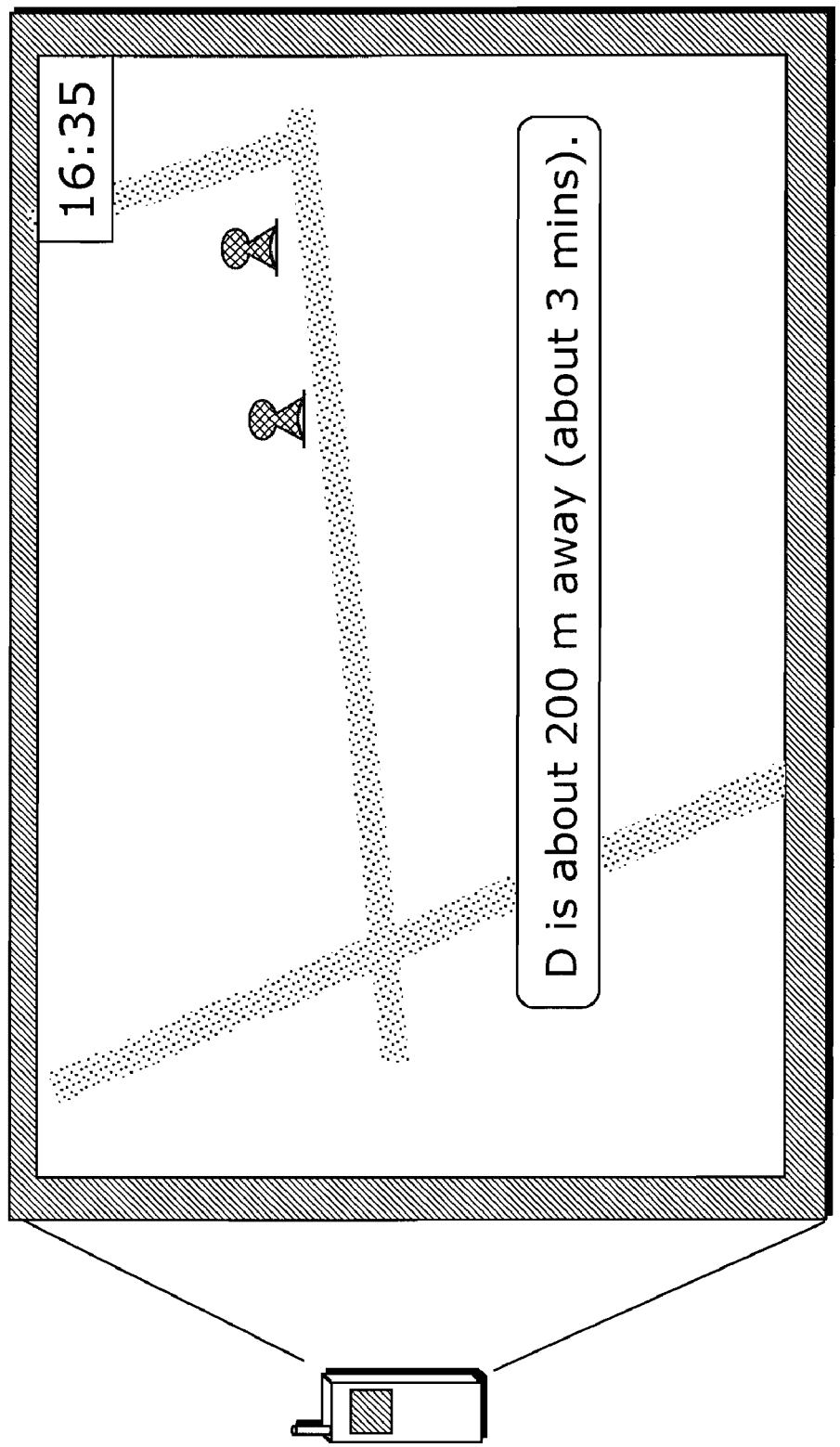
FIG. 27 is a diagram showing an example of a display of what is notified to the first terminal 120, that is, the position of the fourth terminal and a required-for-return time period, 3 minutes (200 meters), required to arrive the position of the fourth terminal. (Second Embodiment)

Subsequently, the accompanying starting position calculation unit 150 calculates a meeting point. The meeting point is calculated based on, for example, the traveling speed of the first terminal 120 and the traveling speed of the fourth terminal 123. Then, the position of the user of the fourth terminal 123 and a required-for-return time period required to arrive at the position of the fourth terminal 123 are notified to the first terminal 120. FIG. 27 is a diagram showing an example of a display of what is notified to the first terminal 120, that is, the position of the fourth terminal 123 and a required-for-return time period, 3 minutes (200 meters), required to arrive at the position of the fourth terminal 123.

Figure 28:
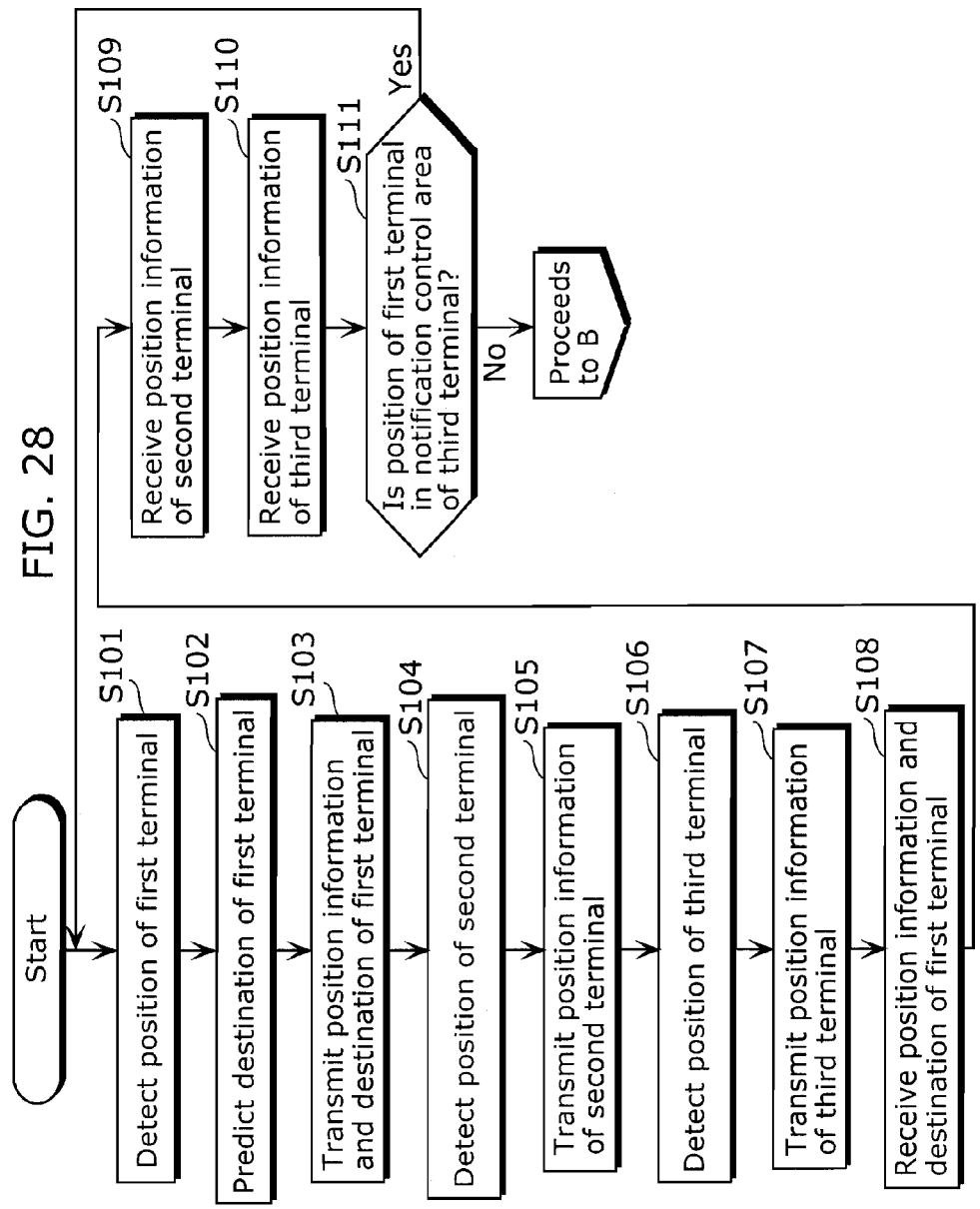
FIG. 28 is a flow chart showing steps of judging whether or not the first terminal and the third terminal have separated from each other. (Second Embodiment)
Figure 29:
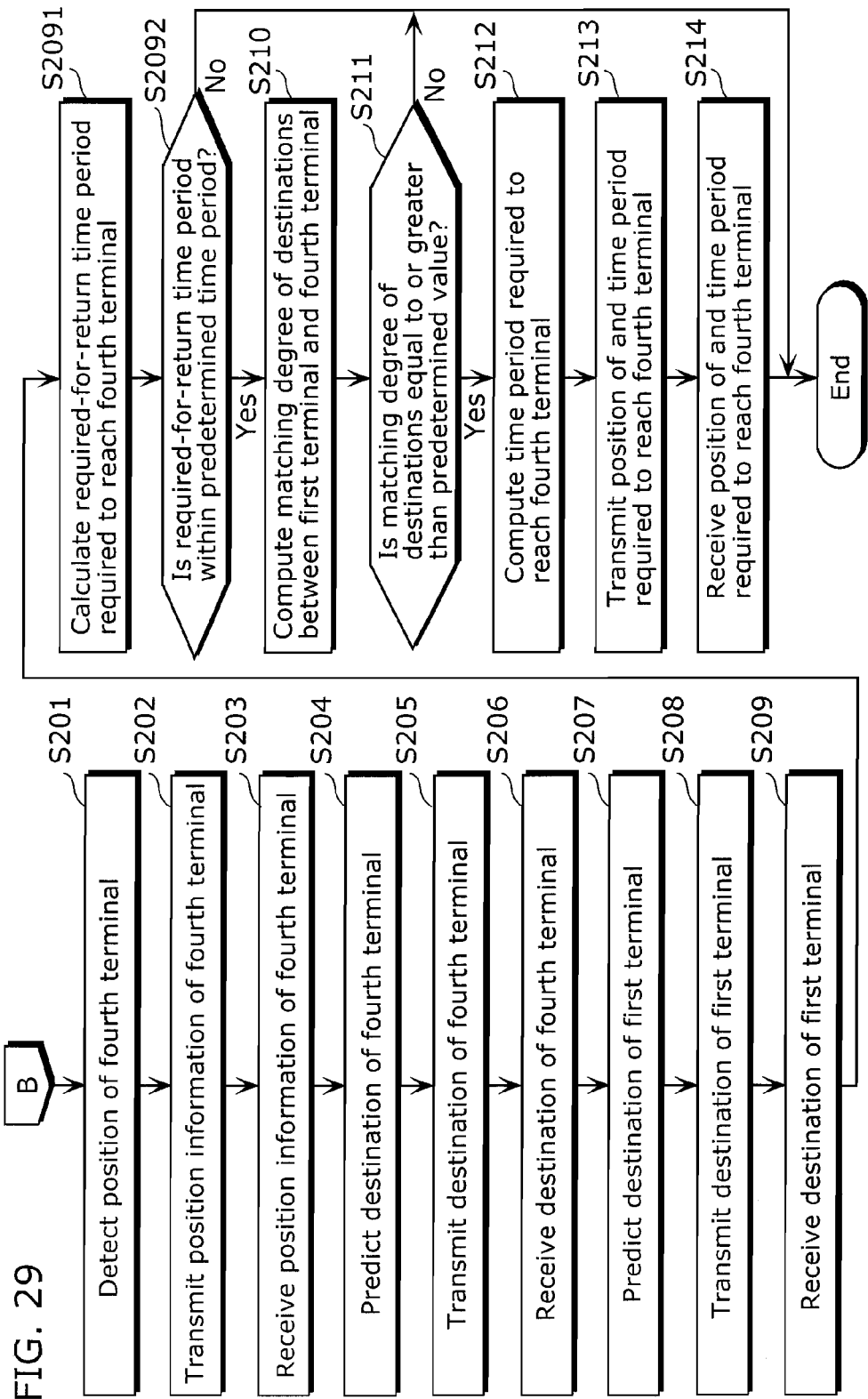
FIG. 29 is a flow chart showing steps of judging whether or not a friend D using the fourth terminal can accompany the child A using the first terminal after the first terminal has separated from the notification control area of the third terminal. (Second Embodiment)

FIG. 28 is a flow chart showing steps of judging whether or not the first terminal 120 and the third terminal 141 have separated from each other. FIG. 29 is a flow chart showing steps of judging whether or not the friend D using the fourth terminal 123 can accompany the child A using the first terminal 120 after the child A separates from the notification control area of the third terminal 141. Hereinafter, an operation flow of the present embodiment shall be described with reference to the flow charts shown in FIG. 28 and FIG. 29.

The operation up to the separation judgment based on a positional relationship between the first terminal 120 and the third terminal 141 (Step S101 through Step S111) is the same as that of the first embodiment. In the present embodiment, in the case of judging that the user of the first terminal 120 is traveling alone after separating from the third terminal 141 (Step S111), the following is further performed: determine an area surrounding the fourth terminal 123, whose user can accompany the user of the first terminal 120, as the next notification control area; and thus search for the fourth terminal 123 (proceeds to a flow B).

On the fourth terminal 123 side, at first, position information of the fourth terminal 123 is detected (Step S201), and is transmitted to the server (Step S202). Then on the server side, the position information of the fourth terminal 123 is received (Step S203). Further, in the present embodiment, a destination of the fourth terminal 123 is predicted (Step S204), and the predicted destination is transmitted (Step S205) for the server to receive it (Step S206). Likewise, a destination of the first terminal 120 is predicted (Step S207), and the predicted destination is transmitted (Step S208) for the server to receive it (Step S209).

Next, the required-for-return time period required to reach the fourth terminal 123 is calculated (Step S2091), and a judgment is made on whether or not the required-for-return time period is within a predetermined time period (Step S2092). In the case where the required-for-return time period is equal to or within a predetermined time period (Yes in Step S2092), that is, in the case where the user of the fourth terminal 123 can immediately meet the user of the first terminal 120, the user of the fourth terminal 123 is suitable to be a companion. Thus, accompanying is encouraged, and during the accompanied traveling, the notification to the parent and so on is suppressed. However, in the case where the users meet each other but then soon separate again, it may not be appropriate for them to travel together. Therefore, the matching degree, with respect to the destination of the fourth terminal 123 as a potential companion, is further taken into account (Step S210). Note that in the case where the required-for-return time period exceeds the predetermined time period (No in Step S2092), the operation ends.

Next, the matching degree between the predicted destination of the first terminal 120 and that of the fourth terminal 123 is computed (Step S210). Then a judgment is made on whether or not the computed matching degree is equal to or greater than a threshold value (Step S211). In the case of judging that the computed matching degree is equal to or greater than the threshold value (Yes in Step S211), the processing proceeds to Step S212, whereas in the case of judging that the computed matching degree is less than the threshold value (No in Step S211), the processing ends.

In the case of judging that the computed matching degree is equal to or greater than the threshold value (Yes in Step S211), the time period required to reach the fourth terminal 123 is computed (Step S212), and the position of the fourth terminal 123 and the computed time period are transmitted to the first terminal 120 (Step S213). The first terminal 120 receives them (Step S214), and encourages its user to meet the user of the fourth terminal 123 by displaying the received items on the display screen, for example. Traveling alone involves risks, however, such risks can be avoided by traveling with a user whose predicted destination has a matching degree equal to or greater than a predetermined value.

(Minimum Configuration)

Figure 30:
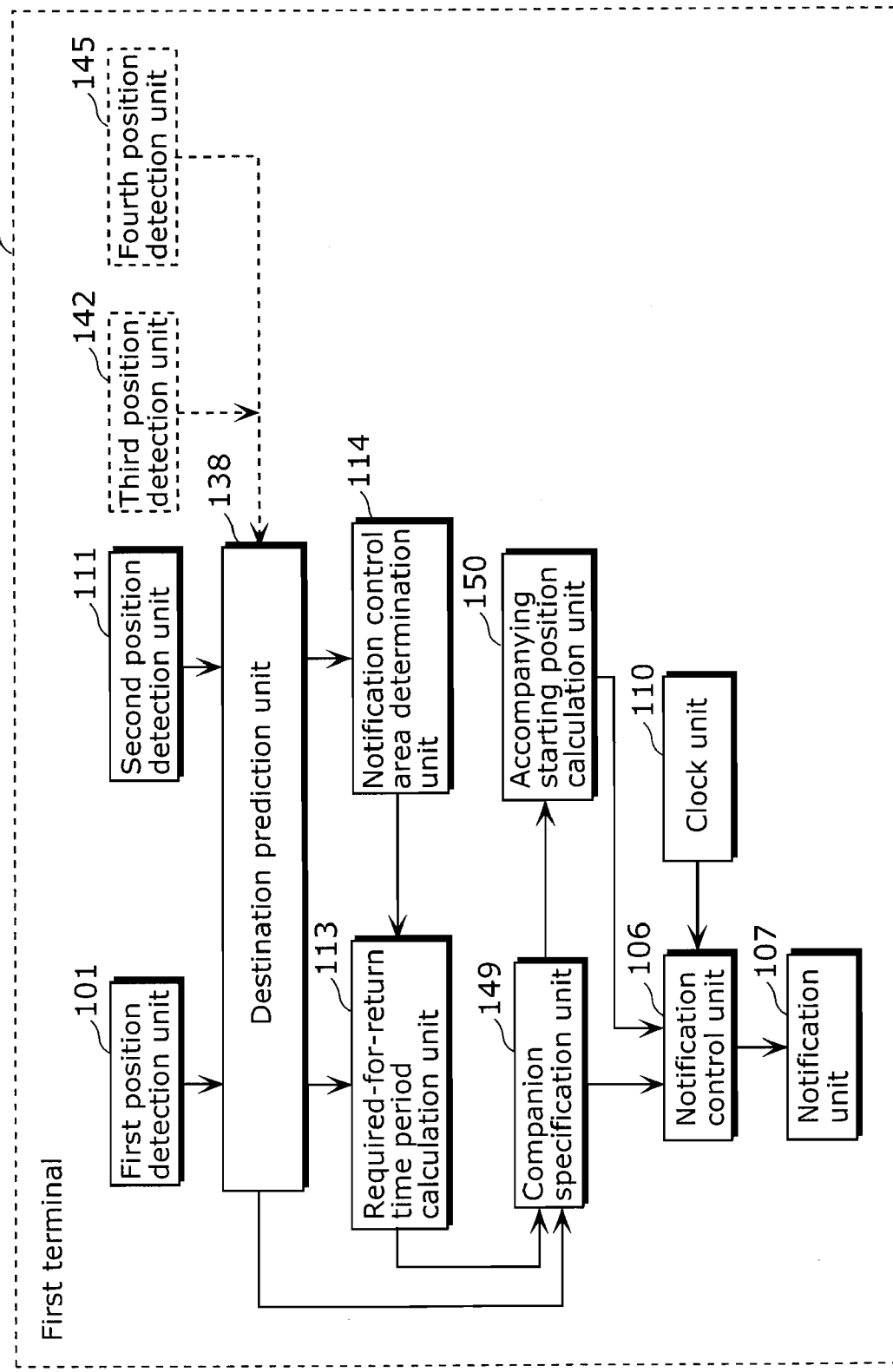
FIG. 30 is a diagram showing the configuration of the first terminal having the minimum configuration of the notification system according to the second embodiment. (Second Embodiment)

The present embodiment involves controlling of the notification by judging, based on the positional relationship between the first terminal 120 and the third terminal 141, whether or not the first terminal 120 has separated from the third terminal 141, and automatically calculating a required-for-return time period in the case of judging that they have separated from each other. Note, however, that the present invention is not limited to this. The notification may also be controlled by the child A and parent C themselves, or at any given timing, and thus, as in the first embodiment, the separation judgment unit 105 and the like are not essential in the configuration. In addition, in the present embodiment, the position information detected by each terminal is once transmitted to the server to perform the processing on the server side. Note, however, that the present invention is not limited to this. For example, the first terminal 120 used by the child A may detect the position information of the second terminal 121 used by the parent C and of the fourth terminal 123 used by the friend D to perform the series of processing, as in the first embodiment. Therefore, the present invention can also be achieved through the minimum constituent elements shown in FIG. 30. FIG. 30 is a diagram showing the configuration of the first terminal 120 having the minimum configuration of the notification system according to the second embodiment. More specifically, the first position detection unit 101, the second position detection unit 111, the third position detection unit 142, the fourth position detection unit 145, and the like detect the position information of their corresponding terminals, and a destination prediction unit 138 predicts a destination of each terminal. Then, based on the position and the predicted destination of each terminal, the notification control area determination unit 114 determines a notification control area where notification regarding the first terminal 120 is controlled. This is followed by the required-for-return time period calculation unit 113 calculating a time period required to arrive at the notification control area. Then the companion specification unit 149 specifies a terminal, from among the terminals, whose user is able to perform accompanying. Note that the dotted lines in the figure are to indicate that there are plural detection units which, here, include the third position detection unit 142 and the fourth position detection unit 145, since the terminal whose user is able to accompany the user of the first terminal 120 is specified from among plural terminals. In other words, the number of terminals may be other than four, and by detecting positions of plural terminals, one of them is specified as a companion. Then the accompanying starting position calculation unit 150 determines a position to meet the user of the terminal who has been specified as a companion, and the notification control unit 106 controls the notification.

(First Variation)

Figure 31:
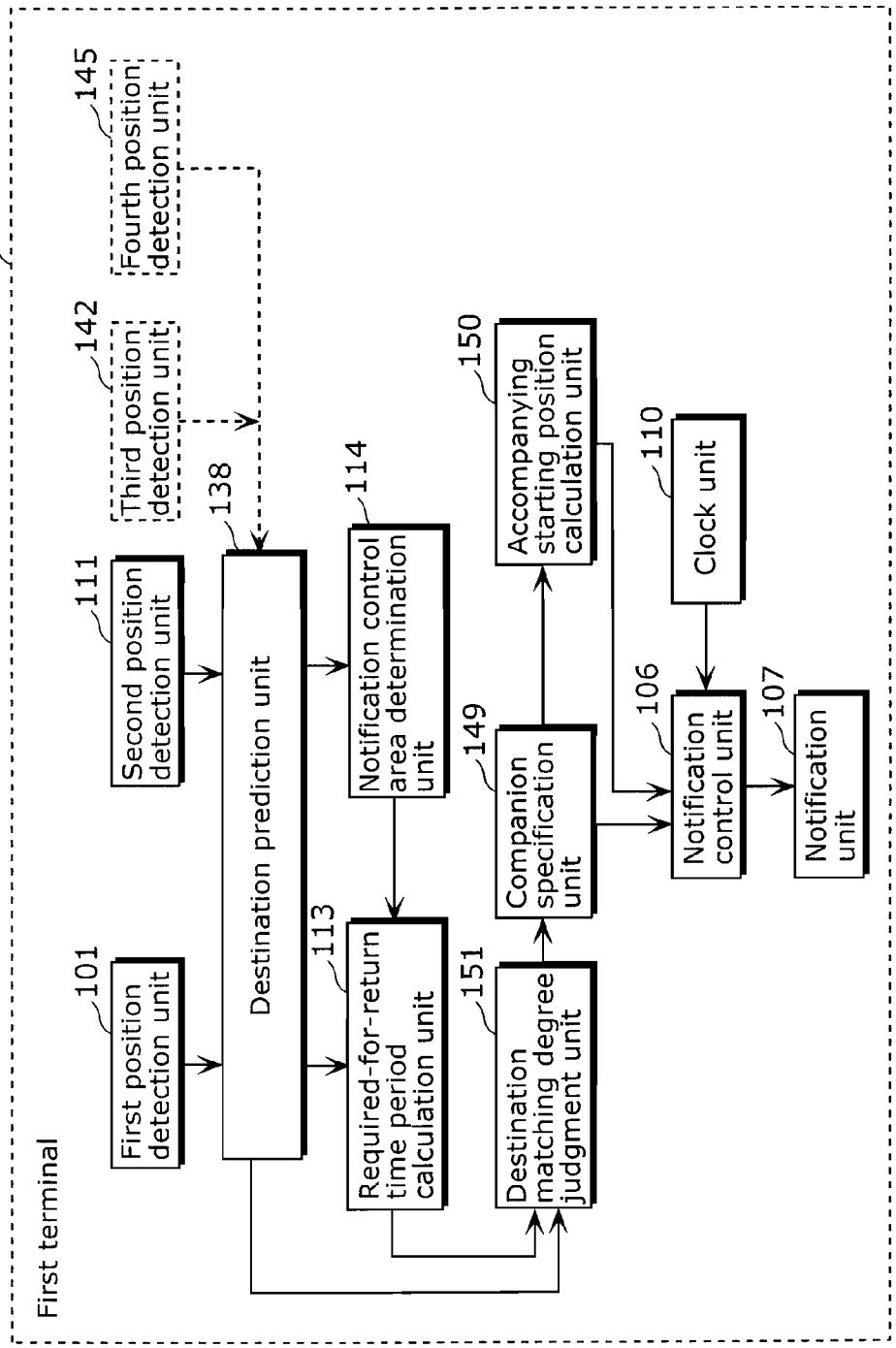
FIG. 31 is a diagram showing the configuration of the first terminal which predicts destinations of terminals used by third parities, and which includes a destination matching degree judgment unit which judges matching degrees between traveling routes to the predicted destinations of the third parities and the traveling route of the first terminal. (Second Embodiment)

In the present embodiment, the companion specification unit 149 specifies, as a companion, a third party who can perform accompanying. Note, however, that the third party may be more than one person in some cases. Therefore, the present embodiment has illustrated above the concept of matching degrees of destinations based on which the third party is determined as a companion. FIG. 31 is a diagram showing the configuration of the first terminal 120 which predicts destinations of terminals used by third parities, and which includes a destination matching degree judgment unit 151 which judges matching degrees between traveling routes to the predicted destinations of the third parties' terminals and the traveling route of the first terminal 120. Instead of performing the above processing through the companion specification unit 149, the destination matching degree judgment unit 151 may be separately provided to judge the matching degrees with respect to the destinations of the respective terminals predicted by the destination prediction unit 138 (FIG. 31). Hereinafter, description is provided using a specific example. The destination matching degree judgment unit 151 is equivalent to a matching route distance calculation unit which calculates a matching distance representing a distance for which each of the traveling routes of the second users matches the traveling route of the first user, the traveling routes of the first user and the second users being predicted by the traveling route prediction unit. The companion specification unit 149, equivalent to the companion specification unit, specifies, as a companion, a second user having a longest matching distance from the accompanying starting position, the second user being specified from among the second users.

Figure 32:
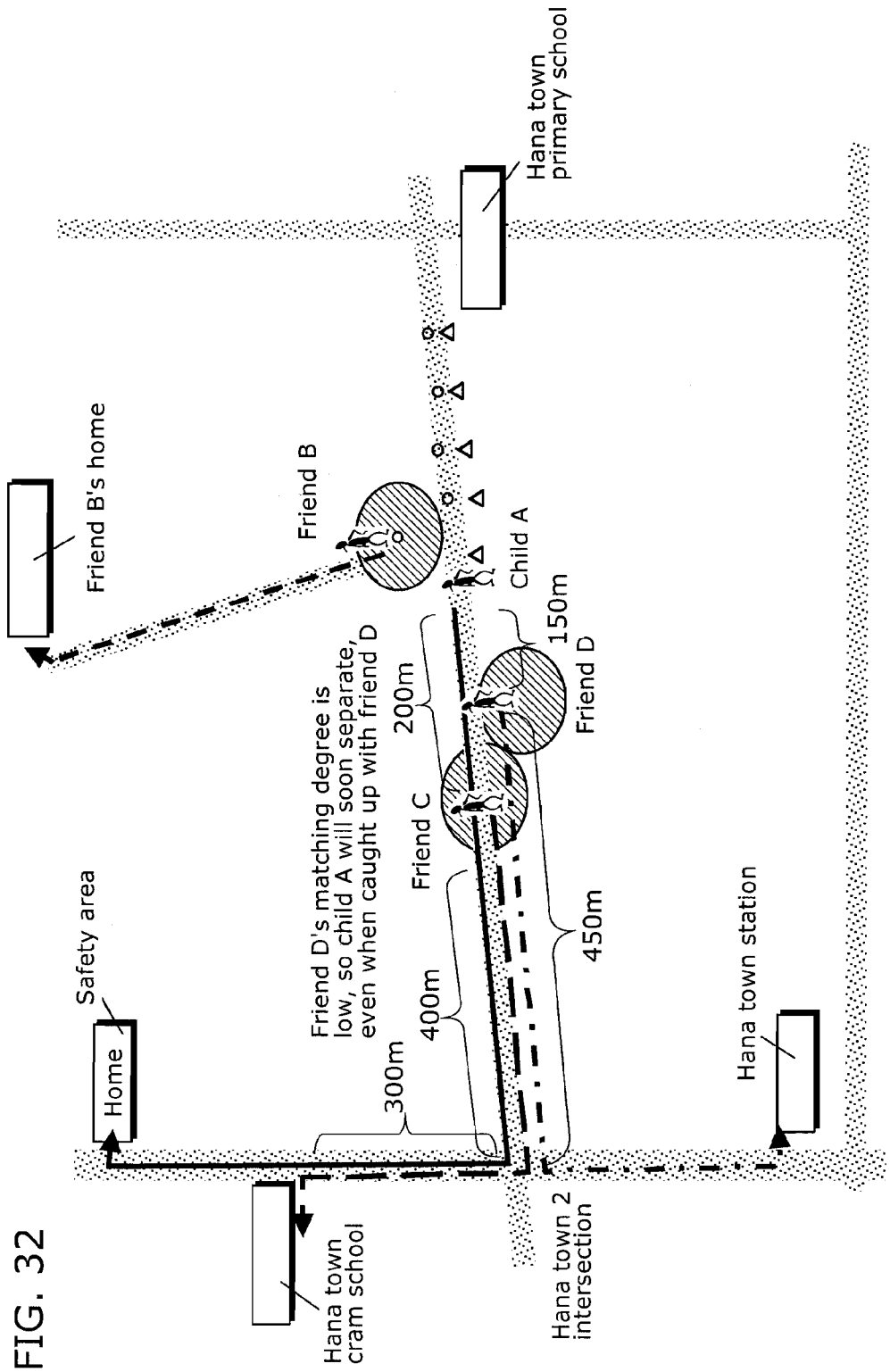
FIG. 32 is a diagram showing, as in FIG. 25 and so on, positional relationships between the child A who has separated from the friend B, and a friend C and the friend D who are potential companies of the child A. (Second Embodiment)

FIG. 32 is a diagram showing, as in FIG. 25 and so on, positional relationships between the child A who has separated from the friend B, and a friend C and the friend D who are potential companies of the child A. The position of each terminal detected is shown. Further, the destination of each terminal predicted by the destination prediction unit 138 is shown using: an arrow with a solid line for the child A; an arrow with a broken line for the friend C; and an arrow with an alternate long and short dashed line for the child D. For example, the child A is going "home". The friend B who has separated from the child A is also going his or her home. The friend C who is ahead of the child A is going to "Hana town cram school". Meanwhile, the child D who is also ahead of the child A is going to the "Hana town station".

The destination matching degree judgment unit 151 at first searches for a terminal whose traveling route matches, even partially, the route to the child A's predicted destination that is "home". In the example illustrated in FIG. 32, the terminals of the friend C and the friend D are applicable since the friend C's and the friend D's positions are on the route to the child A's predicted destination and their destinations partially match the child A's destination. Furthermore, the destination matching degree judgment unit 151 computes matching degrees between the destinations. In FIG. 32, the friend C's destination is "Hana town cram school" which is down the road after turning right at the "Hana town 2 intersection", and thus 700 m of the friend C's traveling route matches the traveling route of the child A as a matching distance. In contrast, the friend D's destination is the "Hana town station" which is down the road after turning left at the "Hana town 2 intersection", and thus 450 m of the friend D's traveling route matches the traveling route of the child A as a matching distance. For example, when the threshold value of matching distance is 200 m as mentioned above, the matching distances of the friend C and the friend D are greater than the threshold value. Consequently, it is assumed that the terminal having the traveling route with the longest matching distance is specified as a companion. In the present example, the friend C with the matching distance of 700 m is specified as a companion.

Figure 33:
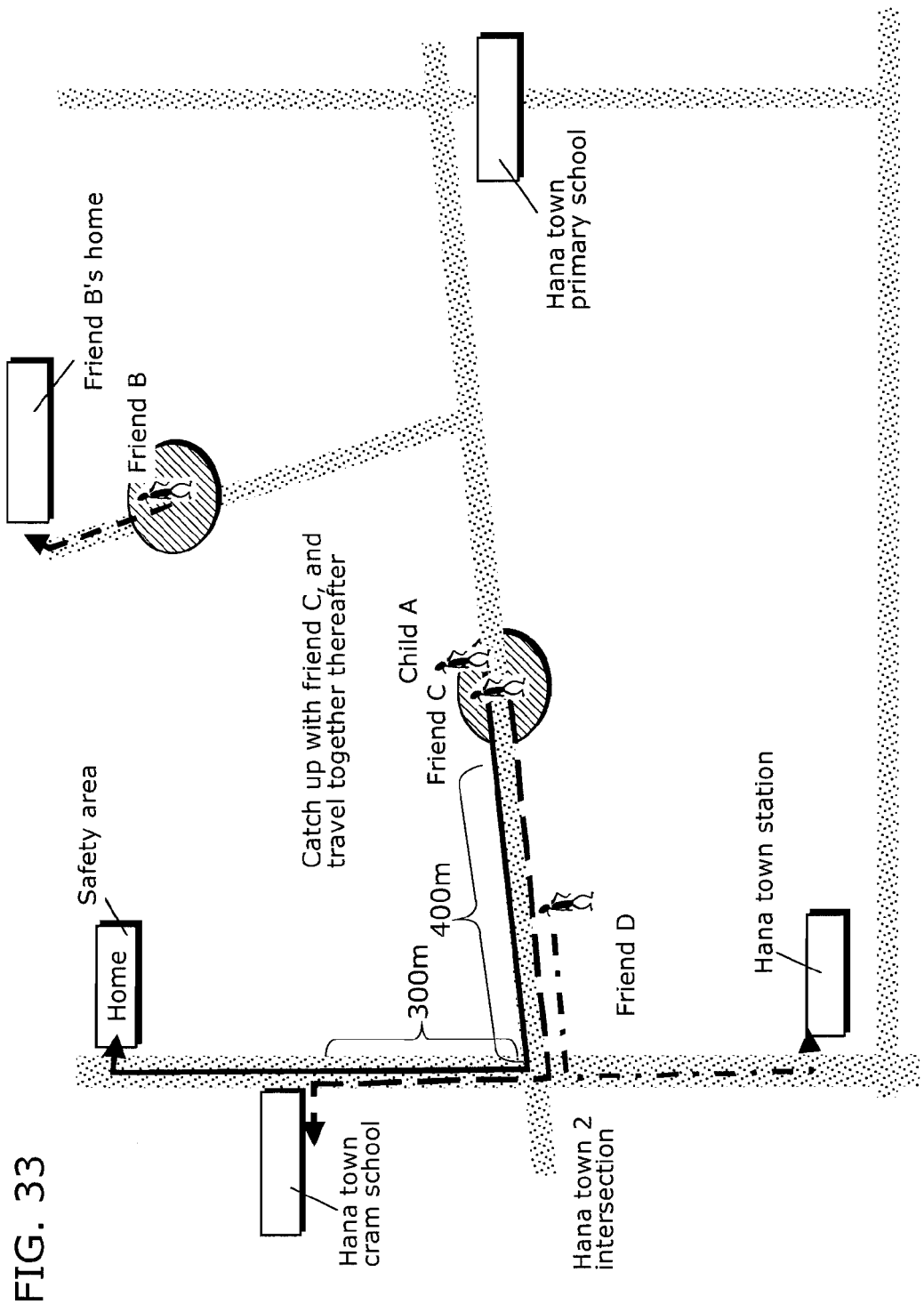
FIG. 33 is a diagram showing, with the positional relationships shown in FIG. 32, a situation following the specification of the friend C as a companion and the meeting of the friend C and the child A at the friend C's position (that is, accompanying starting position). (Second Embodiment)

Subsequently, the accompanying starting position calculation unit 150 calculates a point at which the child A starts traveling with the specified companion. For example, accompanied traveling is enabled by letting the friend C and the child A meet each other through notifying the friend C to wait at the position where he was when specified as a companion and notifying the child A of this position. FIG. 33 is a diagram showing, with the positional relationships shown in FIG. 32, a situation following the specification of the friend C as a companion and the meeting of the friend C and the child A at the friend C's position (that is, accompanying starting position). The figure shows that the child A has caught up with the friend C, and that they are going to travel together for the next 700 m. In order to protect children against crimes, it is desirable to shorten the distance and time of traveling alone, and let them travel with friends, parents, teachers, and so on, as much as possible. In view of the foregoing, the companion specification unit 149 of the present embodiment encourages the child A to catch up with the friend C. This is because the matching degree between the destinations judged by the destination matching degree judgment unit 151 shows that catching up with and traveling with the friend C who is 200 m ahead allows 700 m of accompanied traveling, which is longer in terms of distance compared with the case of catching up and traveling with the friend D who is 150 m ahead.

The whole operation flow of the present embodiment has been described above, but here, the detailed operation flow with regard to the companion specification shall be described with reference to FIG. 34. FIG. 34 is a flow chart showing steps of processing performed in the case of specifying, as a companion, a third party who allows a longer accompanied traveling with the child A in terms of distance.

At first, position information of the first terminal 120 serving as a basis of the companion specification is detected (Step S301), and a destination thereof is predicted (Step S302). Meanwhile, position information of terminals used by third parties who are potential companies is detected (Step S303), and a destination of each of the detected terminals is predicted (Step S304). Note that the system illustrated here is assumed to have more than one terminal whose user is a potential companion, and from among the plural terminals, a companion is specified based on their positions and destinations.

At first, extracted are terminals used by third parties who are potential companies having a traveling route that partially matches the predicted traveling route of the first terminal 120 (Step S305), and then a judgment is made on whether or not there is an applicable terminal (Step S306). In the case of judging that there is an applicable terminal, the processing proceeds to Step S307; otherwise it ends. Given the positional relationships illustrated in FIG. 32, the terminals used by the friend C and the friend D are applicable since the friend C's and the friend D's positions are on the child A's predicted traveling route and thus their destinations partially match that of the child A. In the case where there is a terminal whose user is a potential companion (Yes in Step S306), a matching distance is calculated (Step S307) to judge whether or not the calculated matching distance is equal to or longer than a threshold value, for example (Step S308). In the case of judging that the calculated matching distance is equal to or longer than the threshold value, the processing proceeds to Step S309, and in the case of judging that the calculated matching distance is less than the threshold value, the processing ends. The processing ends in the case of judging that the calculated matching distance is less than the threshold value, because the third party and the child A will soon separate again. However, the threshold value may be set to zero, in other words, accompanying may be encouraged as long as there is a matching distance, in consideration to a higher level of safety for children.

In the case of judging that the calculated matching distance is equal to or longer than the threshold value (Yes in Step S308), the user of this terminal is specified as a companion (Step S309). Note that when there are more than one applicable terminal in Step S306, the user of the terminal having the longest matching distance may be specified as a companion in Steps 308 and 309 after calculating the matching distance of each terminal in Step S307. Given the positional relationships illustrated in FIG. 32, the matching distance of the friend C is 700 m whereas the matching distance of the friend D is 450 m, and thus the friend C is specified as a companion.

The current position of the terminal specified as a companion is calculated as a point at which the accompanying starts (Step S310), and is notified to the third terminal 141 whose user is the companion (Step S311), and to the first terminal 120 (Step S312).

(Second Variation)

Note that in the above variation, the companion's current position is calculated as the accompanying starting position at which the accompanying starts. That is to say, when specified as a companion, the companion is asked to wait at the current position, and the user of the first terminal 120, who needs to be protected, travels to this position to meet the companion. This is to shorten, even if only slightly, the distance and time for the user of the first terminal 120, who needs protection, to travel alone. However, in real life, the companion is also in the middle of traveling to a destination, and thus waiting at the current position could result in being late at the destination. Therefore, the accompanying starting position may be calculated taking into account the traveling of both the first terminal 120 and the companion, for example, so that the companion can continue traveling even after being specified as a companion. In other words, rather than making the companion wait, the user of the first terminal 120 catches up with the companion. Hereinafter, description is provided using a specific example. Further, graphs are used here to show traveling associated with time.

Figure 35:
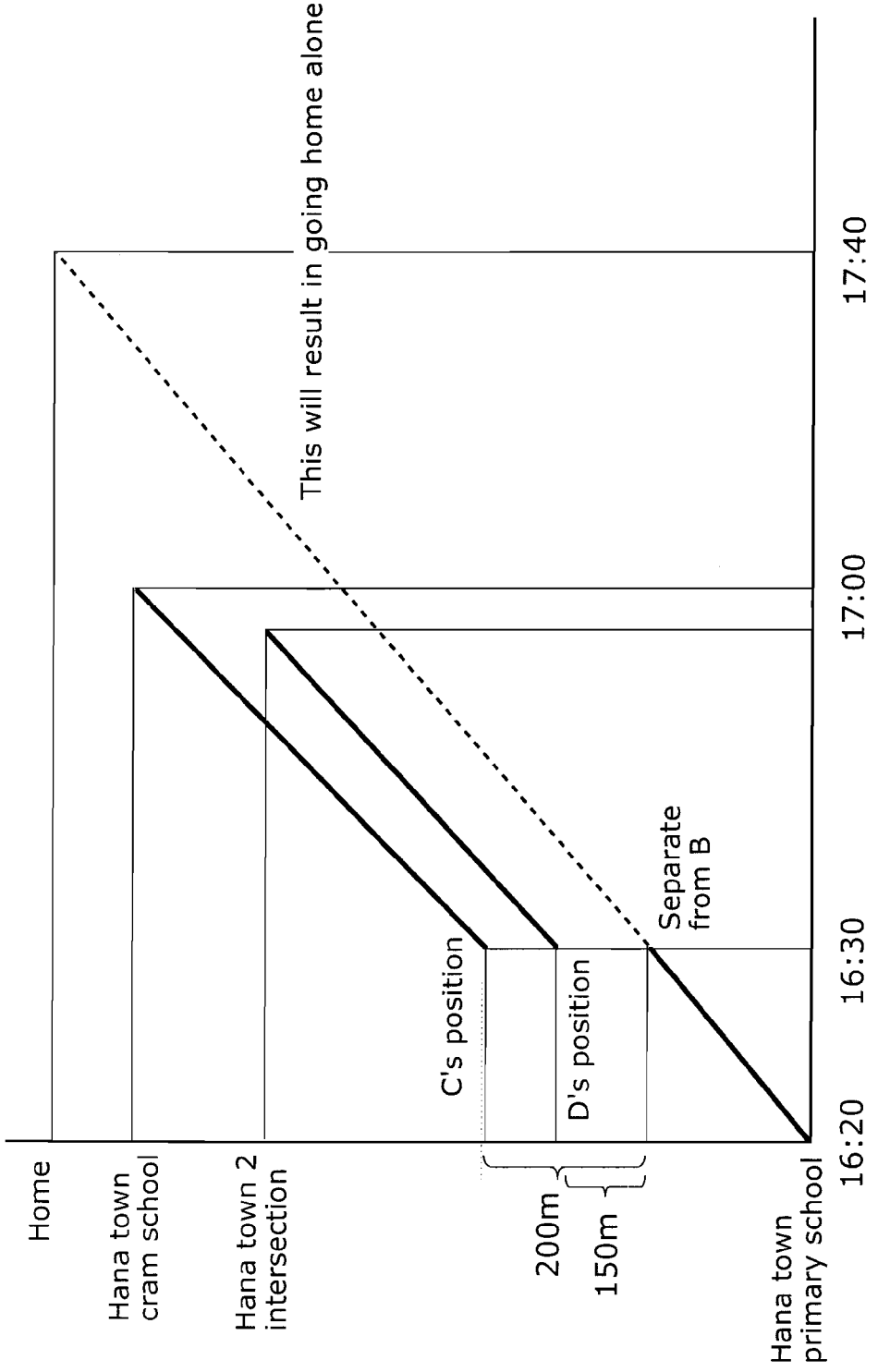
FIG. 35 is a graph showing the positional relationships illustrated in FIG. 32 and subsequent traveling. (Second Embodiment)

FIG. 35 is a graph showing the positional relationships illustrated in FIG. 32 and subsequent traveling. The horizontal axis is assumed to represent time, and the vertical axis distance. Note that the distance shown along the vertical axis represents the predicted traveling route of the first terminal 120, that is, in the present embodiment, the child A who needs protection. Each straight line represents a user's traveling. For example, it is shown that the child A left "Hana town primary school" with the friend B at 16:20, and then separated from the friend B along the way. The slope of each straight line represents speed. Continuing to go home at the current speed after 16:20 allows arrival at home at 17:40. This traveling is shown by the dotted line in this case.

Figure 36:
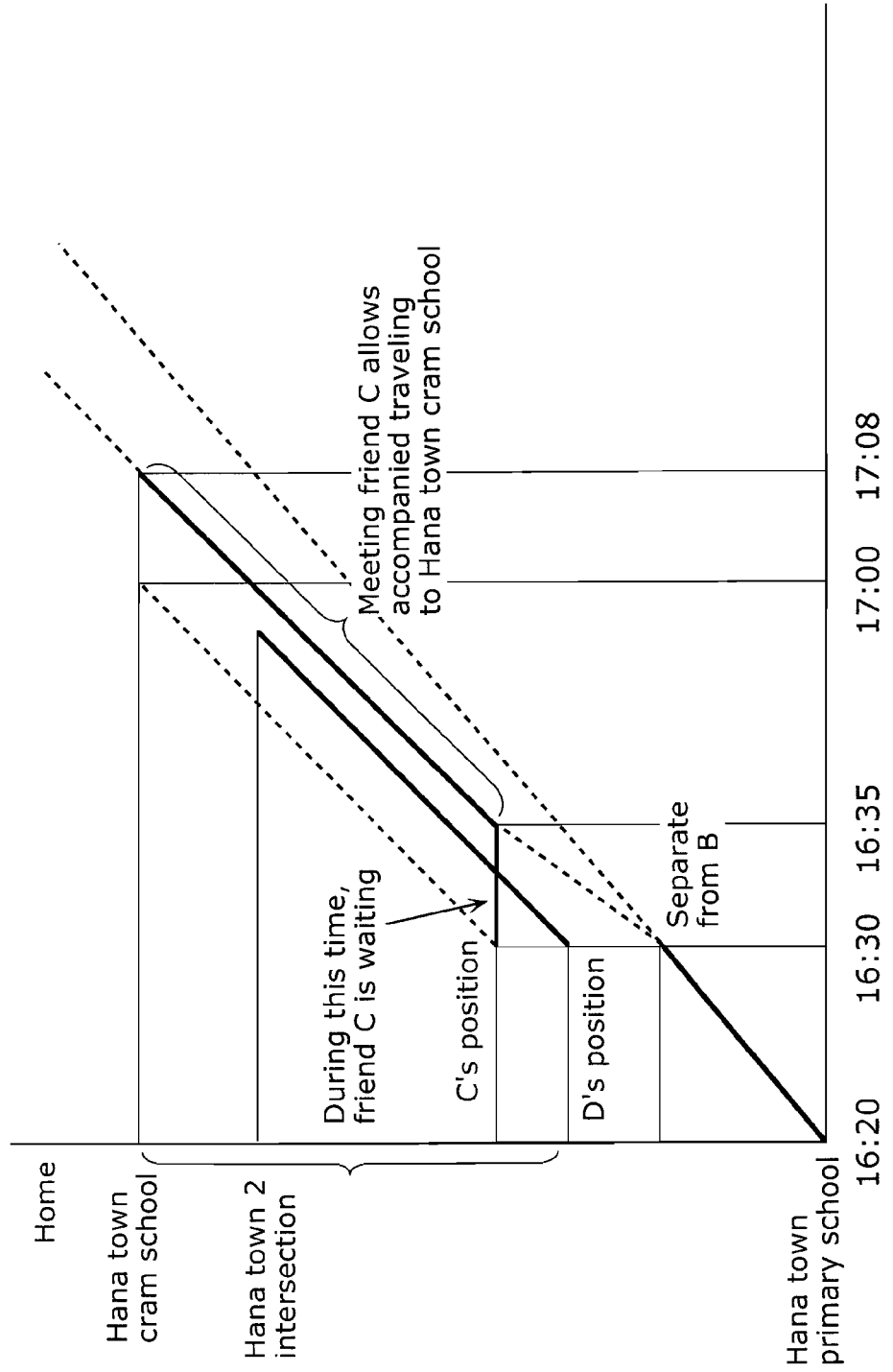
FIG. 36 is a graph showing the case where the friend C is asked to wait at the position where he is when the child A has become alone, and the child A and the friend C meet each other at 16:35. (Second Embodiment)

The present system obtains position information of other terminals and information regarding destinations and traveling routes of other terminals. Based on the obtained information, terminals which are currently on the traveling route of the first terminal 120 or terminals which will be on the traveling route of the first terminal 120 in the near future are extracted so that their users are specified as companions who can perform accompanying. Given the positional relationships illustrated in FIG. 32, the extraction of applicable third parties shows that the friend C and the friend D are on the traveling route of the first terminal 120. To be more specific, the child A and the friend D will be on the same traveling route up to the "Hana town 2 intersection", whereas the child A and the friend C will be on the same traveling route up to "Hana town cram school". Accordingly, the straight lines in the graph of FIG. 35 show that the friend C and the friend D are detected at 16:30 when the child A separates from the friend B. Further, it shows that after 16:30 the child A takes the same traveling route with the friend D up to the "Hana town 2 intersection", and with the friend C up to "Hana town cram school". However, since the friend D is ahead of the child A by 150 m and the friend C is ahead of the child A by 200 m as shown in FIG. 32 and FIG. 35, if everyone continues to travel at their own current speed, the child A is not going to meet the friend C or the friend D, and has to go home alone. In view of the foregoing, the above example has shown that the friend C who has been specified as a companion is asked to wait at his or her current position to meet with the child A. FIG. 36 shows the traveling in this case.

FIG. 36 is a graph showing the case where the friend C is asked to wait at the position where he is when the child A has become alone, and the child A and the friend C meet each other at 16:35. It shows that after they meet, they travel together until 17:08 when they arrive at "Hana town cram school".

However, in the above example, taking into account the absolute matching distance calculated when specifying a companion, the accompanied traveling starts after the companion waits for the child A at his or her current position. For example, the friend C, in the case of continuing to travel as he has been, can arrive at Hana town cram school at 17:00, however, waiting for the child A results in the arrival time to be 17:08, which shows that the wait caused by the accompanying can be inconvenient in some cases. Therefore, even when specified as a companion, it is sometimes preferable for the companion to continue traveling and for the child A to catch up with the companion.

Figure 37:
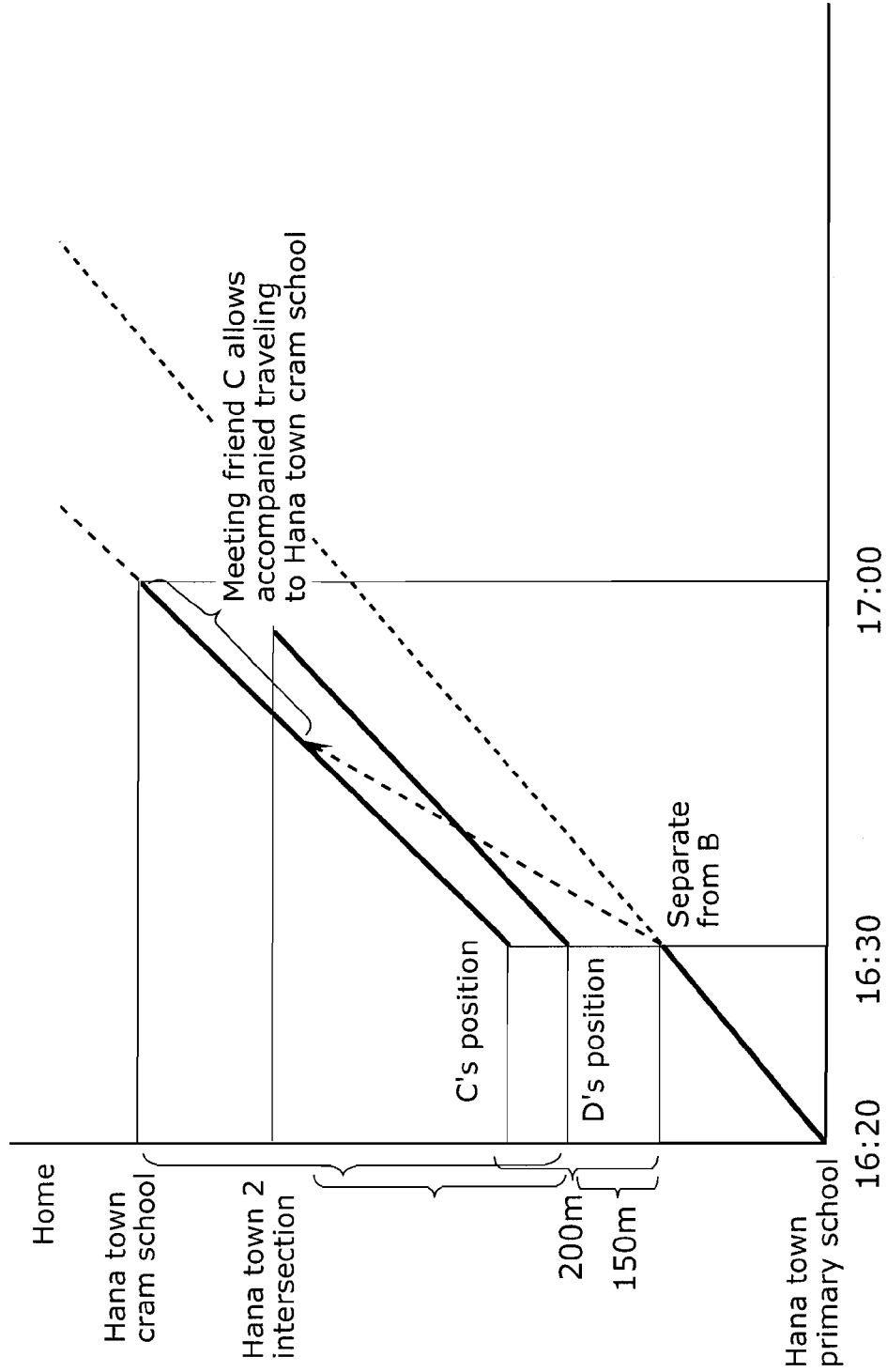
FIG. 37 is a graph showing the case where the friend C, specified as a companion, continues traveling at the same speed without waiting for the child A at his or her position, and the child A travels faster to catch up with the friend C for the accompanied traveling. (Second Embodiment)

FIG. 37 is a graph showing the case where the friend C, specified as a companion, continues traveling at the same speed without waiting for the child A at his or her position, and the child A travels faster to catch up with the friend C for the accompanied traveling. More specifically, the graph shows that the child A catches up with the friend C before reaching the "Hana town 2 intersection" and thereafter travels with the friend C. Meanwhile, the graph shows that this case, in contrast to FIG. 36, results in a different accompanying starting position and a shorter distance for the accompanied traveling. Therefore, instead of merely computing the absolute distance at the time of separation from the friend B, the matching degree and the accompanying starting position may be computed with the subsequent traveling taken into account.

Figure 38:
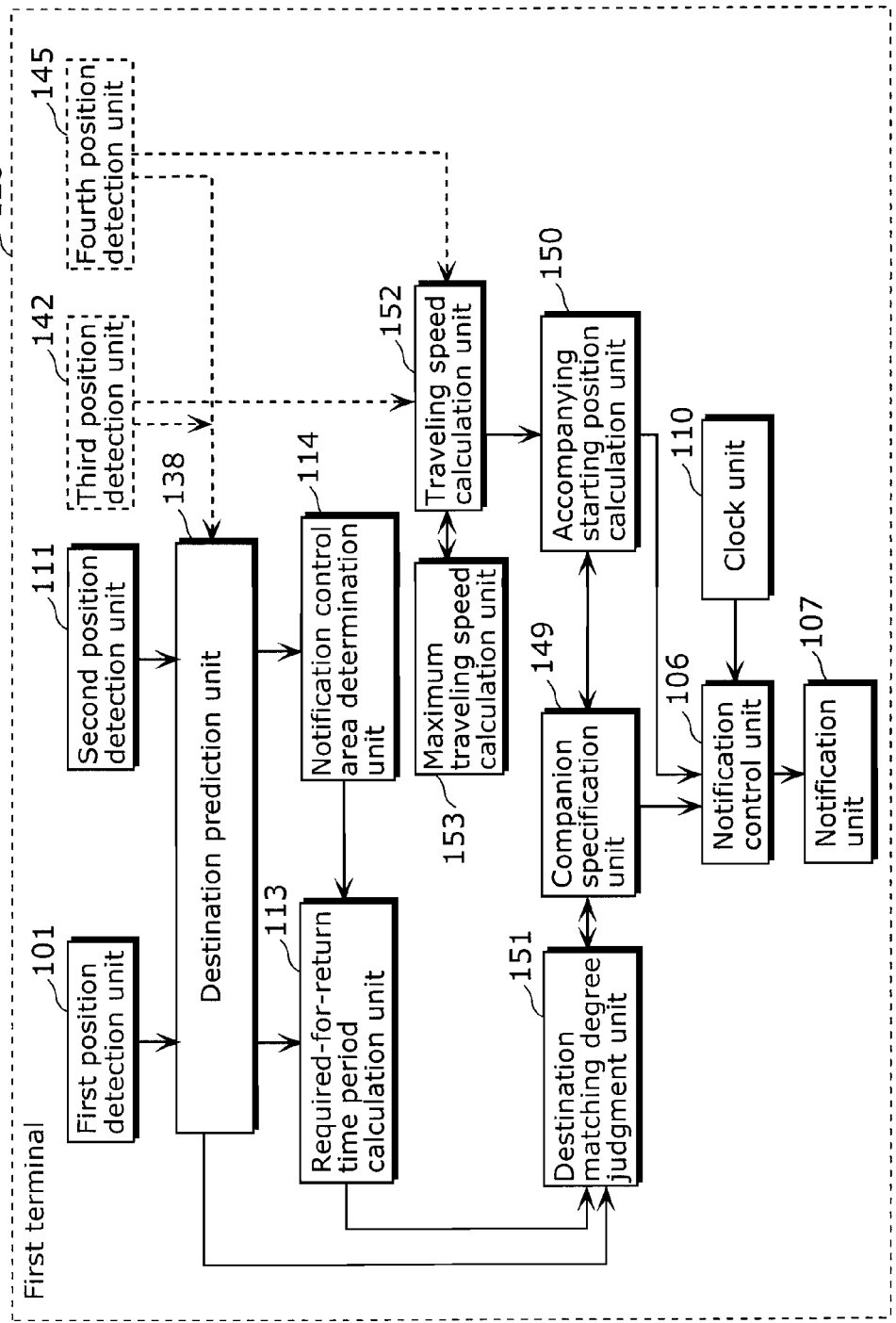
FIG. 38 is a diagram showing the system configuration in the case of specifying a companion and calculating an accompanying starting position with the subsequent traveling of both the child A and the friend C taken into account. (Second Embodiment)

FIG. 38 is a diagram showing the system configuration in the case of specifying a companion and calculating an accompanying starting position with the subsequent traveling of both the child A and the friend C taken into account. In addition to the constituent elements shown in FIG. 31, a traveling speed calculation unit 152 and a maximum traveling speed calculation unit 153 are included. The traveling speed calculation unit 152 is a means for calculating the traveling speed of each terminal. The traveling speed may be, for example, an average walking speed (80 m per minute, for example) or the average speed of each terminal user calculated based on his or her position information and the like detected in usual situations. Further, the maximum traveling speed calculation unit 153 is a means for calculating the maximum speed of traveling in catching up with the terminal user who has been specified as a companion and who continues traveling. The maximum traveling speed may be set depending on the terminal as in the following manner, for example: when the user catching up with the companion is a child or an elderly person, it is set to be twice faster than the average speed, and in the case of a normal adult, three times faster than the average speed, and so on. The present example employs these speeds to calculate the accompanying starting position, and then specifies a companion based on the distance for which accompanying is possible. Hereinafter, a specific example shall be described with reference to FIG. 39 and FIG. 40. The traveling speed calculation unit 152 is equivalent to: a first terminal speed calculation unit which calculates a first speed which is a speed of the first user using the first terminal; and a second terminal speed calculation unit which calculates, for each of the second terminals, a second speed which is a speed of one of the second users using one of the second terminals. The accompanying starting position calculation unit 150, equivalent to the accompanying starting position calculation unit, calculates, as the accompanying starting position, a meeting point at which the first user and at least one of the second users meet in the case where the first user and the at least one of the second users travel along the respective traveling routes at the calculated first speed and second speed, respectively, the traveling routes being predicted by the traveling route prediction unit.

Figure 39:
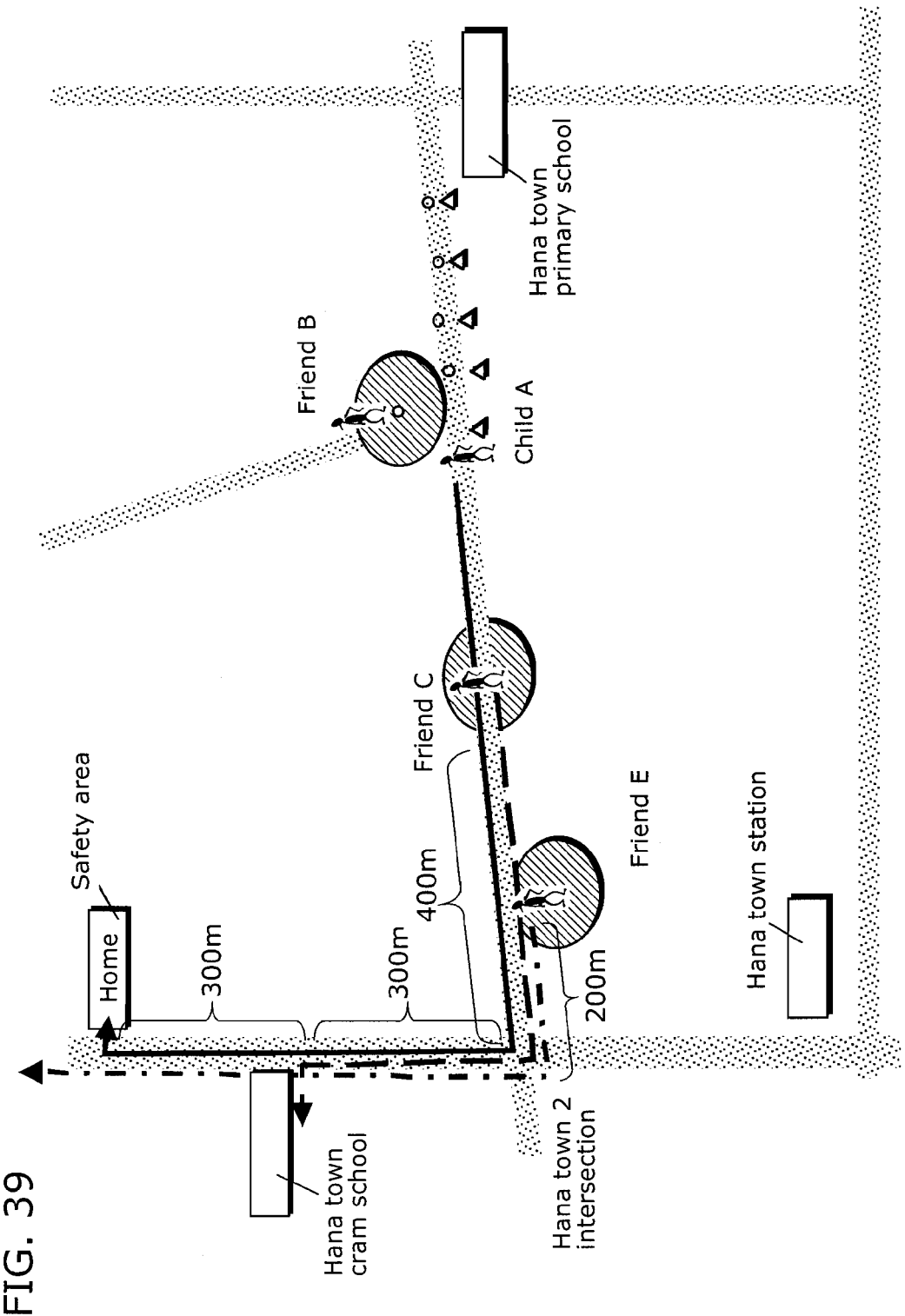
FIG. 39 is a map showing positional relationships between the child A and other terminal users, as in FIG. 32 and so on. (Second Embodiment)
Figure 40:
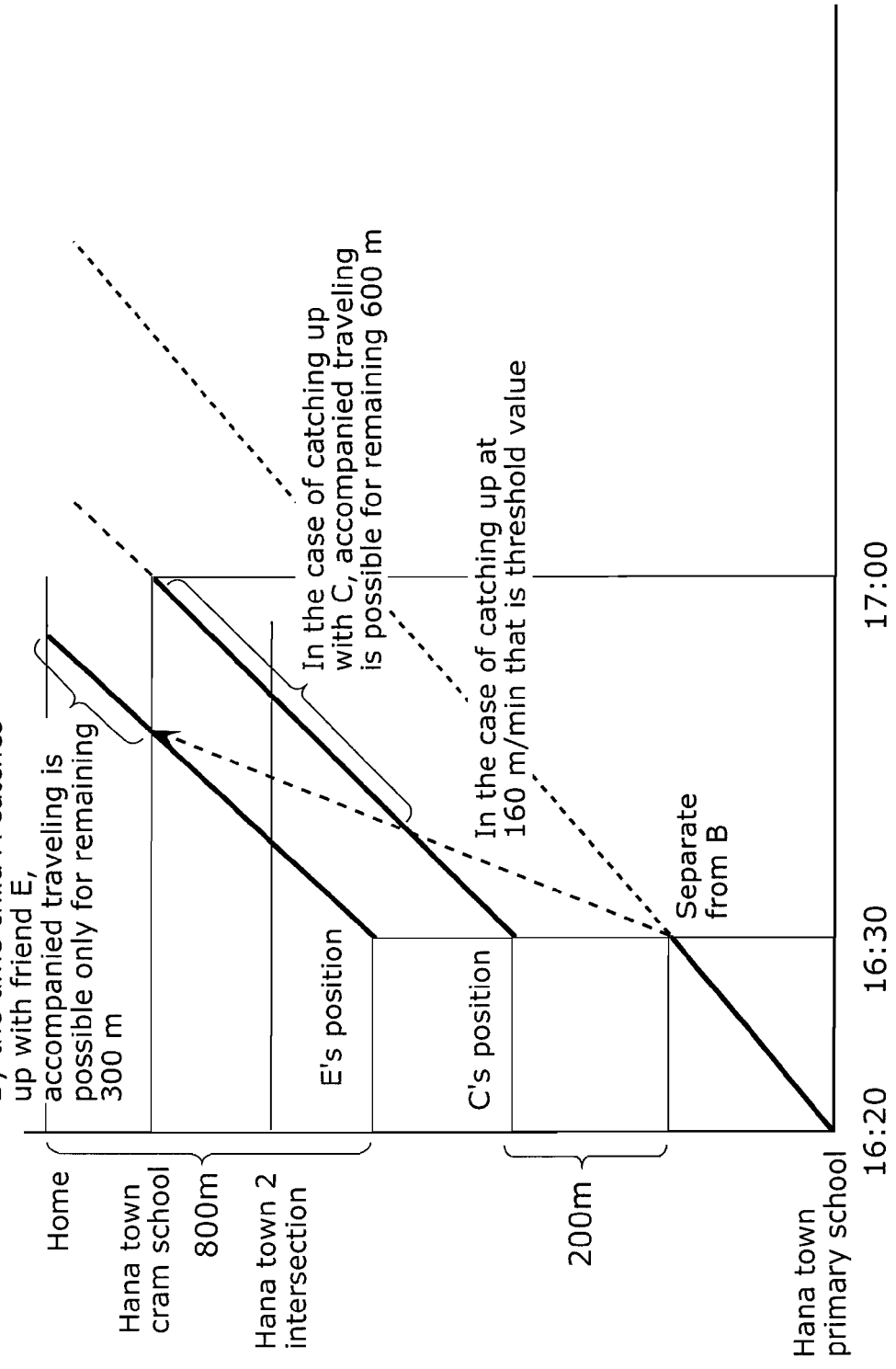
FIG. 40 is a graph showing a third party with whom the child A can travel a longer distance in the case where the child A travels at the maximum speed after separating from the friend B's notification control area. (Second Embodiment)

FIG. 39 is a map showing positional relationships between the child A and other terminal users, as in FIG. 32 and so on. In FIG. 39, the friend C and the child A who has now separated from the friend B can travel together for 700 m up to "Hans town cram school". In contrast, the child A can travel with a friend E for 800 m up to the child A's home. Consequently, when only the current positional relationships are taken into consideration, the matching traveling distance is longer with the friend E. However, since the friend E and the friend C continue to travel, by the time the child A catches up with the friend E or the friend C, the accompanying starting position and the distance for the accompanied traveling will change. Even if the child A quickly catches up with the friend E or the friend C, the distance for the accompanied traveling may become shorter in some cases. Hereinafter, description shall be provided with reference to the graph shown in FIG. 40. FIG. 40 is a graph showing a third party with whom the child A can travel a longer distance in the case where the child A travels at the maximum speed after separating from the friend B's notification control area.

In this case, the maximum traveling speed calculation unit 153 is equivalent to a maximum traveling speed calculation unit which calculates a maximum traveling speed at which the first user can travel towards the second users, based on the first speed calculated by the first terminal speed calculation unit, and the accompanying starting position calculation unit 150, equivalent to the accompanying starting position calculation unit, calculates, as the accompanying starting position, a meeting point at which the first user and at least one of the second users meet in the case where the first user travels along the traveling route at the calculated maximum traveling speed and the at least one of the second users travels along the traveling route at the calculated second speed, the traveling routes of the first user and the at least one of the second users both being predicted by said traveling route prediction unit.

For example, it is assumed that the maximum speed possible for the child A is 160 m per minute. The graph in FIG. 40 shows the case where the child A travels at this speed. On the other hand, the friend C and the friend E are assumed to travel at their unchanged speeds. The intersection of the straight lines and the dotted line represents a point at which the respective parties meet each other, and the length of each straight line extending from the intersection represents the distance for which accompanied traveling is possible. In this case, the accompanied traveling with the friend E is possible only for the remaining 300 m. In contrast, the accompanied traveling with the friend C is possible for the remaining 600 m. Therefore, the friend C is specified as a companion, and the intersection of the straight line extending from the friend C's position and the dotted line is calculated as an accompanying starting position. This is followed by notification of the accompanying starting position and a required time period.

Figure 41:
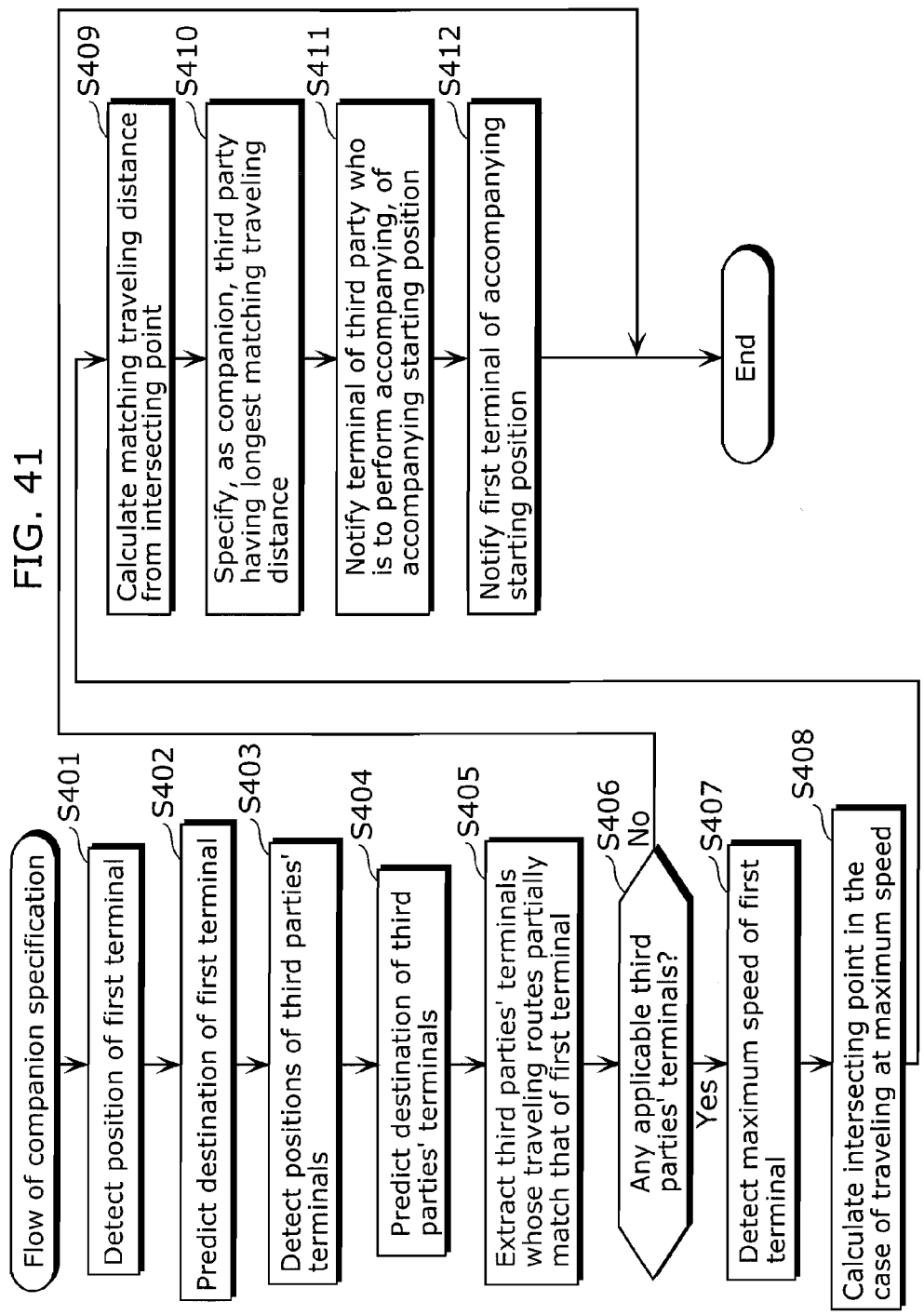
FIG. 41 is a flow chart showing steps of searching for a third party with whom the child A can travel a longer distance in the case where the child A travels at the maximum speed. (Second Embodiment)

With reference to FIG. 41, the following shall describe the detailed operation flow of specifying a user as a companion, with the subsequent traveling of both the child A and the companion taken into account. FIG. 41 is a flow chart showing steps of searching for a third party with whom the child A can travel a longer distance in the case where the child A travels at the maximum speed.

At first, position information of the first terminal 120 serving as a basis of the companion specification is detected (Step S401), and a destination thereof is predicted (Step S402). Meanwhile, position information of terminals used by third parties who are potential companies is detected (Step S403), and a destination of each of the detected terminals is predicted (Step S404). Then, extracted are terminals used by third parties who are potential companies having a traveling route that partially matches the predicted traveling route of the first terminal 120 (Step S405).

Then a judgment is made on whether or not there is an applicable terminal (Step S406). In the case of judging that there is an applicable terminal (Yes in Step S406), the processing proceeds to Step S407; otherwise (No in Step S406) it ends. Given the positional relationships illustrated in FIG. 39, the terminals of the friend C and the friend D are applicable since the friend C's and the friend E's positions are on the child A's predicted traveling route and thus their traveling routes partially match that of the child A. In the case where there is a terminal whose user is a potential companion (Yes in Step S406), the maximum speed, at which the child A using the first terminal 120 can travel to catch up with the potential companion, is calculated (Step S407). Then calculated is a meeting point in the case where the child A travels at the maximum speed (Step S408). In the case shown by the graph of FIG. 40, calculated are the meeting point for meeting the friend C and the meeting point for meeting the friend E. Then the matching distance from the meeting point is calculated (Step S409). In the case of the example shown in FIG. 40, the matching distance of the friend C is calculated to be the remaining 600 m, whereas the matching distance of the friend E is calculated to be the remaining 300 m. After that, the person having the longest matching distance is specified as a companion (Step S410). That is to say, the friend C is specified as a companion in this case. Then the meeting point for meeting the friend C is calculated as an accompanying starting position (Step S411), and the calculated meeting point is notified to the third terminal 141 specified as the companion (Step S411). Further, in the same manner, the calculated meeting point is notified to the first terminal 120 (Step S412).

This makes it possible to specify, with each terminal's traveling taken into account, a companion suitable for accompanying a child for his or her security, and thus to accomplish the security function.

Note that in the above example, the traveling of both terminal users is taken into account, and the meeting point is specified as the accompanying starting position assuming the case of linear traveling, for example. However, the present invention is not limited to this. For example, a point which is on both users' traveling routes and is a desirable position for starting accompanied traveling may be specified as the accompanying starting position with reference to map information. For example, parks and open space having a high visibility are often suitable as accompanying starting positions where the users meet each other, and thus may be calculated as accompanying starting positions, taking into account whether they are on both users' traveling routes, or further taking into account the detour degree illustrated in the above embodiment. In addition, when one of the users is to wait for another, the accompanying starting position may be where the waiting user can efficiently spend the waiting time. The map information accumulation unit 144 is equivalent to a map information accumulation unit in which information regarding a safety level of a predetermined region is accumulated, and the accompanying starting position calculation unit, equivalent to the accompanying starting position calculation unit 150, calculates, as the accompanying starting position, a point which is located on the traveling routes predicted by the traveling route prediction unit and has a high safety level.

Alternatively, rather than one user catching up with another, both users may travel to a predetermined place to meet each other. For example, the accompanying starting position calculation unit 150 may calculate, as the accompanying starting position, the position which is on the matching route calculated by the destination matching degree judgment unit 151 and which minimizes the traveling distances of both terminal users who are to travel together. In this case, the accompanying starting position calculation unit, equivalent to the accompanying starting position calculation unit 150, calculates, as the accompanying starting position, a meeting point at which traveling distances of both the first user and the second user specified as the companion become minimum, the meeting point being a point at which the first user and the second user meet and being located on the traveling routes predicted by said traveling route prediction unit.

(Third Variation)

Note that in the first variation the companion is specified based on a matching distance of each terminal's traveling route. From the viewpoint of security, it is desirable to travel with a companion a longer distance, therefore, as illustrated in the present invention, safer traveling is enabled by specifying a user having a long matching distance as a companion and encouraging the specified user to accompany another terminal user. Furthermore, in the second variation, the accompanying starting position and the matching distance are calculated for the specification of a companion, taking into account the traveling speed of each terminal. A more suitable companion can be specified and safer traveling is enabled through specification of a companion based on matching degrees of distances, with not only the mere relative distance between current positions taken into account, but also the distances of the subsequent traveling taken into account.

However, the examples illustrated in these variations do not take into account a profile of each terminal user, such as the user's age. In fact, systems to which the present invention is applied can implement children's security more appropriately by changing control depending on the profiles of the terminal users which indicate, for example, whether the user who is being watched is a senior student or a junior student, and whether or not the user who is to watch the child as a companion is a parent, a teacher, or another child. Hereinafter, description is provided using a specific example.

First, the system illustrated in the present invention can be implemented through terminals distributed to students at a predetermined primary school, for example. An example of the use of the system is that every student in all grades from the first to the sixth grades of the primary school is provided with a terminal, and protects themselves from danger while they are on the way to and from the primary school, cram school, and so on, by accompanying each other, using the above described approaches.

Figure 42:
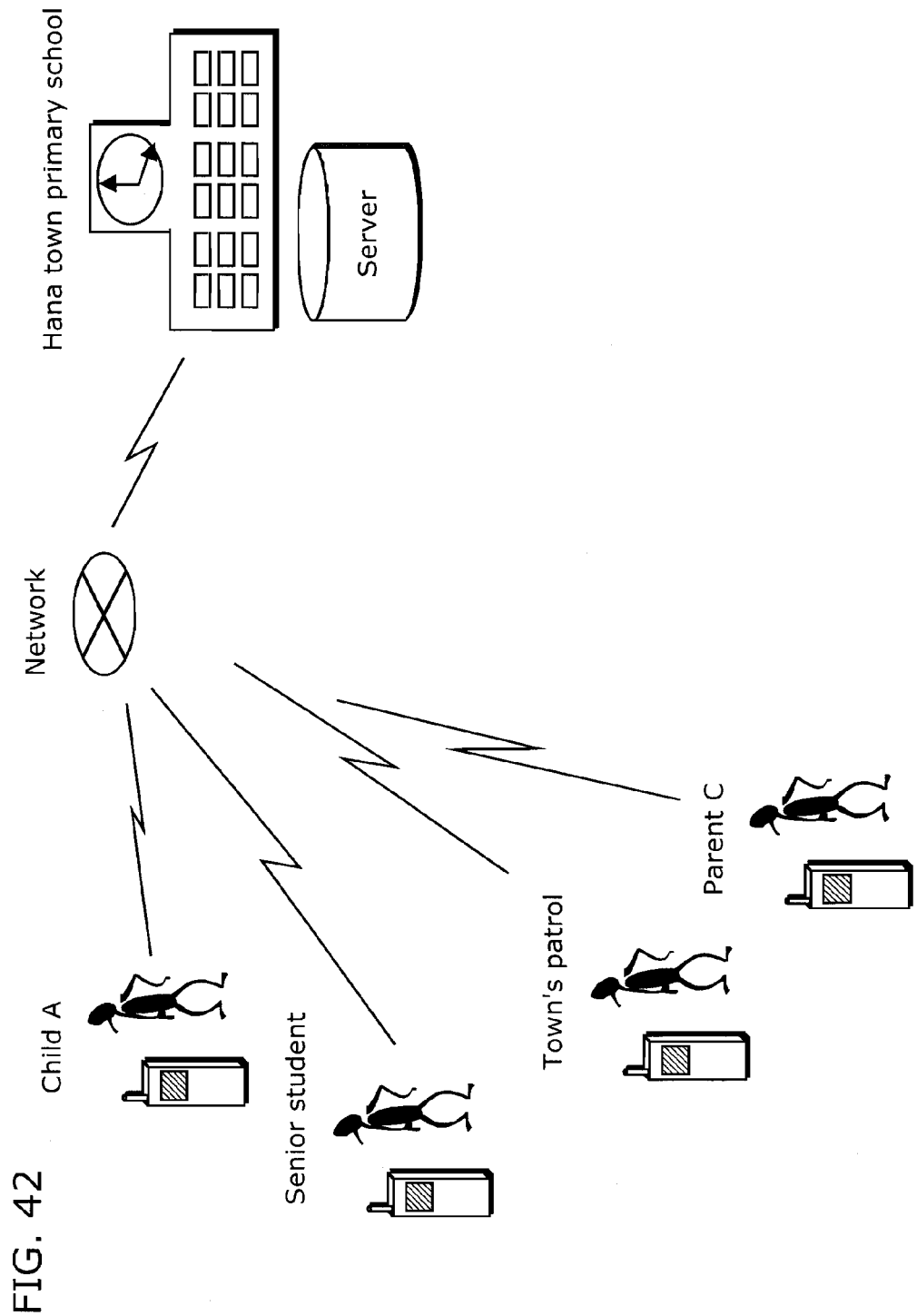
FIG. 42 is a diagram showing an example of the hardware configuration of the present system put into actual use. (Second Embodiment)

FIG. 42 is a diagram showing an example of the hardware configuration of the present system put into actual use. The present system first includes terminals used by respective users, and the server that processes information about these terminals. The terminals are used by primary school teachers, kindergarten teachers, students' parents, or those who patrol the town. As illustrated in the above embodiments, each terminal includes a position detection unit, a destination prediction unit and so on, detects the current and future positions and the like of the user, and transmits the detected positions and so on to the server. The server covers certain areas per primary school or kindergarten, or per predetermined region, and as illustrated in the above embodiments, controls security notification, performs processing for encouraging accompanied traveling, and transmits these processing to each terminal to protect children against crimes and so on based on the position information and the like transmitted from the students of the primary school and the like and the terminals located within the covered areas.

In doing so, a higher level of security function can be implemented not only by merely encouraging terminal users meet and travel together, but also by specifying a companion taking into account their ages and so on. For example, it is considered that junior students from the first to third grades are more likely to be exposed to dangerous situations. Therefore, when a junior student is going home alone, for example, notification can be controlled in such a manner that a senior student is encouraged to accompany the junior student.

Figure 43:
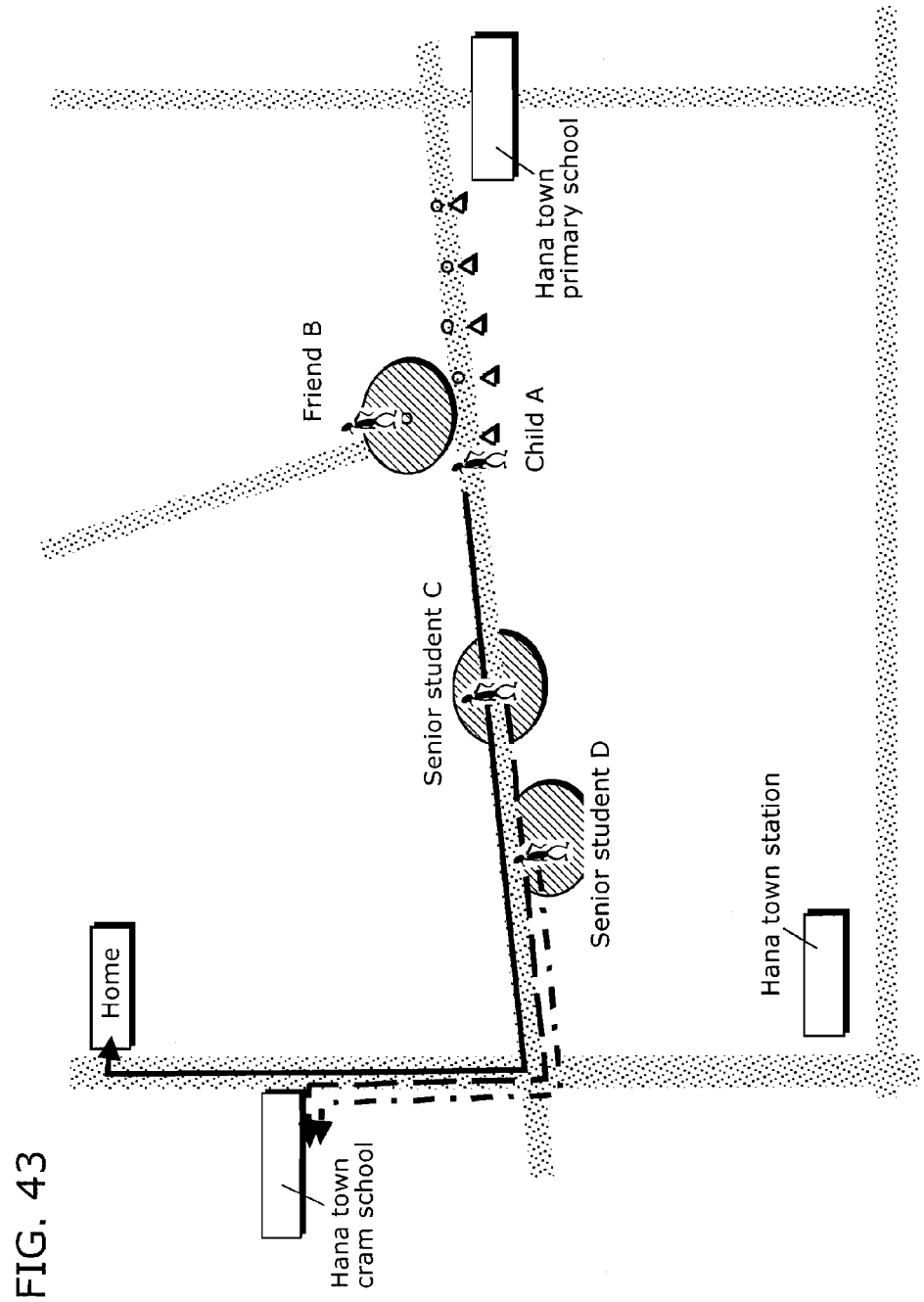
FIG. 43 is a diagram for illustrating notification control for encouraging accompanied traveling. (Second Embodiment)

FIG. 43 is a diagram for illustrating notification control for encouraging accompanied traveling. FIG. 43 shows that the child A has become alone after separating from the friend B at the Hana town 1 intersection. The child A is assumed to be a junior student. Further, it is assumed that ahead of the child A is a student C in a senior grade (senior student C), and further ahead is a student D who is also in a senior grade (senior student D). These students are all assumed to attend Hana town primary school, and have the terminals illustrated in the present invention. In addition, it is assumed that each terminal illustrated in the present example has information regarding its user's year grade indicating, for example, whether the user is in a senior grade or a junior grade, accumulated therein. The figure shows that the destination of the senior student C and the senior student D are both Hana town cram school located down the road after turning right at the Hana town 2 intersection. It is assumed that the destination of the child A is home located down the road after turning right at the Hana town 2 intersection.

From the viewpoint of the senior student C, currently ahead of the senior student C is the senior student D traveling alone and behind is the child A who has become alone after separation from the friend B. The senior student C's matching degrees with respect to the predicted destinations of the senior student D and the child A are equal up to Hana town cram school, indicating that the senior student C can meet any one of them. However, since junior students are more likely to be exposed to dangerous situations as mentioned above, a priority may be set according to school grades in such a manner that junior students may be given a higher priority to meet another terminal user. With this, the senior student C, for example, is notified that the child A, a junior student, is behind the senior student C, and is encouraged to travel together.

Figure 44:
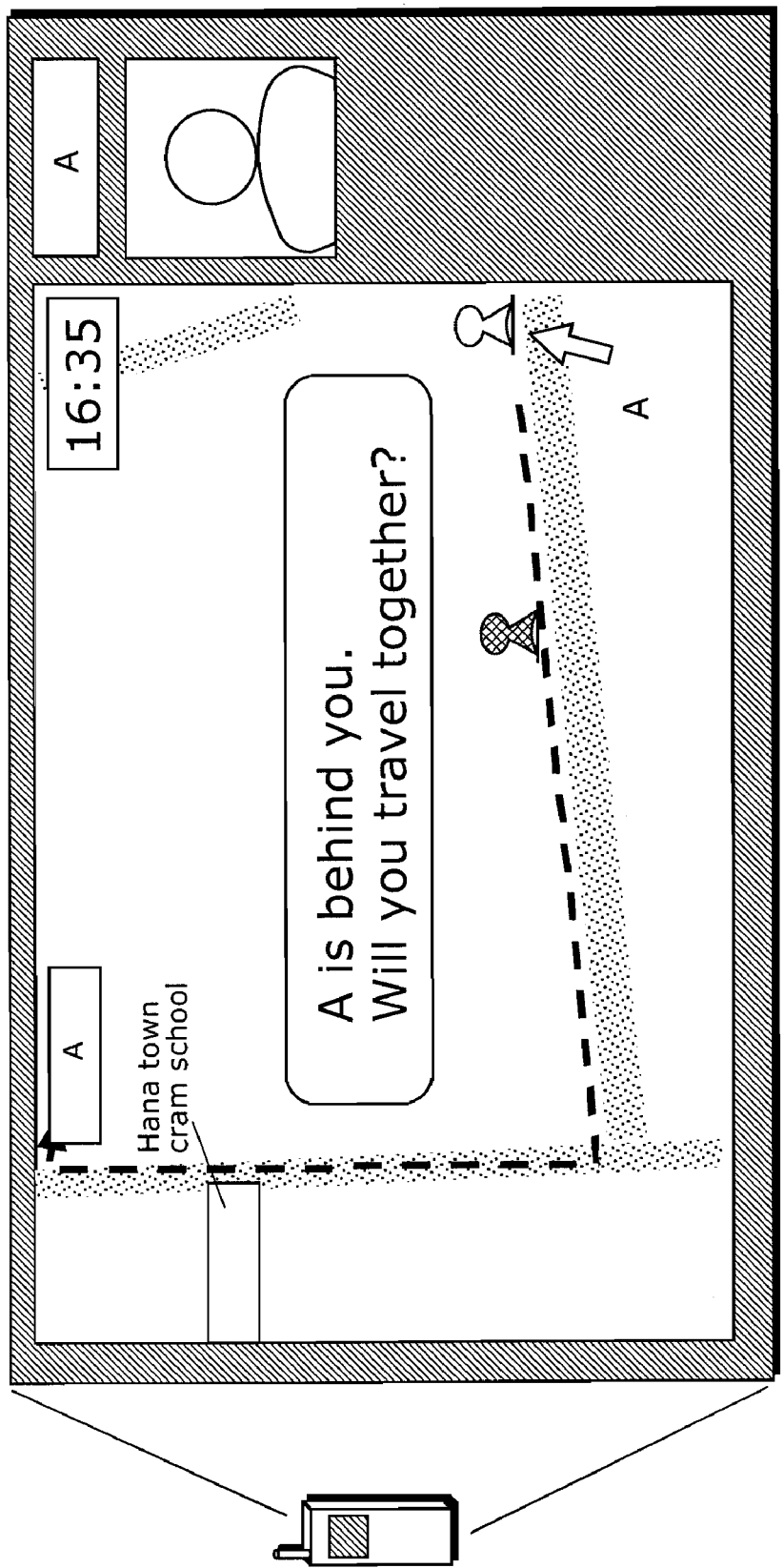
FIG. 44 is a diagram showing an example of a notification transmitted to a terminal used by a senior student, encouraging him or her to accompany a junior student whom the senior student is able to accompany. (Second Embodiment)

FIG. 44 is a diagram showing an example of a notification transmitted to a terminal used by a senior student, encouraging him or her to accompany a junior student whom the senior student is able to accompany. FIG. 44 shows a display screen of the terminal used by the senior student C. The display screen shows the current position of the senior student C and that of the child A who is behind the senior student C, and an arrow indicating the child A's traveling route to the child A's destination, that is, the child A's home. The screen also displays a message, "A is behind you. Will you travel together?", to encourage accompanied traveling. Then the senior student C is asked to wait at his or her current position, making it possible to accompany the child A for protection against dangerous situations. Also, for example, the senior student C may be asked whether or not accompanying is possible, and when the senior student C can accompany the child A, a message such as "C can travel with you." may be transmitted to the junior student. Furthermore, since both of them may not know each other, a photo or the like may be displayed too, for example, as shown in FIG. 44.

Note that junior students, generally speaking, are not aware of the danger involved in traveling alone, and consequently, they may not follow the notification telling him or her to travel with someone. Further, from the viewpoint of traveling speeds, the traveling speed of senior students are generally faster than that of the junior students, and thus in the case where a student needs to catch up with another, it is more preferable to transmit a notification to a senior student telling him or her to go to where a junior student is, rather than transmitting a notification to the junior student telling him or her to go to where the senior student is. In view of the foregoing, it is possible to more safely manage children's traveling by encouraging senior students to travel with junior students by way of waiting for them, or catching up with them.

Furthermore, it is desirable that the terminal appliances can be simply operated, since junior students may not be familiar with the operation of the terminal appliances.

For example, a higher level of security can be achieved by allowing parents to enter schedules, and not allowing other people except for teachers and other specified people to operate the terminals. However, as students become higher in grades, they are more likely to take a side trip on the way home, and thus, when their side trips are not so significant, they can change the schedules according to the traveling on each day to suppress the control on the notification transmitted when a required-for-return time period elapses. By allowing the users to change the schedules according the traveling on each day, it is possible to prevent notifications transmitted by error.

In the above embodiments, the predicted destination entered in the schedules and so on is fixed, and the matching degree is calculated based on the fixed traveling route. However, the present invention is not limited to this. For example, a companion may be specified based on a predicted traveling route and further based on the detour degree illustrated in the above embodiment. By controlling the detour degree depending on each user's age and the like, for example, a more appropriate watching function can be implemented. For example, terminals are assumed to have a threshold value of detour degrees, accumulated therein. The threshold value of detour degrees may be a value calculated according to each terminal, as illustrated in the above embodiment, or a value determined according to each user's profile, such as a year grade. Further, a companion may be specified, not only with the shortest route or the predicted route to the next predicted destination taken into account, but also another route having a detour degree equal to or less than the threshold value taken into account. Hereinafter, description is provided using a specific example.

Figure 45:
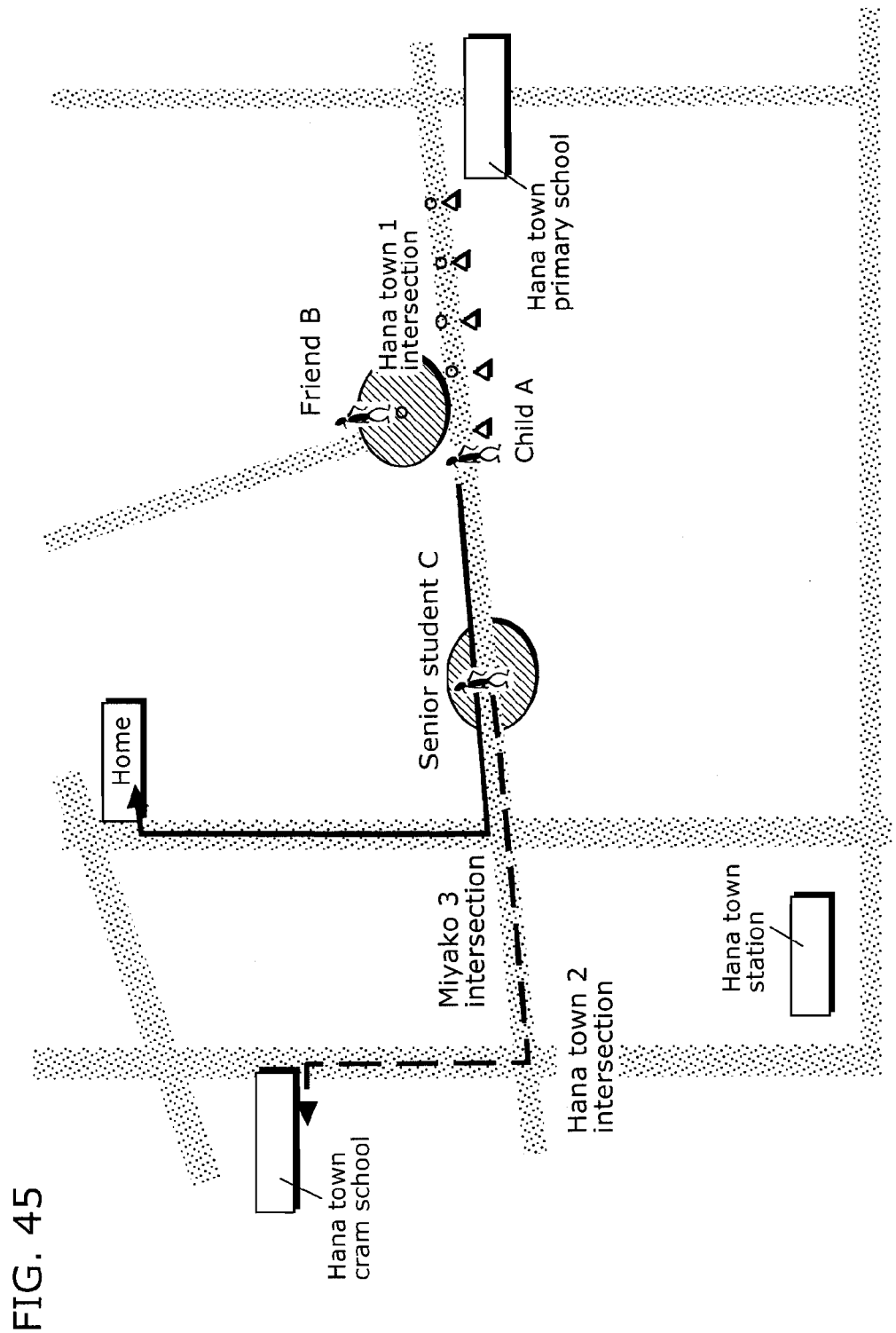
FIG. 45 is a diagram for illustrating notification control for encouraging accompanied traveling. (Second Embodiment)

FIG. 45 is a diagram for illustrating notification control for encouraging accompanied traveling. FIG. 45 shows, as in FIG. 43, that the child A has become alone after separating from the friend B at the Hana town 1 intersection. In is assumed that the child A is a junior student. Further, ahead of the child A is the senior student C. The figure shows that the destination of the senior student C is Hana town cram school located down the road after turning right at the Hana town 2 intersection. It is assumed that the destination of the child A is home located down the road after turning right at the Miyako 3 intersection. In FIG. 45, the matching degree between the destinations of the senior student C and the child A is low, or, their destinations do not match at all in the case where they travel at their traveling speeds as illustrated in the above example. As a result, the senior student C fails to be a suitable companion for the child A. However, when a higher level of security is aimed for, the senior student may be encouraged to accompany and watch the junior student even if this entails some detouring for the senior student.

Figure 46:
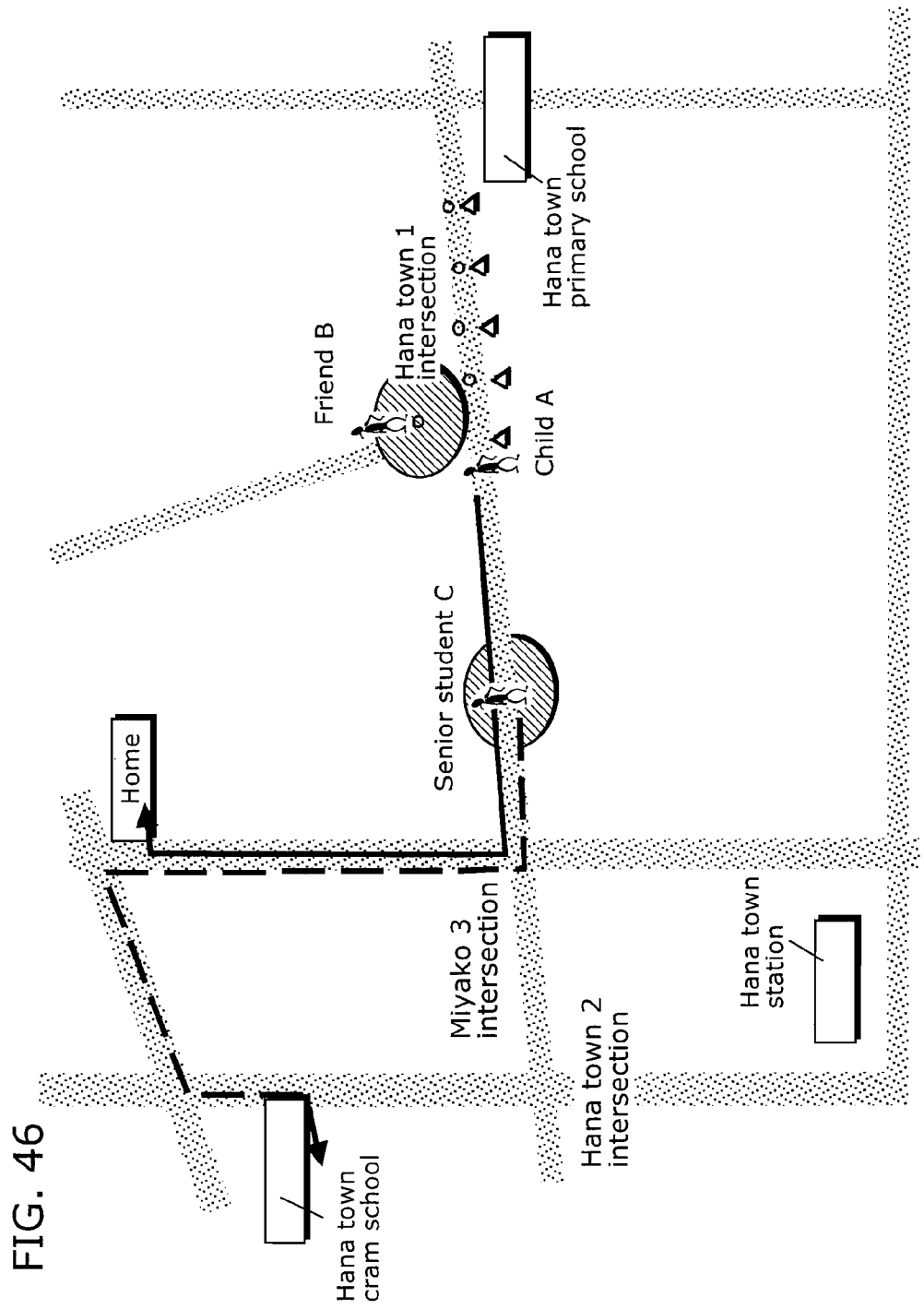
FIG. 46 is a diagram showing an example of a traveling route in the case of encouraging the senior student to accompany the junior student within a range of a threshold value of detour degrees. (Second Embodiment)

FIG. 46 is a diagram showing an example of a traveling route in the case of encouraging the senior student to accompany the junior student within a range of a threshold value of detour degrees. For example, even if the senior student C accompanies the child A to the child A's home and needs to take some detour as a result, as shown in FIG. 46, the senior student C can still arrive at the destination of Hana town cram school. If the senior student C takes the route as shown in FIG. 46, the matching degree with respect to the child A's destination becomes very high. In view of the foregoing, according to each terminal user's profile, a higher detour degree may be set for senior students, and in the case where a junior student is about to travel alone, a notification may be transmitted to the senior student to encourage accompanied traveling within a range of the detour degree, for example. This enables achievement of a higher level of security for junior students and so on.

Furthermore, the detour degree may be calculated with the traveling speed during the accompanied traveling taken into account. For example, in the case of accompanying a junior-student user, it is considered that the traveling speed of the senior-student user slows down during the accompanied traveling. That is to say, in FIG. 46, on the way home of the child A who is a junior student, the senior student C must travel at a traveling speed taking into account the traveling speed of the child A, instead of traveling at his or her own traveling speed. In such a case, when the calculation of the detour degree is based merely on distances, even in the case where the calculation shows that the detour degree is equal to or less than a threshold value, accompanying the junior student may result in being late at Hana town cram school, for example, because traveling with the junior student takes a longer time. In view of the foregoing, when accompanying is to be performed, the detour degree may be calculated with the traveling distance during the accompanied traveling, the traveling speed of the potential companion, and the like taken into account so as to specify a companion depending on whether or not the calculated detour degree is equal to or less than the threshold value.

In this case, the companion specification unit 149 has the function of the detour degree calculation unit which calculates a detour degree indicating how far a second user among the second users is detouring towards a destination of the second user, based on the traveling route of the second user predicted by the traveling route prediction unit and the position information of the second user detected by the second position detection unit, and also has the function of the detour degree threshold accumulation unit in which a threshold value of the detour degree of the second user is accumulated. Further, the matching route distance calculation unit, equivalent to the destination matching degree judgment unit 151, calculates the matching distance based on a traveling route taken when the second user travels within a range of the threshold value of the detour degree accumulated in the detour degree threshold accumulation unit.

Furthermore, the companion specification unit 149 further has a function equivalent to that of a departure point calculation unit which calculates a departure point based on the position information detected by the second position detection unit. In addition, the companion specification unit 149, having a function equivalent to that of the detour degree calculation unit, calculates, based on a route cost representing a cost required for traveling from a start point to an end point of a route, the detour degree by subtracting a route cost required for traveling from the calculated departure point to a destination predicted by the traveling route prediction unit from a sum of a route cost required for traveling from the departure point to a current position and a route cost required for traveling from the current position to the destination predicted by the traveling route prediction unit.

In the case where the detour degree is calculated with the distance to be traveled while a senior student accompanies a junior student, the traveling speed of the potential companion, and the like taken into account, and a companion is specified depending on whether or not the calculated detour degree is equal to or less than the threshold value, the notification system includes the destination arrival detection unit in addition to the constituent elements of the configuration shown in FIG. 31. The destination arrival detection unit, equivalent to the arrival judgment unit 128 shown in FIG. 20, detects that the second user has arrived at the destination of the second user, based on the position of the second terminal detected by the second position detection unit. The detour degree accumulation unit 129 is equivalent to the detour degree accumulation unit in which the detour degree calculated by the detour degree calculation unit is accumulated in association with the destination arrived at. The threshold calculation unit 130 is equivalent to the threshold calculation unit which calculates a threshold value of the detour degree based on the detour degree accumulated in the detour degree accumulation unit, the threshold value being associated with the destination. The threshold calculation unit 130, having the function of the detour degree threshold accumulation unit, updates the accumulated threshold value of the detour degree by replacing the threshold value with a new threshold value calculated by the threshold calculation unit, and the matching route distance calculation unit, equivalent to the destination matching degree judgment unit 151, calculates the matching distance based on a traveling route when the second user travels within a range of the threshold value of the detour degree updated by the detour degree threshold accumulation unit.

Figure 47:
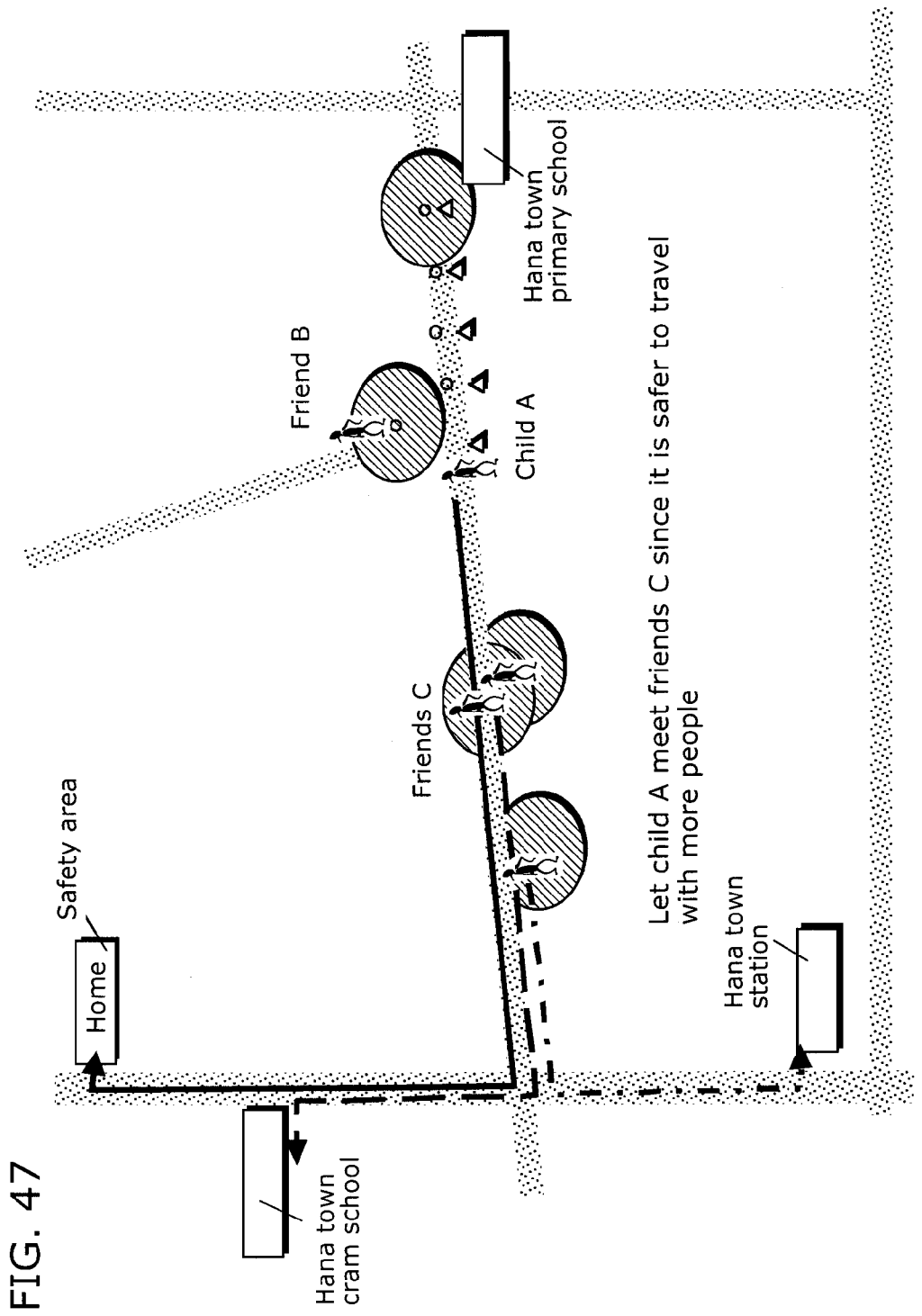
FIG. 47 is a diagram showing an example of a traveling route in the case where a group made up of a greater number of people accompanies the child A. (Second Embodiment)

FIG. 47 is a diagram showing an example of a traveling route in the case where a group made up of a greater number of people accompanies the child A. It should be noted that a higher priority may be given to the group made up of a greater number of people, that is, a more highly-populated group. In such a case, the companion specification unit 149 has the function of a safety level calculation unit which calculates a safety level which indicates a level of safety of the notification control area and which increases with a density of the second users using the respective second terminals. The companion specification unit 149, as the companion specification unit, preferentially specifies, as a companion, a second user who has the notification control area having a high safety level, from among the second users. As a result, a higher level of safety can be ensured (FIG. 47). Further, the range and the level of the notification control area may be changed according to the profiles and the like of the terminal users, and the changed range and level of the notification control area may be taken into account. For example, by controlling the notification control area of parents, teachers, and senior students to be wider than that of junior students, it is possible to more appropriately achieve the function for watching the children. In such a case, the companion specification unit 149 is equivalent to the safety level calculation unit which calculates a safety level which indicates a level of safety of the notification control area and which increases with an age of one of the second users using the respective second terminals within a predetermined age range. The companion specification unit 149 has a function to accumulate the profiles and the like of the terminal users, and, as the companion specification unit, the companion specification unit 149 preferentially specifies, as a companion, a second user who has the notification control area having a high safety level, from among the second users.

Note that in the second embodiment, the security notification is controlled by calculating a required-for-return time period based on the current position and the future destination of each terminal, and specifying a companion based on the calculated required-for-return time period, a matching degree of traveling routes, and so on. Meanwhile, the method for specifying a companion illustrated in the second embodiment can be used not only for merely controlling the security notification but also for specifying a companion to protect children against crimes and the like. For example, in some cases, what makes parents at ease is to know with whom their children are or with whom they are traveling, rather than knowing whether or not they will come home before a certain time or what time they will come home. In view of the foregoing, the method for specifying a companion illustrated in the second embodiment may be used as a device that allows a child to be accompanied by a trustworthy third party.

Figure 48:
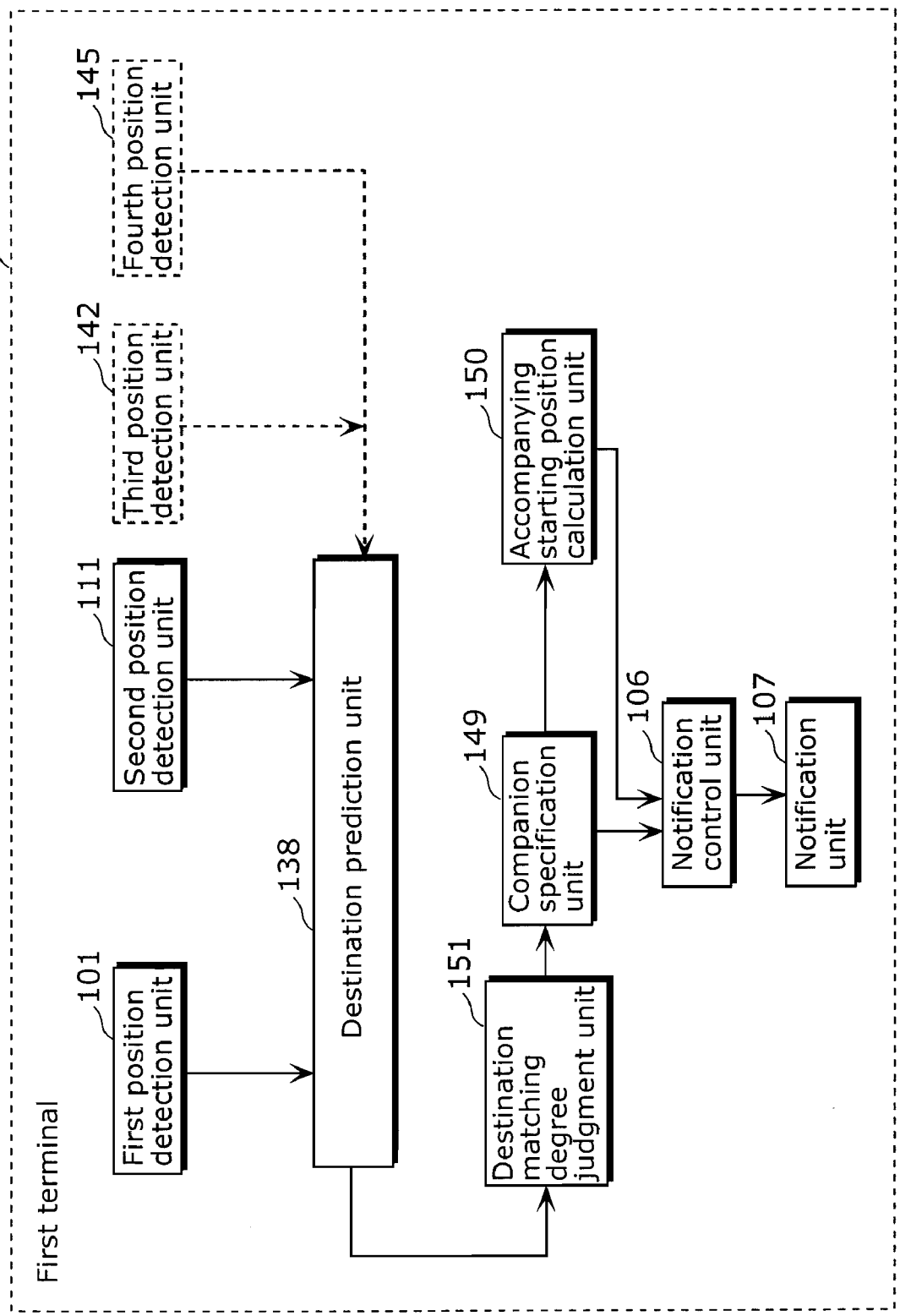
FIG. 48 is a diagram showing the configuration of the system according to a third variation. (Second Embodiment)

FIG. 48 is a diagram showing the configuration of the system according to the present variation. Constituent elements in the figure which are the same as those in the system configuration of the second embodiment shown in FIG. 31 are given the same numerical references.

In the present variation, the first position detection unit 101, the second position detection unit 111, the third position detection unit 142, the fourth position detection unit 145, and the like detect the position information of their corresponding terminals, and the destination prediction unit 138 predicts the destination of each terminal. Then, based on the detected position and the predicted destination of each terminal, the companion specification unit 149 specifies a terminal whose user is able to perform accompanying. The object of the above embodiment is to control notification, and thus it is essential to have the notification control area determination unit 114 and the time period required to arrive at the notification control area (the required-for-return time period calculation unit 113) as constituent elements. However, in the present variation, a companion is specified based only on the predicted destinations and the like, and consequently, the above constituent elements are not essential. Note that, also in the present variation, the dotted lines are to indicate that there are plural detection units which include the third position detection unit 142, the fourth position detection unit 145 and so on, since a terminal whose user is able to perform accompanying is specified from among plural terminals. In other words, the number of terminals may be other than four, and by detecting positions of the plural terminals, one of them is specified. Then the accompanying starting position calculation unit 150 determines a position to meet the specified companion, and the notification control unit 106 controls the notification.

Further, the method for specifying a companion follows the same flow chart as that shown in FIG. 34. Furthermore, as shown in the flow chart of FIG. 41, a companion may be specified with the traveling speeds and the profiles of the terminals users taken into account.

INDUSTRIAL APPLICABILITY

The notification device according to the present invention is useful as a mobile terminal and the like such as a mobile phone.

The invention claimed is:

1. A notification system for notifying a terminal of information regarding a position of a user having another terminal based on a traveling route of the user, said notification system comprising:

a first position detection unit operable to detect a position of a first terminal used by a first user;

a second position detection unit operable to detect positions of second terminals used by a plurality of second users;

a notification control area determination unit operable to determine a plurality of notification control areas, each respective notification control area of the plurality of notification control areas (i) being an area on a map, (ii) being an area in which position information regarding the position of the first terminal used by the first user is not notified when the first terminal is in the respective notification control area, and (iii) including a predetermined area, the plurality of notification control areas being determined based on the positions of each of the second terminals used by the plurality of second users;

a traveling route prediction unit operable to (i) predict, for each respective notification control area, a respective first user traveling route from a current detected position of the first terminal to the respective notification control area, such that the respective first user traveling route indicates a route to be traveled by the first user from a current time onward, and (ii) predict, for each respective notification control area, a respective second user traveling route to be traveled by a respective second user of the plurality of second users from the current time onward;

a required-for-return time period calculation unit operable to calculate, for each respective notification control area, a respective required-for-return time period representing a time period required for arriving at the respective notification control area when the first user travels along the respective first user traveling route;

a companion specification unit operable to specify, as a companion, a second user, of the plurality of second users, that is able to join the first user within a predetermined period of time and accompany the first user, the second user being specified as the companion based on the respective first user and the respective second user traveling routes predicted by said traveling route prediction unit and the respective required-for-return time periods calculated by said required-for-return time period calculation unit;

an accompanying starting position calculation unit operable to calculate an accompanying starting position at which the second user specified by said companion specification unit starts accompanying the first user;

a notification unit operable to notify the second terminals, including the second terminal used by the specified second user, of information regarding the specified second user and regarding the accompanying starting position; and a notification control unit operable to permit, for each respective notification control area, a notification of the position information regarding the position of the first terminal used by the first user when (i) the respective required-for-return time period has elapsed from the current time and (ii) the first user has not arrived at the respective notification control area, and operable to suppress, for each respective notification control area, the notification of the position information regarding the position of the first terminal used by the first user when the respective required-for-return time period has not elapsed from the current time.

2. The notification system according to claim 1, further comprising a matching route distance calculation unit operable to calculate a matching distance representing a distance for which each respective second user traveling route matches one of the respective first user traveling routes, wherein said companion specification unit specifies, as the companion, a second user, of the plurality of second users, having a longest matching distance from the accompanying starting position.

3. The notification system according to claim 2, wherein said accompanying starting position calculation unit includes:
  a first terminal speed calculation unit operable to calculate a first speed of the first user using the first terminal; and
  a second terminal speed calculation unit operable to calculate, for each respective second terminal of the second terminals, a second speed of the respective second user using the respective second terminal, and wherein said accompanying starting position calculation unit is operable to calculate, as the accompanying starting position, a meeting point at which the first user and at least one second user of the plurality of second users meet when the first user and the at least one of the plurality of second users travel along the respective first user and the respective second user traveling routes at the calculated first speed and second speed, respectively.

4. The notification system according to claim 2, wherein said accompanying starting position calculation unit includes:
  a first terminal speed calculation unit operable to calculate a first speed of the first user using the first terminal;
  a second terminal speed calculation unit operable to calculate, for each respective second terminal of the second terminals, a second speed of the respective second user using the respective second terminal; and
  a maximum traveling speed calculation unit operable to calculate a maximum traveling speed at which the first user can travel towards the plurality of second users, based on the first speed calculated by said first terminal speed calculation unit, and wherein said accompanying starting position calculation unit is operable to calculate, as the accompanying starting position, a meeting point at which the first user and at least one second user of the plurality of second users meet when the first user travels along the respective first user traveling routes at the calculated maximum traveling speed and the at least one second user of the plurality of second users travels along the respective second user traveling route at the calculated second speed.

5. The notification system according to claim 2, wherein said accompanying starting position calculation unit is operable to calculate, as the accompanying starting position, a meeting point at which traveling distances of both the first user and the second user specified as the companion become a minimum, the meeting point being a point at which the first user and the specified second user meet and being located on the respective first user and the respective second user traveling routes.

6. The notification system according to claim 2, further comprising a safety level calculation unit operable to calculate a safety level (i) indicating a level of safety of each respective notification control area of the plurality of notification control areas and (ii) increasing with a density of the plurality of second users using the second terminals, wherein said companion specification unit preferentially specifies, as the companion, a second user, of the plurality of second users, that has a notification control area, of the plurality of notification control areas, with a high safety level.

7. The notification system according to claim 2, further comprising a safety level calculation unit operable to calculate a safety level (i) indicating a level of safety of each respective notification control area of the plurality of notification control areas and (ii) increasing with an age of a respective second user, of the plurality of second users, using a respective second terminal of the second terminals within a predetermined age range, wherein said companion specification unit preferentially specifies, as the companion, a second user, of the plurality of second users, that has a notification control area, of the plurality of notification control areas, with a high safety level.

8. The notification system according to claim 2, further comprising a map information accumulation unit in which information regarding a safety level of a predetermined region is accumulated, wherein said accompanying starting position calculation unit is operable to calculate, as the accompanying starting position, a point which is located on the respective first user and the respective second user traveling routes and has a high safety level.

9. The notification system according to claim 2, further comprising:
  a detour degree calculation unit operable to calculate a detour degree indicating how far a second user, from among the plurality of second users, is detoured with regards to a destination of the detoured second user, based on the respective second user traveling routes and position information of the detected second user detected by said second position detection unit; and
  a detour degree threshold accumulation unit in which a threshold value of the detour degree of the detoured second user is accumulated, wherein said matching route distance calculation unit is operable to calculate the matching distance based on a traveling route taken when the detoured second user travels within a range of the threshold value of the detour degree accumulated in said detour degree threshold accumulation unit.

10. The notification system according to claim 9, further comprising a departure point calculation unit operable to calculate a departure point based on the position information of the detected second user detected by said second position detection unit, wherein said detour degree calculation unit is operable to calculate, based on a route cost representing a cost required for traveling from a start point to an end point of a route, the detour degree by subtracting a route cost required for traveling from the calculated departure point to a destination predicted by said traveling route prediction unit from a sum of a route cost required for traveling from the calculated departure point to a current position and a route cost required for traveling from the current position to the destination predicted by said traveling route prediction unit.

11. A notification system for notifying a terminal of information regarding a position of a user having another terminal based on a traveling route of the user, said notification system comprising:

a first position detection unit operable to detect a position of a first terminal used by a first user;

a second position detection unit operable to detect a position of a second terminal used by a second user;

a notification control area determination unit operable to determine a notification control area based on the position detected by said second position detection unit, the notification control area being an area on a map and being an area in which position information regarding the position of the first terminal used by the first user is not notified;

a traveling route prediction unit operable to predict a traveling route from a current detected position of the first terminal to the notification control area, such that the predicted traveling route indicates a route to be traveled by the first user from a current time onward;

a required-for-return time period calculation unit operable to calculate a required-for-return time period representing a time period required for arriving at the notification control area when the first user travels along the traveling route predicted by said traveling route prediction unit;

a notification control unit operable to permit a notification of the position information regarding the position of the first terminal used by the first user when (i) the required-for-return time period has elapsed from the current time and (ii) the first user has not arrived at the notification control area, and operable to suppress the notification of the position information regarding the position of the first terminal used by the first user when the required-for-return time period has not elapsed from the current time;

a detour degree calculation unit operable to calculate a detour degree indicating how far the first user is detoured with regards to a destination of the first user, based on the traveling route of the first user predicted by said traveling route prediction unit and the position information of the first terminal used by the first user detected by said first position detection unit;

an information notification rule accumulation unit in which an information notification rule is accumulated in accordance with the calculated detour degree, the information notification rule regarding either a detail of a notification transmitted to the second terminal or a party other than the second terminal to whom the notification is transmitted;

a departure point calculation unit operable to calculate a departure point based on the position of the first terminal detected by said first position detection unit; and a waiting time information accumulation unit in which information regarding a predetermined point and a waiting time to wait at the predetermined point, is accumulated, wherein said notification control unit is operable to refer to the information notification rule and change either the detail of the notification or the party to whom the notification is transmitted, in accordance with the detour degree calculated by said detour degree calculation unit, wherein said detour degree calculation unit is operable to calculate, based on a route cost representing a cost required for traveling from a start point to an end point of a route, the detour degree by subtracting a route cost required for traveling from the calculated departure point to a destination predicted by said traveling route prediction unit from a sum of a route cost required for traveling from the calculated departure point to a current position and a route cost required for traveling from the current position to the destination predicted by said traveling route prediction unit, and wherein said detour degree calculation unit is operable to calculate, based on the route cost represented as a time period required to travel from a start point to an end point of a route, the detour degree by subtracting the waiting time to wait at the predetermined point on the route predicted by said traveling route prediction unit from the route cost using the information regarding the waiting time.

12. A notification system for notifying a terminal of information regarding a position of a user having another terminal based on a traveling route of the user, said notification system comprising:

a first position detection unit operable to detect a position of a first terminal used by a first user;

a second position detection unit operable to detect a position of a second terminal used by a second user;

a notification control area determination unit operable to determine a notification control area based on the position detected by said second position detection unit, the notification control area being an area on a map and being an area in which position information regarding the position of the first terminal used by the first user is not notified;

a traveling route prediction unit operable to predict a traveling route from a current detected position of the first terminal to the notification control area, such that the predicted traveling route indicates a route to be traveled by the first user from a current time onward;

a required-for-return time period calculation unit operable to calculate a required-for-return time period representing a time period required for arriving at the notification control area when the first user travels along the traveling route predicted by said traveling route prediction unit;

a notification control unit operable to permit a notification of the position information regarding the position of the first terminal used by the first user when (i) the required-for-return time period has elapsed from the current time and (ii) the first user has not arrived at the notification control area, and operable to suppress the notification of the position information regarding the position of the first terminal used by the first user when the required-for-return time period has not elapsed from the current time a detour degree calculation unit operable to calculate a detour degree indicating how far the first user is detoured with regards to a destination of the first user, based on the traveling route of the first user predicted by said traveling route prediction unit and the position information of the first terminal used by the first user detected by said first position detection unit;

an information notification rule accumulation unit in which an information notification rule is accumulated in accordance with the calculated detour degree, the information notification rule regarding either a detail of a notification transmitted to the second terminal or a party other than the second terminal to whom the notification is transmitted;

a departure point calculation unit operable to calculate a departure point based on the position of the first terminal detected by said first position detection unit;

a destination arrival detection unit operable to detect that the first user has arrived at the destination of the first user, based on the position of the first terminal detected by said first position detection unit;

a detour degree accumulation unit in which the detour degree calculated by said detour degree calculation unit is accumulated in association with a destination arrived at; and a threshold calculation unit operable to calculate a threshold value of the detour degree based on the detour degree accumulated in said detour degree accumulation unit, the threshold value being associated with the destination arrived at, wherein said notification control unit is operable to refer to the information notification rule and change either the detail of the notification or the party to whom the notification is transmitted, in accordance with the detour degree calculated by said detour degree calculation unit, wherein said detour degree calculation unit is operable to calculate, based on a route cost representing a cost required for traveling from a start point to an end point of a route, the detour degree by subtracting a route cost required for traveling from the calculated departure point to a destination predicted by said traveling route prediction unit from a sum of a route cost required for traveling from the calculated departure point to a current position and a route cost required for traveling from the current position to the destination predicted by said traveling route prediction unit, and wherein the threshold value of the detour degree calculated per destination is accumulated in said information notification rule accumulation unit as the information notification rule.

13. The notification system according to claim 10, further comprising:

a destination arrival detection unit operable to detect that a respective second user, of the plurality of second users, has arrived at the destination of the respective second user, based on the position of the second terminal used by the respective second user detected by said second position detection unit;

a detour degree accumulation unit in which the detour degree calculated by said detour degree calculation unit is accumulated in association with a destination arrived at; and a threshold calculation unit operable to calculate a threshold value of the detour degree based on the detour degree accumulated in said detour degree accumulation unit, the threshold value being associated with the destination arrived at, wherein said detour degree threshold accumulation unit is operable to update the accumulated threshold value of the detour degree by replacing the threshold value with a new threshold value calculated by said threshold calculation unit, and wherein said matching route distance calculation unit is operable to calculate the matching distance based on a respective second user traveling route of a respective second user when the respective second user travels within a range of the threshold value of the detour degree updated by said detour degree threshold accumulation unit.

14. A notification device which notifies a terminal of information regarding a position of a user having another terminal based on a traveling route of the user, said notification device comprising:

a first position detection unit operable to detect a position of a first terminal used by a first user;

a second position detection unit operable to detect positions of second terminals used by a plurality of second users;

a notification control area determination unit operable to determine a plurality of notification control areas, each respective notification control area of the plurality of notification control areas (i) being an area on a map, (ii) being an area in which position information regarding the position of the first terminal used by the first user is not notified when the first terminal is in the respective notification control area, and (iii) including a predetermined area, the plurality of notification control areas being determined based on the positions of each of the second terminals used by the plurality of second users;

a traveling route prediction unit operable to (i) predict, for each respective notification control area, a respective first user traveling route from a current detected position of the first terminal to the respective notification control area, such that the respective first user traveling route indicates a route to be traveled by the first user from a current time onward, and (ii) predict, for each respective notification control area, a respective second user traveling route to be traveled by a respective second user of the plurality of second users from the current time onward;

a required-for-return time period calculation unit operable to calculate, for each respective notification control area, a respective required-for-return time period representing a time period required for arriving at the respective notification control area when the first user travels along the respective first user traveling route;

a companion specification unit operable to specify, as a companion, a second user, of the plurality of second users, that is able to join the first user within a predetermined period of time and accompany the first user, the second user being specified as the companion based on the respective first user and the respective second user traveling routes predicted by said traveling route prediction unit and the respective required-for-return time periods calculated by said required-for-return time period calculation unit;

an accompanying starting position calculation unit operable to calculate an accompanying starting position at which the second user specified by said companion specification unit starts accompanying the first user;

a notification unit operable to notify the second terminals, including the second terminal used by the specified second user, of information regarding the specified second user and regarding the accompanying starting position;

a notification control unit operable to permit, for each respective notification control area, a notification of the position information regarding the position of the first terminal used by the first user when (i) the respective required-for-return time period has elapsed from the current time and (ii) the first user has not arrived at the respective notification control area, and operable to suppress, for each respective notification control area, the notification of the position information regarding the position of the first terminal used by the first user when the respective required-for-return time period has not elapsed from the current time; and a notification unit operable to notify position information regarding the position of the first terminal used by the first user, in accordance with control of said notification control unit.

15. A notification method for notifying a terminal of information regarding a position of a user having another terminal based on a traveling route of the user, said notification method comprising:

a first position detection step of detecting a position of a first terminal used by a first user;

a second position detection step of detecting positions of second terminals used by a plurality of second users;

a notification control area determination step of determining a plurality of notification control areas, each respective notification control area of the plurality of notification control areas (i) being an area on a map, (ii) being an area in which position information regarding the position of the first terminal used by the first user is not notified when the first terminal is in the respective notification control area, and (iii) including a predetermined area, the plurality of notification control areas being determined based on the positions of each of the second terminals used by the plurality of second users;

a traveling route prediction step of (i) predicting, for each respective notification control area, a respective first user traveling route from a current detected position of the first terminal to the respective notification control area, such that the respective first user traveling route indicates a route to be traveled by the first user from a current time onward, and (ii) predicting, for each respective notification control area, a respective second user traveling route to be traveled by a respective second user of the plurality of second users from the current time onward;

a required-for-return time period calculation step of calculating, for each respective notification control area, a respective required-for-return time period representing a time period required for arriving at the respective notification control area when the first user travels along the respective first user traveling route;

a companion specification step of specifying, as a companion, a second user, of the plurality of second users, that is able to join the first user within a predetermined period of time and accompany the first user, the second user being specified as the companion based on the respective first user and the respective second user traveling routes predicted by said traveling route prediction step and the respective required-for-return time periods calculated by said required-for-return time period calculation step;

an accompanying starting position calculation step of calculating an accompanying starting position at which the second user specified by said companion specification step starts accompanying the first user;

a notification step of notifying the second terminals, including the second terminal used by the specified second user, of information regarding the specified second user and regarding the accompanying starting position;

a notification control step of permitting, for each respective notification control area, a notification of the position information regarding the position of the first terminal used by the first user when (i) the respective required-for-return time period has elapsed from the current time and (ii) the first user has not arrived at the respective notification control area, and suppressing, for each respective notification control area, the notification of the position information regarding the position of the first terminal used by the first user when the respective required-for-return time period has not elapsed from the current time; and a notification step of notifying the position information regarding the position of the first terminal used by the first user, in accordance with control in said notification control step.

16. A non-transitory computer-readable recording medium having a program recorded thereon, the program for a notification device which notifies a terminal of information regarding a position of a user having another terminal based on a traveling route of the user, the program causing a computer to execute a method comprising:

a first position detection step of detecting a position of a first terminal used by a first user;

a second position detection step of detecting positions of second terminals used by a plurality of second users;

a notification control area determination step of determining a plurality of notification control areas, each respective notification control area of the plurality of notification control areas (i) being an area on a map, (ii) being an area in which position information regarding the position of the first terminal used by the first user is not notified when the first terminal is in the respective notification control area, and (iii) including a predetermined area, the plurality of notification control areas being determined based on the positions of each of the second terminals used by the plurality of second users;

a traveling route prediction step of (i) predicting, for each respective notification control area, a respective first user traveling route from a current detected position of the first terminal to the respective notification control area, such that the respective first user traveling route indicates a route to be traveled by the first user from a current time onward, and (ii) predicting, for each respective notification control area, a respective second user traveling route to be traveled by a respective second user of the plurality of second users from the current time onward;

a required-for-return time period calculation step of calculating, for each respective notification control area, a respective required-for-return time period representing a time period required for arriving at the respective notification control area when the first user travels along the respective first user traveling route;

a companion specification step of specifying, as a companion, a second user, of the plurality of second users, that is able to join the first user within a predetermined period of time and accompany the first user, the second user being specified as the companion based on the respective first user and the respective second user traveling routes predicted by said traveling route prediction step and the respective required-for-return time periods calculated by said required-for-return time period calculation step;

an accompanying starting position calculation step of calculating an accompanying starting position at which the second user specified by said companion specification step starts accompanying the first user;

a notification step of notifying the second terminals, including the second terminal used by the specified second user, of information regarding the specified second user and regarding the accompanying starting position;

a notification control step of permitting, for each respective notification control area, a notification of the position information regarding the position of the first terminal used by the first user when (i) the respective required-for-return time period has elapsed from the current time and (ii) the first user has not arrived at the respective notification control area, and suppressing, for each respective notification control area, the notification of the position information regarding the position of the first terminal used by the first user when the respective required-for-return time period has not elapsed from the current time; and a notification step of notifying the position information regarding the position of the first terminal used by the first user, in accordance with control in said notification control step.

* * * * *

UNITED STATES PATENT AND TRADEMARK OFFICE
CERTIFICATE OF CORRECTION

| | | |
|---|---|---|
| PATENT NO. | : 8,115,625 B2 | Page 1 of 1 |
| APPLICATION NO. | : 12/095592 | |
| DATED | : February 14, 2012 | |
| INVENTOR(S) | : Mototaka Yoshioka et al. | |

It is certified that error appears in the above-identified patent and that said Letters Patent is hereby corrected as shown below:

ON THE TITLE PAGE:
In Item (54), please replace the title

"PARENTAL ALERT AND CHILD TRACKING DEVICE WHICH DETERMINES IF A CHILD HAS DEVIATED FROM A PREDICATED TRAVEL ROUTE" with -- PARENTAL ALERT AND CHILD TRACKING DEVICE WHICH DETERMINES IF A CHILD HAS DEVIATED FROM A PREDICTED TRAVEL ROUTE --.

IN THE SPECIFICATIONS:
Column 1, lines 1-4 should read:

-- PARENTAL ALERT AND CHILD TRACKING DEVICE WHICH DETERMINES IF A CHILD HAS DEVIATED FROM A PREDICTED TRAVEL ROUTE --.

Signed and Sealed this
Third Day of July, 2012

David J. Kappos
*Director of the United States Patent and Trademark Office*